(12) United States Patent
Murakami et al.

(10) Patent No.: US 9,093,893 B2
(45) Date of Patent: Jul. 28, 2015

(54) DC POWER SUPPLY CIRCUIT

(71) Applicant: Panasonic Corporation, Osaka (JP)

(72) Inventors: Masanobu Murakami, Osaka (JP); Kazushige Sugita, Hyogo (JP); Kazuhiko Itoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/379,394

(22) PCT Filed: Oct. 16, 2012

(86) PCT No.: PCT/JP2012/006617
§ 371 (c)(1),
(2) Date: Aug. 18, 2014

(87) PCT Pub. No.: WO2013/128509
PCT Pub. Date: Sep. 6, 2013

(65) Prior Publication Data
US 2015/0036401 A1    Feb. 5, 2015

(30) Foreign Application Priority Data

Mar. 2, 2012 (JP) ................ 2012-046345
Mar. 7, 2012 (JP) ................ 2012-050203
Mar. 7, 2012 (JP) ................ 2012-050260

(51) Int. Cl.
*H02M 7/217* (2006.01)
*H02M 7/06* (2006.01)
*H02M 1/42* (2007.01)

(52) U.S. Cl.
CPC ............. *H02M 7/06* (2013.01); *H02M 1/4208* (2013.01); *H02M 1/4225* (2013.01); *H02M 7/2176* (2013.01); *H02M 2001/4291* (2013.01); *Y02B 70/126* (2013.01)

(58) Field of Classification Search
CPC ... H05B 41/282; H05B 33/0803; H02M 7/04; H02M 7/217; H02M 3/156
USPC .......... 315/209 R, 224, 244, 290; 363/61, 81, 363/84, 89, 125; 323/222, 282
See application file for complete search history.

(56) References Cited

U.S. PATENT DOCUMENTS 6,115,273 A    9/2000   Geissler
6,198,232 B1 *   3/2001   Marinus et al. ............... 315/290
(Continued)

FOREIGN PATENT DOCUMENTS

JP    2000-071070 A    3/2000
JP    2005-142137 A    6/2005
(Continued)

OTHER PUBLICATIONS

International Search Report for corresponding International Application No. PCT/JP2012/006617 mailed Jan. 22, 2013.
(Continued)

*Primary Examiner* — Gary L Laxton
(74) *Attorney, Agent, or Firm* — Renner, Otto, Boisselle & Sklar, LLP

(57) ABSTRACT

In a DC power supply circuit, upon a switching element switching to a turned-on state, a first current path is formed from an output terminal at a high-potential side of a rectifier circuit to an output terminal at a low-potential side of a rectifier circuit, via an inductor and the switching element in respective order, and a second current path is formed between terminals of a capacitor, via a load, another inductor, and the switching element. Upon the switching element switching to a turned-off state, a third current path is formed from the output terminal at the high-potential side of a rectifier circuit to the output terminal at the low-potential side of a rectifier circuit, via the inductor, a diode, and the capacitor in respective order, and a fourth current path is formed between the inductors, via the diode and the load in respective order.

20 Claims, 44 Drawing Sheets

(56) References Cited

U.S. PATENT DOCUMENTS

| | | |
|---|---|---|
| 6,266,257 B1 | 7/2001 | Geissler |
| 6,865,096 B1 | 3/2005 | Geissler |
| 8,665,922 B2 * | 3/2014 | Fujimura et al. ............ 372/38.07 |
| 2001/0026458 A1 | 10/2001 | Geissler |
| 2002/0191425 A1 | 12/2002 | Geissler |
| 2005/0185432 A1 | 8/2005 | Geissler |
| 2008/0298102 A1 | 12/2008 | Geissler |
| 2011/0215728 A1 * | 9/2011 | Lenk ............................ 315/210 |
| 2013/0300309 A1 * | 11/2013 | Melanson ..................... 315/224 |
| 2014/0152184 A1 * | 6/2014 | Tomiyama et al. ........... 315/186 |

FOREIGN PATENT DOCUMENTS

| | | |
|---|---|---|
| JP | 2007-195282 A | 8/2007 |
| JP | 2008-235530 A | 10/2008 |
| JP | 2011-090901 A | 5/2011 |
| JP | 2012-023294 A | 2/2012 |

OTHER PUBLICATIONS

Form PCT/ISA/237 for corresponding International Application No. PCT/JP2012/006617 dated Jan. 22, 2013.

\* cited by examiner

FIG. 4
(a) 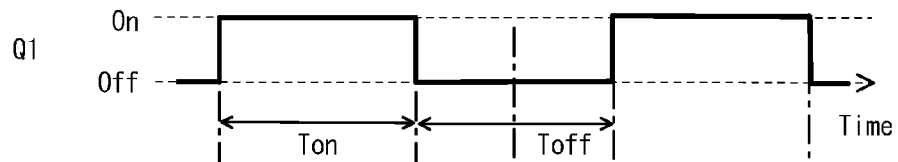
(b) 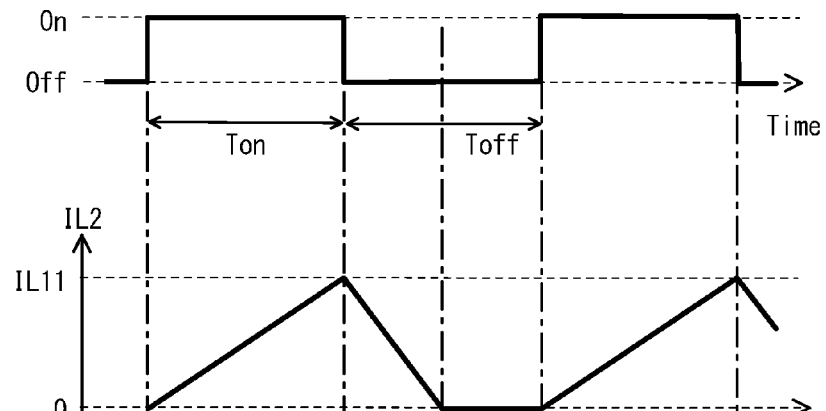
(c) 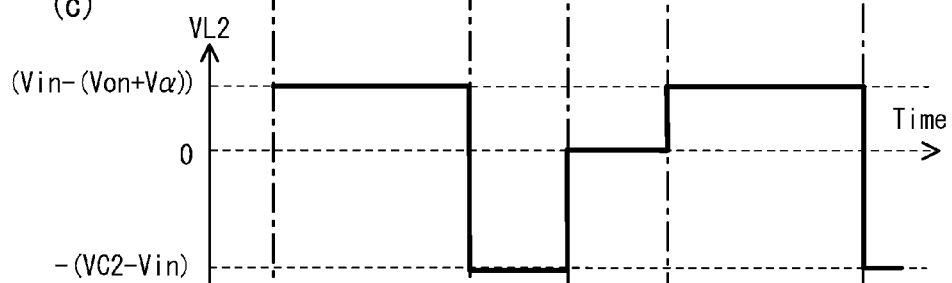
(d) 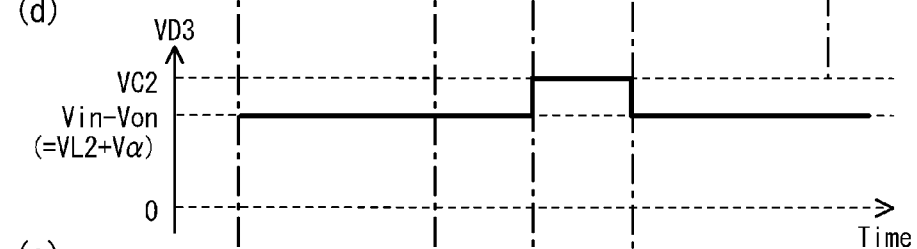
(e) 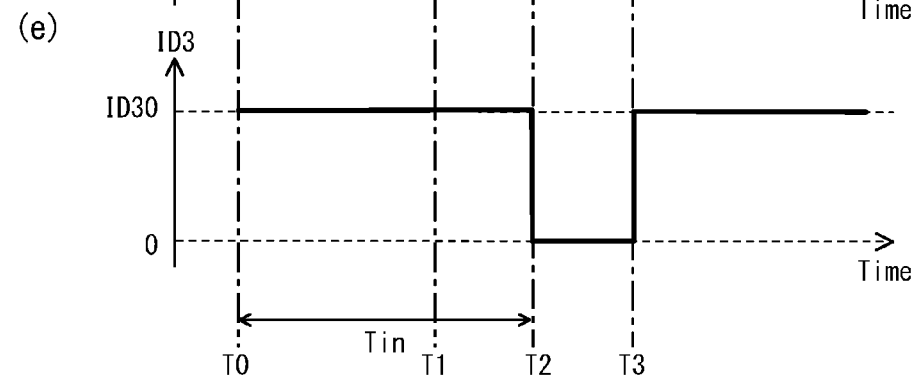

FIG. 11
(a)
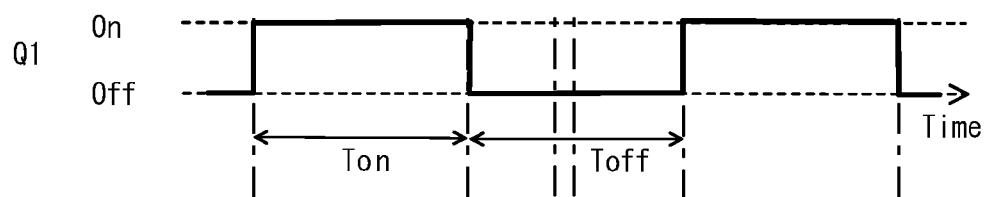
(b)
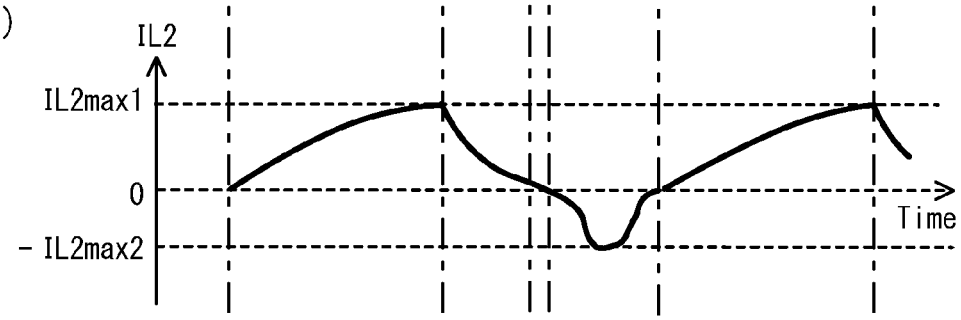
(c)
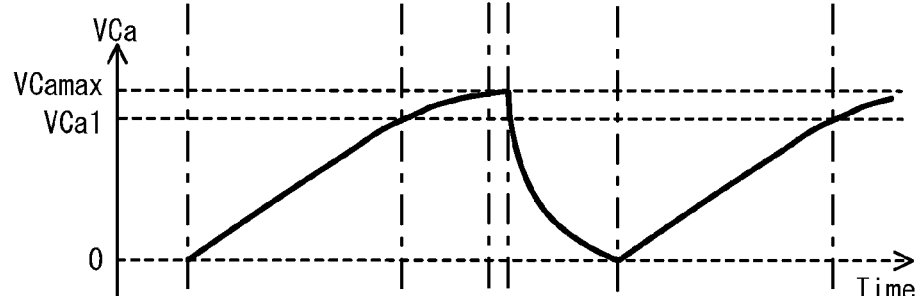
(d)
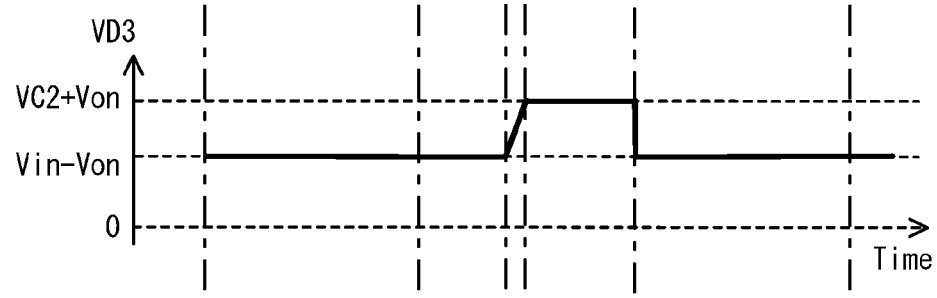
(e)
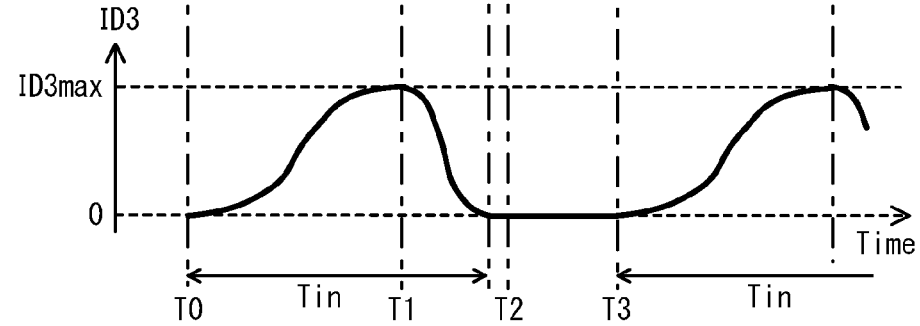

FIG. 12
(a) 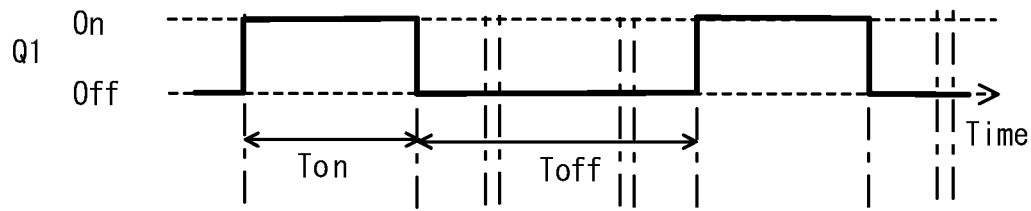
(b) 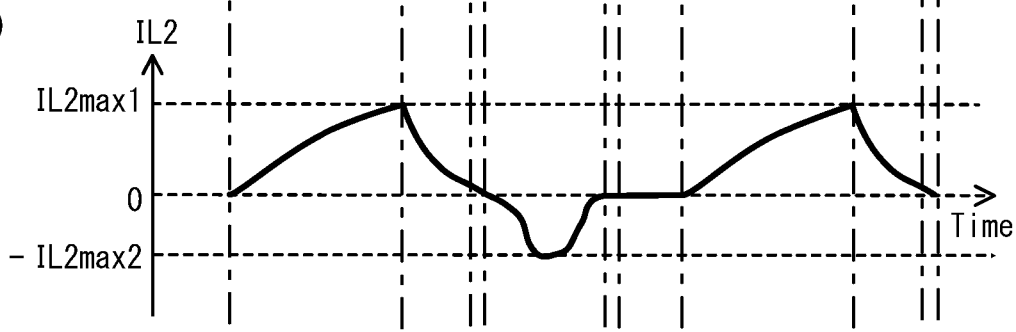
(c) 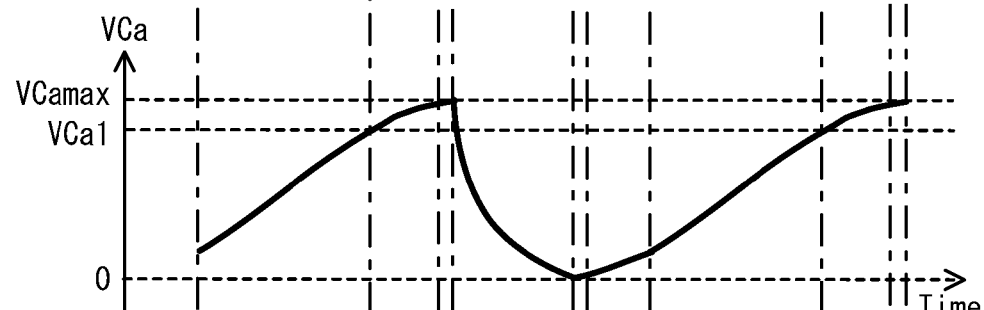
(d) 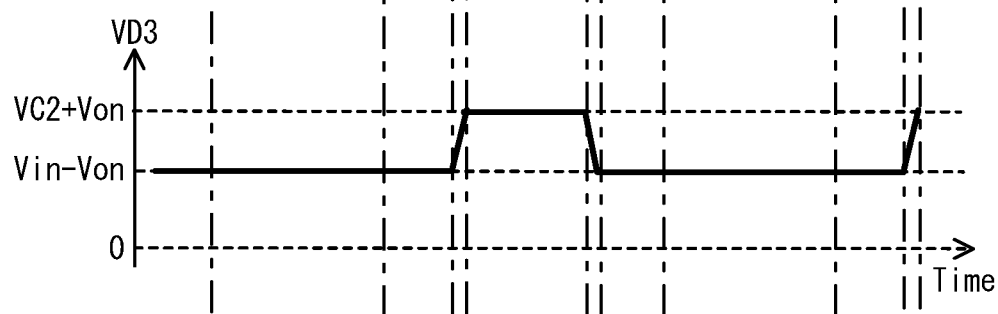
(e) 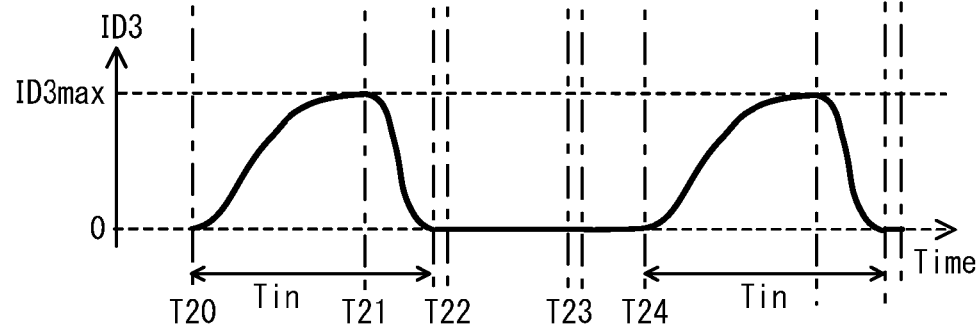

FIG. 13
(a) 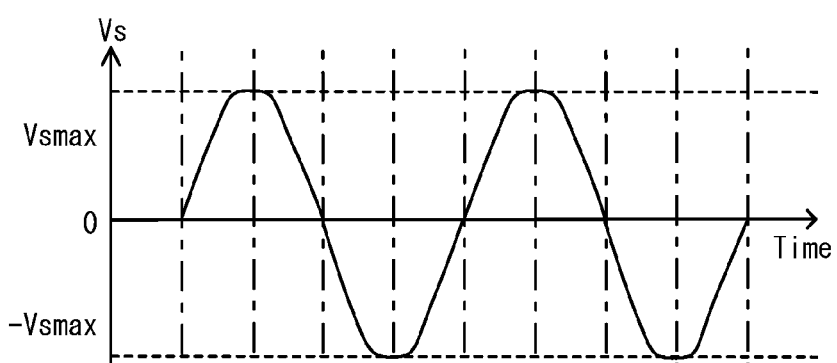
(b) 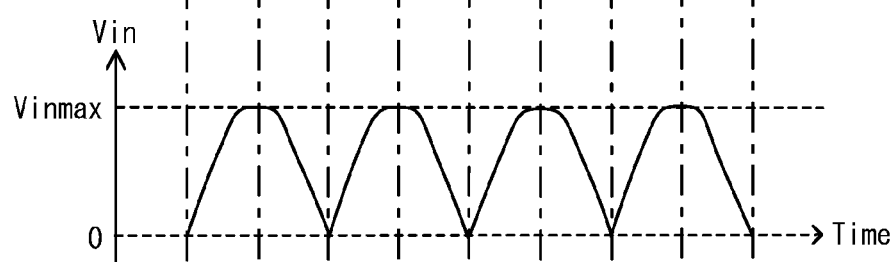
(c) 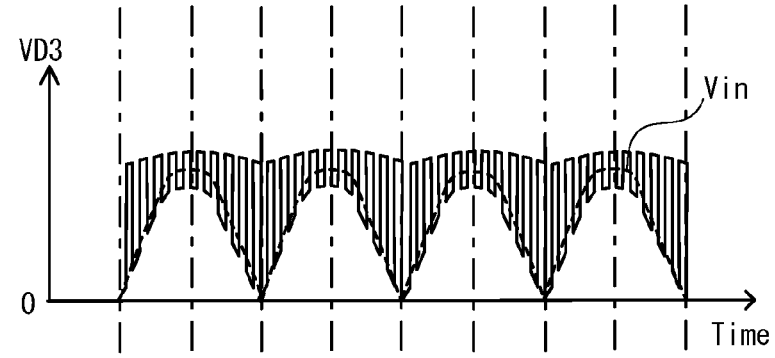
(d) 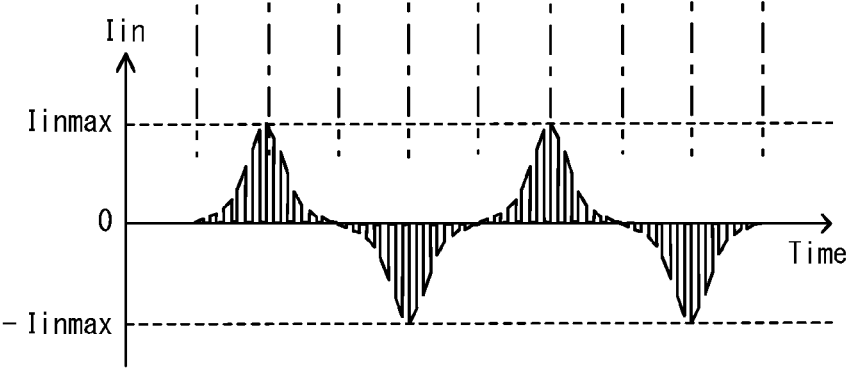

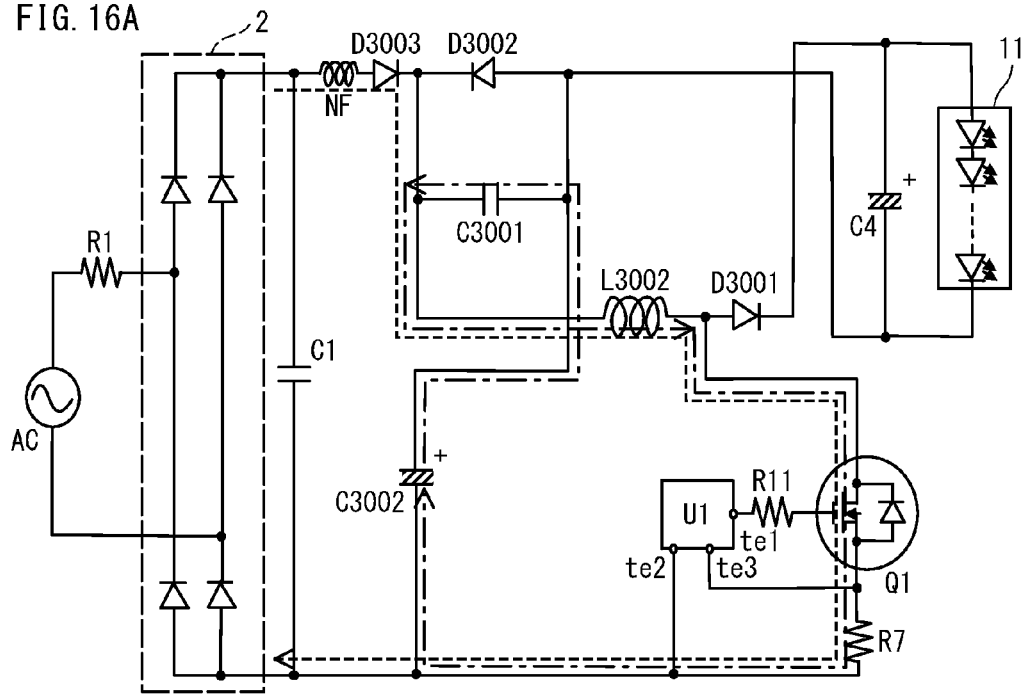
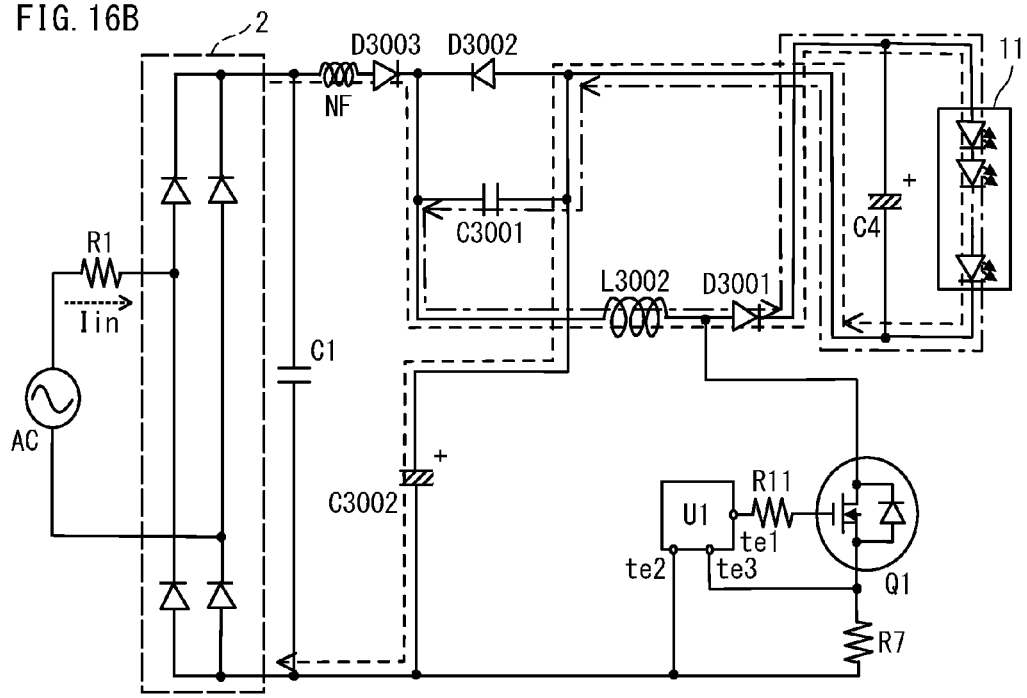

FIG. 23
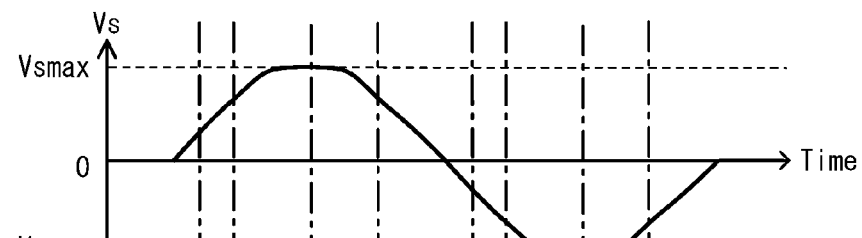
(a)
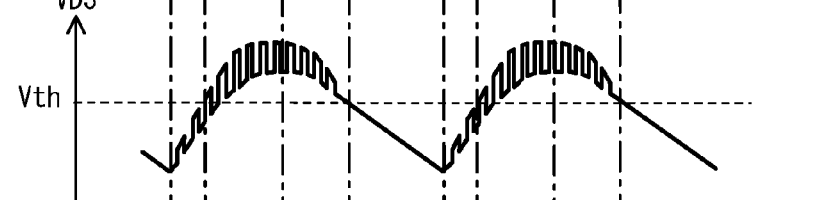
(b-1)
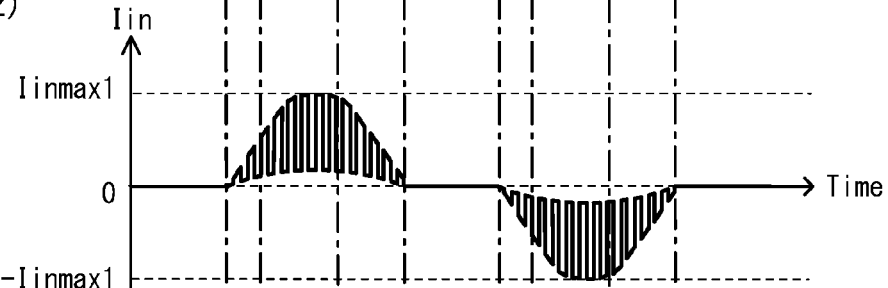
(b-2)
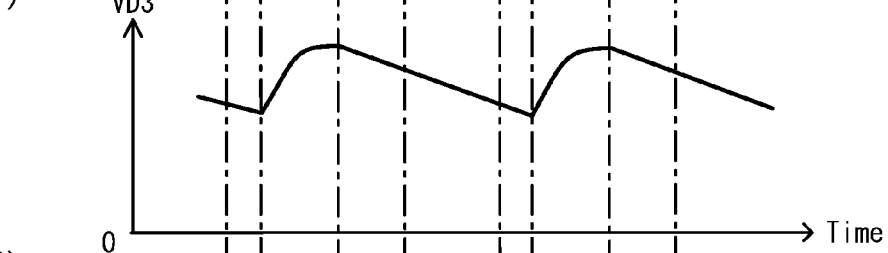
(c-1)
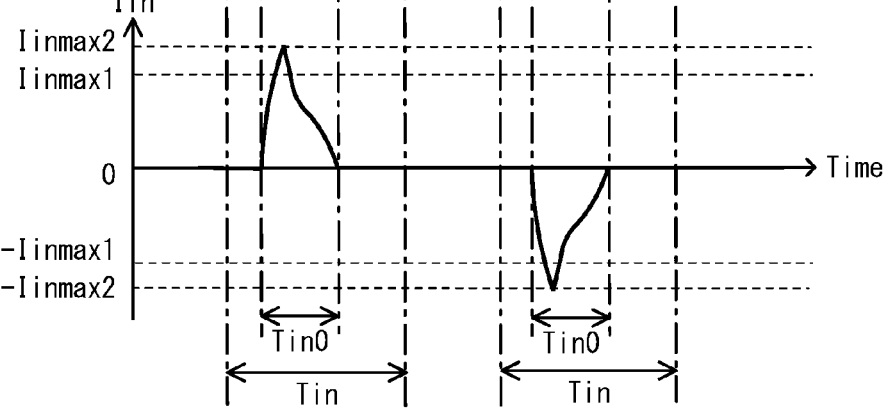
(c-2)

US 9,093,893 B2

DC POWER SUPPLY CIRCUIT

TECHNICAL FIELD

The present invention relates to a direct current (DC) power supply circuit, and in particular relates to an art of improving power factor of a circuit.

BACKGROUND ART

In recent years light emission efficiency of light-emitting diodes (LEDs) has improved to such an extent that LEDs are attracting attention as a light source for general illumination. In order to drive LEDs, a DC power supply is required.

In consideration of the above, a conventional DC power supply circuit has previously been proposed in order to convert alternating current (AC) supplied by a residential AC power supply, and thereby output DC (refer to Patent Literature 1 and 2). Patent Literature 1 recites a DC power supply circuit which includes a rectifier circuit formed from a diode bridge, a smoothing capacitor connected across output terminals of the rectifier circuit, and a voltage conversion circuit that is connected to an output terminal of the rectifier circuit.

CITATION LIST

Patent Literature

[Patent Literature 1] Japanese Unexamined Patent Application Publication No. 2005-142137
[Patent Literature 2] Japanese Unexamined Patent Application Publication No. 2011-90901

SUMMARY OF INVENTION

Technical Problem

However, when each half cycle of AC voltage is considered, in the DC power supply circuit current only flows from the AC power supply to the smoothing capacitor, via the diode bridge, during a period in which an instantaneous magnitude of an output voltage from the diode bridge is greater than a voltage across the terminals of the smoothing capacitor. In the DC power supply circuit disclosed in Patent Literature 1, a maximum value of the voltage across the terminals of the smoothing capacitor is equal to a maximum instantaneous magnitude of the output voltage from the rectifier circuit. Consequently, in a single cycle of AC supplied from the AC power supply, the voltage across the terminals of the smoothing capacitor is greater than the instantaneous magnitude of the output voltage from the diode bridge during a half cycle after the output voltage from the diode bridge reaches the maximum instantaneous magnitude. In the above situation, flow of current from the AC power supply to the smoothing capacitor, via the rectifier circuit, is cut-off. As a result, power factor has a low value of approximately 0.5.

In consideration of the problem described above, the present invention aims to provide a DC power supply circuit which enables power factor improvement.

Solution to Problem

A DC power supply circuit relating to the present invention includes: a rectifier circuit rectifying AC supplied from an AC power source; and a voltage conversion circuit receiving, as an input voltage, a voltage across an output terminal at a high-potential side of the rectifier circuit and an output terminal at a low-potential side of the rectifier circuit, and supplying, to a load, a voltage arising due to current flowing through the voltage conversion circuit along a plurality of different inter-terminal current paths that are each formed intermittently between the output terminal at the high-potential side of the rectifier circuit and the output terminal at the low-potential side of the rectifier circuit.

Advantageous Effects of Invention

Through the configuration described above, throughout each half cycle of the AC power supply, the plurality of different inter-terminal current paths are each formed intermittently between the output terminal at the high-potential side of the rectifier circuit and the output terminal of the low-potential side of the rectifier circuit. As a consequence, current continues to flow from the rectifier circuit to the voltage conversion circuit throughout each half cycle of the AC power supply, thereby improving power factor relative to the AC power supply.

BRIEF DESCRIPTION OF DRAWINGS

FIG. 4 illustrates, for the DC power supply circuit relating to the first embodiment, on-off operation of a switching element in section (a), a time series waveform of current flowing through an inductor in section (b), a time series waveform of voltage across terminals of the inductor in section (c), a time series waveform of cathode voltage of a diode in section (d), and a time series waveform of current flowing through the diode in section (e).

FIG. 11 illustrates, for the DC power supply circuit relating to the second embodiment, on-off operation of a switching element in section (a), a time series waveform of current flowing through an inductor in section (b), a time series waveform of voltage across terminals of a capacitor in section (c), a time series waveform of voltage between a cathode of a diode and an output terminal at a low-potential side of a rectifier circuit in section (d), and a time series waveform of current flowing through the diode in section (e).

FIG. 12 illustrates, for the DC power supply circuit relating to the second embodiment, on-off operation of the switching element in section (a), a time series waveform of current flowing through the inductor in section (b), a time series waveform of voltage across the terminals of the capacitor in section (c), a time series waveform of voltage between the cathode of the diode and the output terminal at the low-potential side of the rectifier circuit in section (d), and a time series waveform of current flowing through the diode in section (e).

FIG. 13 illustrates, for the DC power supply circuit relating to the second embodiment, a time series waveform of input voltage to the rectifier circuit from an AC power supply in section (a), a time series waveform of instantaneous magnitude of output voltage from the rectifier circuit in section (b), a time series waveform of voltage between the cathode of the diode and the output terminal at the low-potential side of the rectifier circuit in section (c), and a time series waveform of input current to the rectifier circuit from the AC power supply in section (d).

FIGS. 16A and 16B are circuit diagrams illustrating the DC power supply circuit relating to the third embodiment and flow of current in the DC power supply circuit.

FIG. 23 illustrates, for the DC power supply circuit relating to the third embodiment, a time series waveform of input voltage to the rectifier circuit from the AC power supply in section (a), a time series waveform of cathode voltage of the diode in section (b-1), and a time series waveform of input current to the rectifier circuit from the AC power supply in section (b-2), and illustrates, for the DC power supply circuit relating to the comparative example, a time series waveform of cathode voltage of a diode in section (c-1), and a time series waveform of input current to a rectifier circuit from an AC power supply in section (c-2).

DESCRIPTION OF EMBODIMENTS

First Embodiment

<1> Configuration

Figure 1:
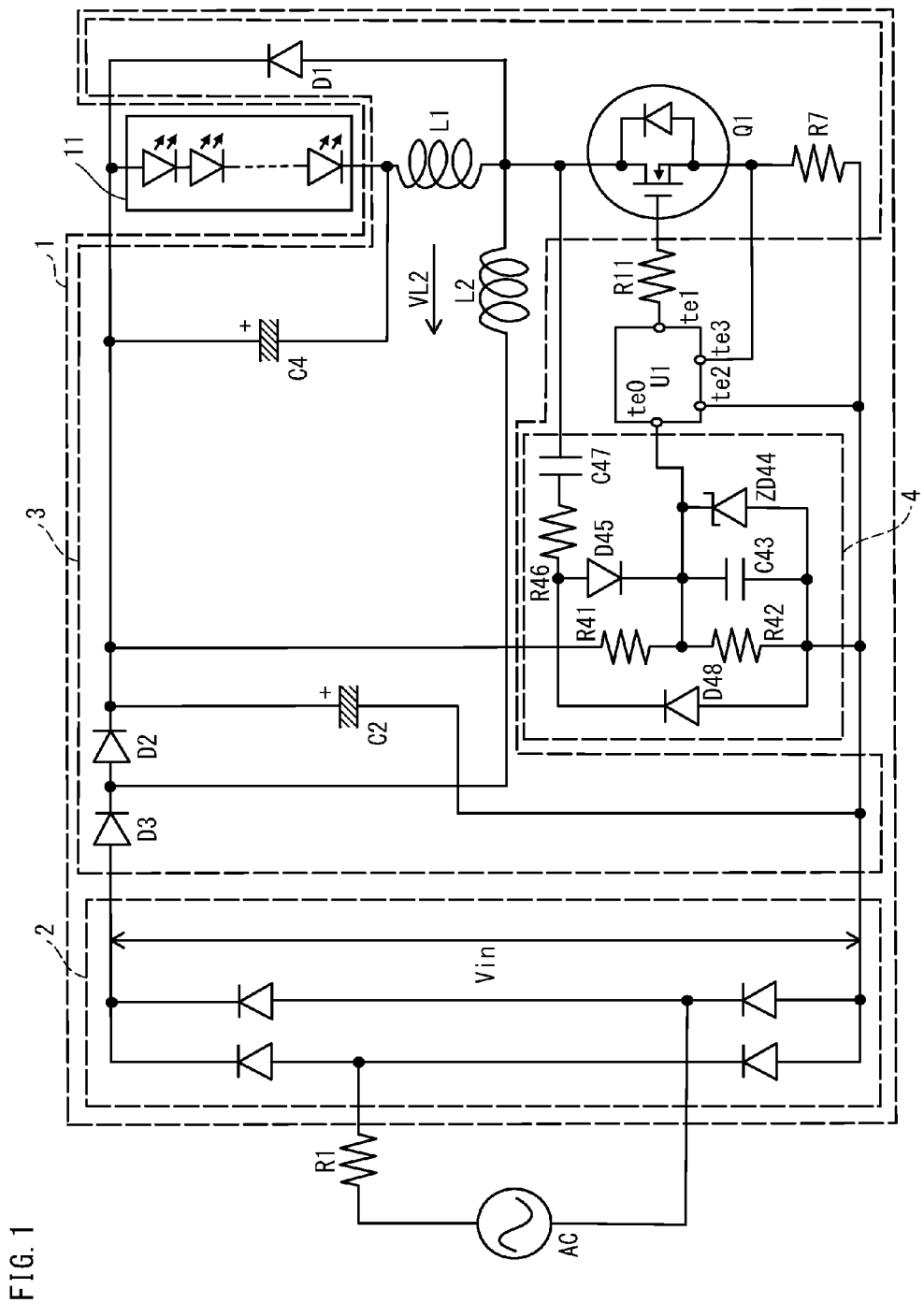
FIG. 1 is a circuit diagram illustrating a DC power supply circuit relating to a first embodiment.

FIG. 1 is a circuit diagram illustrating a DC power supply circuit 1 relating to the present embodiment.

The DC power supply circuit 1 includes a rectifier circuit 2, a voltage conversion circuit 3, a fixed voltage circuit 4, and a drive circuit U1. The rectifier circuit 2 is connected to a power supply AC which supplies alternating current. The voltage conversion circuit 3 is connected to output terminals of the rectifier circuit 2. The drive circuit U1 drives the voltage conversion circuit 3. The fixed voltage circuit 4 supplies electrical power to the drive circuit U1.

Output terminals of the voltage conversion circuit 3 are connected to a load 11, which is formed by a plurality of LEDs connected in series relative to one another. A voltage across terminals of the load 11 is determined by the number of LEDs included in the load 11. In terms of the above, the load 11 differs from a load which has resistive impedance such as a fluorescent lamp.

The power supply AC outputs AC at a voltage which for example has an actual value of 100 V. A current-limiting resistor R1 is connected between the power supply AC and the rectifier circuit 2 in order to prevent excessive current flowing from the power supply AC to the rectifier circuit 2.

<1-1> Rectifier Circuit

The rectifier circuit 2 is a diode bridge formed from four diodes.

<1-2> Voltage Conversion Circuit

The voltage conversion circuit 3 is a step-down chopper circuit that includes a switching element Q1, inductors L1 and L2, diodes D1, D2, and D3, capacitors C2 and C4, and a resistor R7.

A first terminal of the capacitor C2 is connected to an output terminal at a low-potential side of the rectifier circuit 2. The capacitor C2 is an electrolytic capacitor. Note that the capacitor C2 may for example alternatively be a high dielectric constant ceramic capacitor or a film capacitor.

A first terminal of the inductor (first inductor) L1 is connected to a second terminal of the capacitor C2, via the load 11.

The switching element Q1 is an N-channel MOSFET. A source of the switching element Q1 is connected to the output terminal at the low-potential side of the rectifier circuit 2, via the resistor R7, a gate of the switching element Q1 is connected to the drive circuit U1, via a resistor R11, and a drain of the switching element Q1 is connected to a second terminal of the inductor L1. The resistor R7 is provided in order to detect a drain current flowing in the switching element Q1 based on a voltage across terminals of the resistor R7.

An anode of the diode (first unidirectional element) D1 is connected to the second terminal of the inductor L1 and a cathode of the diode D1 is connected to the second terminal of the capacitor C2.

A first terminal of the inductor (second inductor) L2 is connected to the second terminal of the inductor L1 and a second terminal of the inductor L2 is connected to a cathode of the diode (third unidirectional element) D3.

An anode of the diode (second unidirectional element) D2 is connected to the second terminal of the inductor L2 and a cathode of the diode D2 is connected to the second terminal of the capacitor C2.

An anode of the diode D3 is connected to an output terminal at a high-potential side of the rectifier circuit 2 and the cathode of the diode D3 is connected to the second terminal of the inductor L2 and the anode of the diode D2.

The diode D3 is provided in order to prevent current from flowing toward the rectifier circuit 2 from the second terminal of the inductor L2. When the DC power supply circuit 1 starts up, the diode D2 is in a conducting state, thus enabling an inrush current to flow into the capacitor C2 from the output terminal at the high-potential side of the rectifier circuit 2, via the diodes D3 and D2 in respective order, thereby charging the capacitor C2.

The capacitor C4 is connected across terminals of the load 11. The capacitor C4 is provided in order to smooth a voltage applied to the load 11.

<1-3> Drive Circuit

The drive circuit U1 outputs a control signal having a rectangular voltage waveform in order to drive the switching element Q1 through pulse width modulation (PWM) control (herein, the control signal is referred to as a PWM signal).

The drive circuit U1 includes a power supply terminal te0, an output terminal te1, a grounding terminal te2, and a current detection terminal te3 which is provided in order to detect the drain current flowing in the switching element Q1. The power supply terminal te0 is connected across output terminals of the fixed voltage circuit 4. The grounding terminal te2 is connected to the output terminal at the low-potential side of the rectifier circuit 2. The output terminal te1 is connected to the gate of the switching element Q1, via the resistor R11. The current detection terminal te3 is connected between the source of the switching element Q1 and the resistor R7.

The drive circuit U1 inputs the PWM signal to the gate of the switching element Q1. The drive circuit U1 adjusts pulse width of the PWM signal in order that the drain current flowing in the switching element Q1, which is detected through the current detection terminal te3, becomes constant. Adjustment of the pulse width of the PWM signal alters a period during which a gate voltage of the switching element Q1 is maintained at least equal to a turn-on voltage of the switching element Q1, and a period during which the gate voltage of the switching element Q1 is maintained at lower than the turn-on voltage of the switching element Q1 (i.e., maintained at approximately 0 V). Note that the term "turn-on voltage of the switching element Q1" refers to a voltage required between the gate and the source of the switching element Q1 in order to turn on the switching element Q1. Herein, a period during which the switching element Q1 is maintained in a turned-on state is referred to as a turned-on period. Also, a period during which the gate voltage of the switching element Q1 is maintained at approximately 0 V, which in other words is a period during which the switching element Q1 is maintained in a turned-off state, is referred to as a turned-off period. During a single cycle of on-off operation of the switching element Q1, a proportion of the cycle which is made up of the turned-on period is referred to as an "on-duty proportion". Thus, the drive circuit U1 drives the switching element Q1 through fixed current control by altering the on-duty proportion.

<1-4> Fixed Voltage Circuit

The fixed voltage circuit 4 includes resistors R41 and R42, a capacitor C43, and a zener diode ZD44. The resistors R41 and R42 are connected in series across the output terminals of the rectifier circuit 2. A first terminal of the resistor R41 is connected to the output terminal at the high-potential side of the rectifier circuit 2. The resistor R42 is connected between a second terminal of the resistor R41 and the output terminal at the low-potential side of the rectifier circuit 2. The capacitor C43 is connected across terminals of the resistor R42. An anode of the zener diode ZD44 is connected to the output terminal at the low-potential side of the rectifier circuit 2 and a cathode of the zener diode ZD44 is connected to a node between the resistors R41 and R42, and to the power supply terminal te0 of the drive circuit U1. Through the configuration described above, electric potential of the power supply terminal te0 of the drive circuit U1 is maintained at a fixed electric potential arising at the cathode of the zener diode ZD44.

The fixed voltage circuit 4 also includes a capacitor C47, a resistor R46, and diodes D45 and D48. A first terminal of the capacitor C47 is connected to the second terminal of the inductor L1 and the first terminal of the inductor L2. An anode of the diode D45 is connected to a second terminal of the capacitor C47, via the resistor R46, and a cathode of the diode D45 is connected to the power supply terminal te0 of the drive circuit U1. A cathode of the diode D48 is connected to a node between the resistor R46 and the diode D45, and an anode of the diode D48 is connected to the output terminal at the low-potential side of the rectifier circuit 2. The diode D48 has a function of enabling discharge of electrical charge from the capacitor C47. Through the configuration described above, the capacitor C47 is charged during each turned-off period of the switching element Q1 through current supplied from the inductors L1 and L2, and the capacitor C47 is discharged during each turned-on period of the switching element Q1, thereby enabling electrical charge accumulated in the capacitor C47 to be transferred to the capacitor C43. Consequently, the above configuration enables electrical power to be supplied from the voltage conversion circuit 3 to the power supply terminal te0 of the drive circuit U1.

<2> Operation

The following explains operation of the DC power supply circuit relating to the present embodiment.

When the DC power supply circuit 1 starts up, the switching element Q1 is in the turned-off state and upon voltage being input to the voltage conversion circuit 3 from the rectifier circuit 2, charging current flows into the capacitor C2 from the output terminal at the high-potential side of the rectifier circuit 2, via the diodes D3 and D2. Through the above configuration, the capacitor C2 is charged to a voltage which is approximately equal to an instantaneous magnitude of an output voltage from the rectifier circuit 2. Subsequently, during normal operation of the DC power supply circuit 1, current paths explained below are formed in accordance with on-off operation of the switching element Q1 in the DC power supply circuit 1.

Figure 2A:
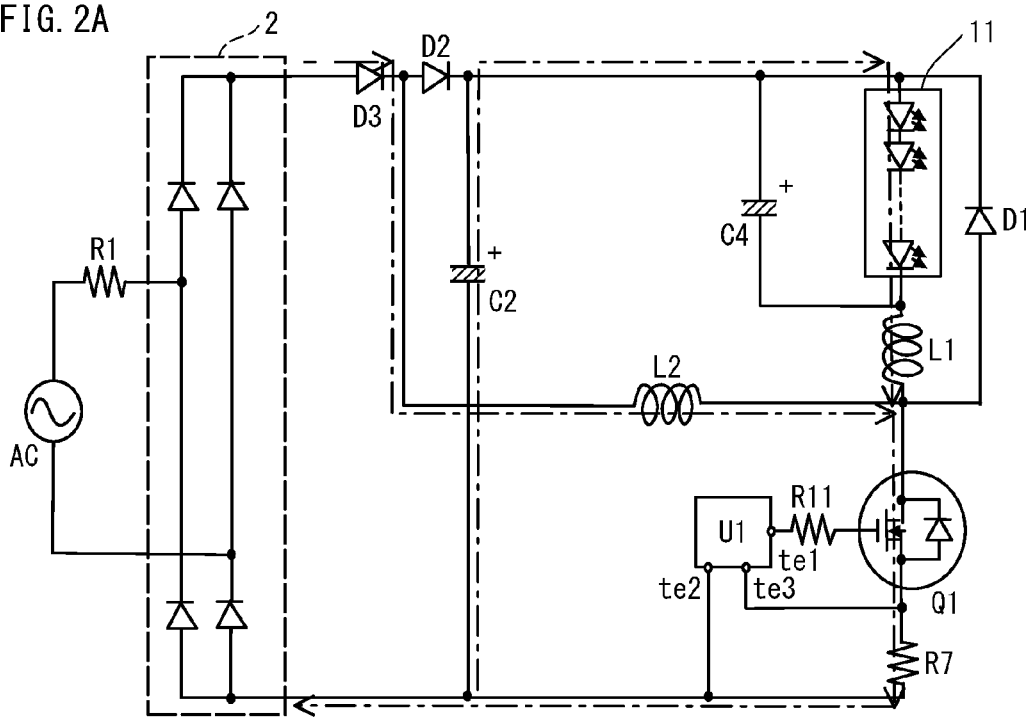
FIGS. 2A and 2B are circuit diagrams illustrating the DC power supply circuit relating to the first embodiment and flow of current in the DC power supply circuit.
Figure 2B:
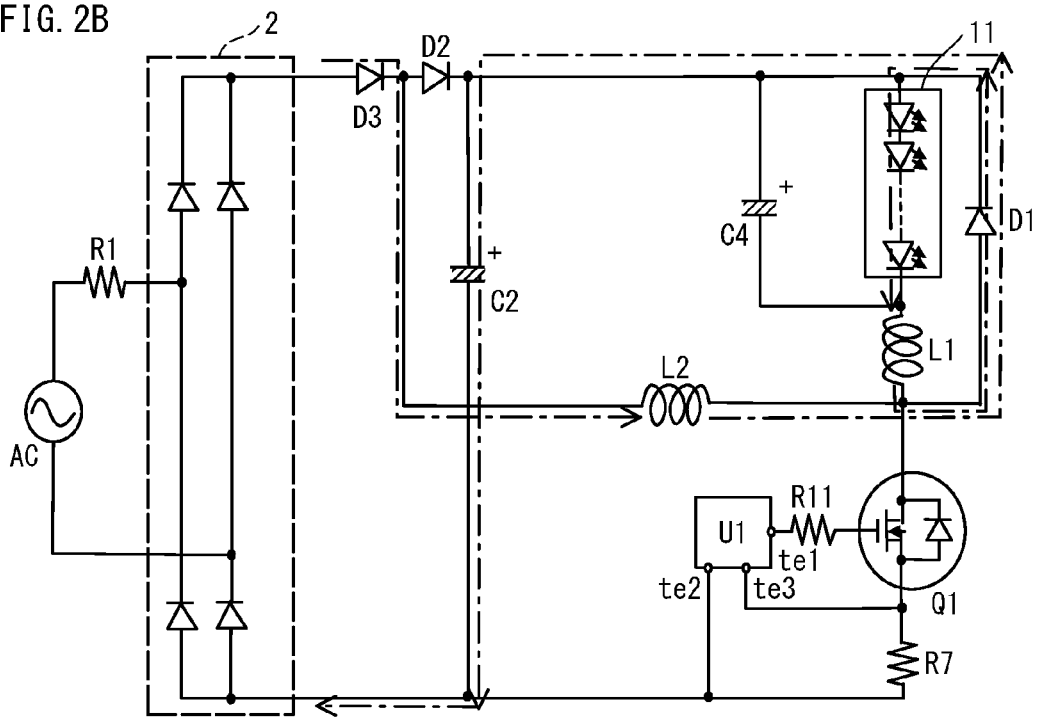
Figure 3:
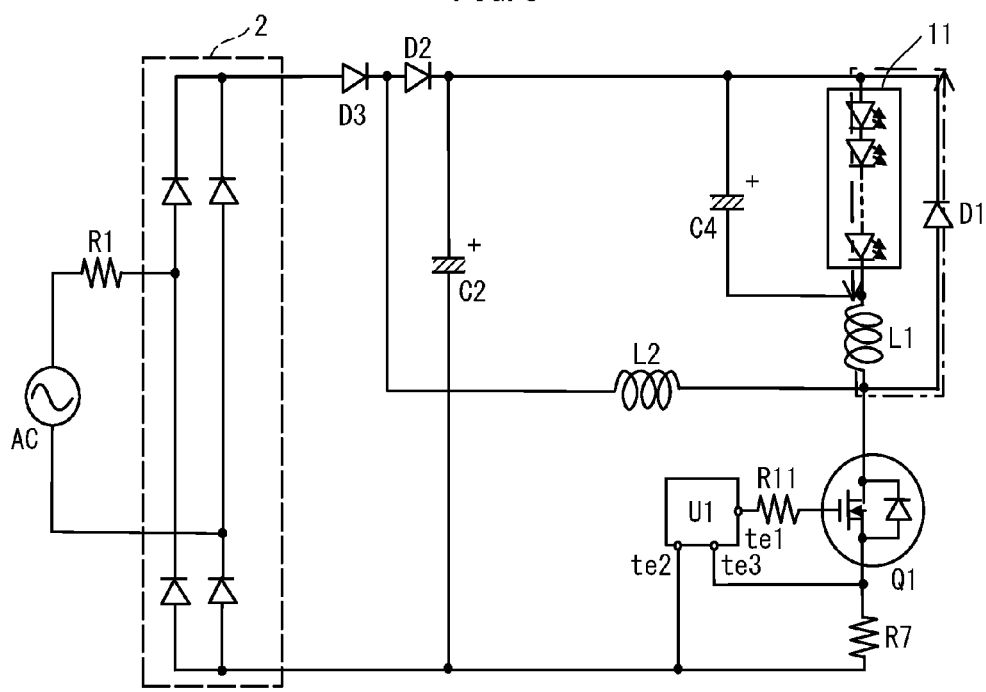
FIG. 3 is a circuit diagram illustrating the DC power supply circuit relating to the first embodiment and flow of current in the DC power supply circuit.

FIGS. 2A, 2B, and 3 are circuit diagrams illustrating the DC power supply circuit 1 relating to the present embodiment and flow of current in the DC power supply circuit 1.

FIG. 2A illustrates flow of current during a turned-on period of the switching element Q1, and FIGS. 2B and 3 illustrate flow of current during a turned-off period of the switching element Q1.

As illustrated in FIG. 2A, upon the switching element Q1 being turned on, a current path (herein, referred to as a first current path) is formed that extends from the output terminal at the high-potential side of the rectifier circuit 2 to the output terminal at the low-potential side of the rectifier circuit 2, via the diode D3, the inductor L2, the switching element Q1, and the resistor R7 in respective order. At the same time, a current path (herein, referred to as a second current path) is formed that extends from the second terminal of the capacitor C2 to the first terminal of the capacitor C2, via the load 11, the inductor L1, the switching element Q1, and the resistor R7 in respective order. Flow of current along the first current path causes accumulation of magnetic energy in the inductor L2.

Electrical charge accumulated in the capacitor C2 during a preceding turned-off period of the switching element Q1 is discharged along the second current path. Discharge from the capacitor C2 along the second current path causes accumulation of magnetic energy in the inductor L1. During the turned-off period of the switching element Q1, a voltage VC2 across the terminals of the capacitor C2 increases to greater than an instantaneous magnitude Vin of an output voltage from the rectifier circuit 2, due to current flowing from the inductor L2 to the capacitor C2, via the diode D1, in accompaniment to discharge of the magnetic energy accumulated in the inductor L2. Consequently, the diode D2 is in a non-conducting state and flow of current from the high-potential side of the rectifier circuit 2 to the capacitor C2, via the diode D2, is cut-off.

As illustrated in FIG. 2B, upon the switching element Q1 being turned-off, a current path (herein, referred to as a third current path) is formed that extends from the output terminal at the high-potential side of the rectifier circuit 2 to the output terminal at the low-potential side of the rectifier circuit 2, via the diode D3, the inductor L2, the diode D1, and the capacitor C2 in respective order. Thus, in the above situation, the inductor L2 functions as a voltage source that causes current to flow along the third current path.

At the same time, a current path (herein, referred to as a fourth current path) is formed that extends from the second terminal of the inductor L1 to the first terminal of the inductor L1, via the diode D1 and the load 11 in respective order. Current flowing along the third current path causes charging of the capacitor C2 in accompaniment to discharge of the magnetic energy accumulated in the inductor L2. The voltage VC2 across the terminals of the capacitor C2 increases to greater than a voltage VD3 between the cathode of the diode D3 and the output terminal at the low-potential side of the rectifier circuit 2 (herein, referred to as a cathode voltage of the diode D3) by an amount equal to a voltage across the terminals of the inductor L2. In other words, the voltage VC2 is greater than the voltage VD3 by an amount corresponding to voltage increase due to energy accumulated in the inductor L2. Through the configuration described above, the voltage VC2 across the terminals of the capacitor C2 increases to greater than the instantaneous magnitude of the output voltage from the rectifier circuit 2. Also, the magnetic energy accumulated in the inductor L1 is discharged to the load 11 through current flowing along the fourth current path.

As illustrated in FIG. 3, upon subsequent completion of discharge of the magnetic energy accumulated in the inductor L2, current flowing along the third current path is cut-off and current continues to flow along the fourth current path until completion of discharge of the magnetic energy accumulated in the inductor L1. Once discharge of the magnetic energy from the inductor L1 is complete, electrical charge accumulated in the capacitor C4 continues to be discharged to the load 11. The DC power supply circuit 1 subsequently repeats the operation described above, with reference to FIGS. 2A, 2B, and 3, in accordance with on-off operation of the switching element Q1.

As explained above, in the DC power supply circuit 1, current flows through the load 11 along the second current path upon the switching element Q1 switching to the turned-on state and current flows through the load 11 along the fourth current path upon the switching element Q1 switching to the turned-off state. In other words, the DC power supply circuit 1 is not only a voltage step-up circuit, but also supplies current to the load 11 along a current path other than a discharge path from the capacitor C4, not only during the turned-on period of the switching element Q1, but also during the turned-off period of the switching element Q1.

Furthermore, the capacitor C2 is charged as necessary through current flowing along the third current path each time the switching element Q1 is turned off. The configuration described above enables reduced variation in the voltage across the terminals of the capacitor C2, thereby suppressing variation in current flowing through the load 11 along the second current path from the second terminal of the capacitor C2. As a consequence, the DC power supply circuit 1 operates in a manner such that variation in current flowing through the load 11 is relatively small.

The following explains power factor of the DC power supply circuit 1 with reference to time series waveforms of a current IL2 flowing through the inductor L2, a voltage VL2 across the terminals of the inductor L2, the cathode voltage VD3 of the diode D3, and a current ID3 flowing through the diode D3.

Section (a) of FIG. 4 illustrates on-off operation of the switching element Q1 in the DC power supply circuit 1. Section (b) of FIG. 4 illustrates a time series waveform of the current IL2 flowing through inductor L2. Section (c) in FIG. 4 illustrates a time series waveform of the voltage VL2 across the terminals of the inductor L2. Section (d) of FIG. 4 illustrates a time series waveform of the cathode voltage VD3 of the diode D3. Section (e) of FIG. 4 illustrates a time series waveform of the current ID3 flowing through the diode D3. In section (c) of FIG. 4, the voltage VL2 across the terminals of the inductor L2 is illustrated as being positive when electric potential at the second terminal of the inductor L2 is greater than electric potential at the first terminal of the inductor L2.

Upon the switching element Q1 being turned on, the current IL2 starts to flow along the first current path from the output terminal at the high-potential side of the rectifier circuit 2, passing through the diode D3, the inductor L2, and the switching element Q1 (time T0 in sections (a) and (b) of FIG. 4). Subsequently, during the turned-on period of the switching element Q1, the current IL2 gradually increases to a current magnitude IL11 (period between times T0 and T1 in sections (a) and (b) of FIG. 4). During the above, the voltage VL2 across the terminals of the inductor L2 is maintained at lower than the instantaneous magnitude Vin of the output voltage from the rectifier circuit 2 by an amount equal to the sum (Von+Vα) of a turn-on voltage Von of the diode D3 and a certain voltage Vα (period between times T0 and T1 in section (c) of FIG. 4). Note that the voltage Vα is equal to the sum of a source-drain voltage of the switching element Q1 and a voltage drop across the resistor R7. Also, during the above, the cathode voltage VD3 of the diode D3 is maintained at a magnitude equal to the sum of the voltage VL2 across the terminals of the inductor L2 and the voltage Vα (period between times T0 and T1 in section (d) of FIG. 4). In other words, the cathode voltage VD3 of the diode D3 is maintained at lower than the instantaneous magnitude Vin of the output voltage from the rectifier circuit 2 by an amount equal to the turn-on voltage Von of the diode D3. At the same time, a current ID30 continues to flow through the diode D3 (period between times T0 and T1 in section (e) of FIG. 4).

Next, upon the switching element Q1 being turned off, the current IL2 flowing through the inductor L2 gradually decreases from the current magnitude IL11 in accompaniment to discharge of magnetic energy accumulated in the inductor L2 (period between times T1 and T2 in sections (a) and (b) of FIG. 4). During the above, in terms of the voltage VL2 across the terminals of the inductor L2, electric potential at the second terminal of the inductor L2 becomes lower than electric potential at the first terminal of the inductor L2 (i.e., the voltage VL2 becomes negative), and an absolute value of the voltage VL2 is maintained at lower than the voltage VC2 across the terminals of the capacitor C2 by an amount equal to the instantaneous magnitude Vin of the output voltage from the rectifier circuit 2 (i.e., at a voltage VC2−Vin) (period between times T1 and T2 in section (c) of FIG. 4). During the above, the cathode voltage VD3 of the diode D3 is maintained constant at lower than the instantaneous magnitude Vin of the output voltage from the rectifier circuit 2 by the amount equal to the turn-on voltage Von of the diode D3. The current IL2 continues to flow through the inductor L2. Thus, the current ID30 also continues to flow through the diode D3 (period between times T1 and T2 in section (e) of FIG. 4).

Upon subsequent completion of discharge of the magnetic energy accumulated in the inductor L2, current flowing along the third current path is cut-off (period between times T2 and T3 in section (b) of FIG. 4). During the above, current continues to flow along the fourth current path in accompaniment to discharge of the magnetic energy accumulated in the inductor L1. Also, the cathode voltage VD3 of the diode D3 is maintained at approximately equal to the voltage VC2 across the terminals of the capacitor C2 (period between times T2 and T3 in section (d) of FIG. 4), and flow of current through the diode D3 is cut-off (period between times T2 and T3 in section (e) of FIG. 4).

Upon the switching element Q1 being turned on once again, the current IL2 starts to flow through the inductor L2 (time T3 in sections (a) and (b) of FIG. 4). The phenomenon described above with reference to FIG. 4 is subsequently repeated in accordance with on-off operation of the switching element Q1.

As explained above, in one cycle of on-off operation of the switching element Q1 (herein, referred to as one operation cycle), a period during which current flows from the power supply AC to the voltage conversion circuit 3, via the rectifier circuit 2 (herein, referred to as a current in-flow period), is equivalent to a period during which the current ID30 flows through the diode D3. The aforementioned period during which the current ID30 flows through the diode D3, which is in other words the current in-flow period, is equivalent to the sum of the turned-on period of the switching element Q1 and a period between the switching element Q1 being turned off and completion of discharge of the magnetic energy accumulated in the inductor L2 (refer to FIG. 4). In a configuration in which the drive circuit U1 performs fixed peak current control, the current in-flow period varies in accordance with the instantaneous magnitude Vin of the output voltage from the rectifier circuit 2.

Figure 5:
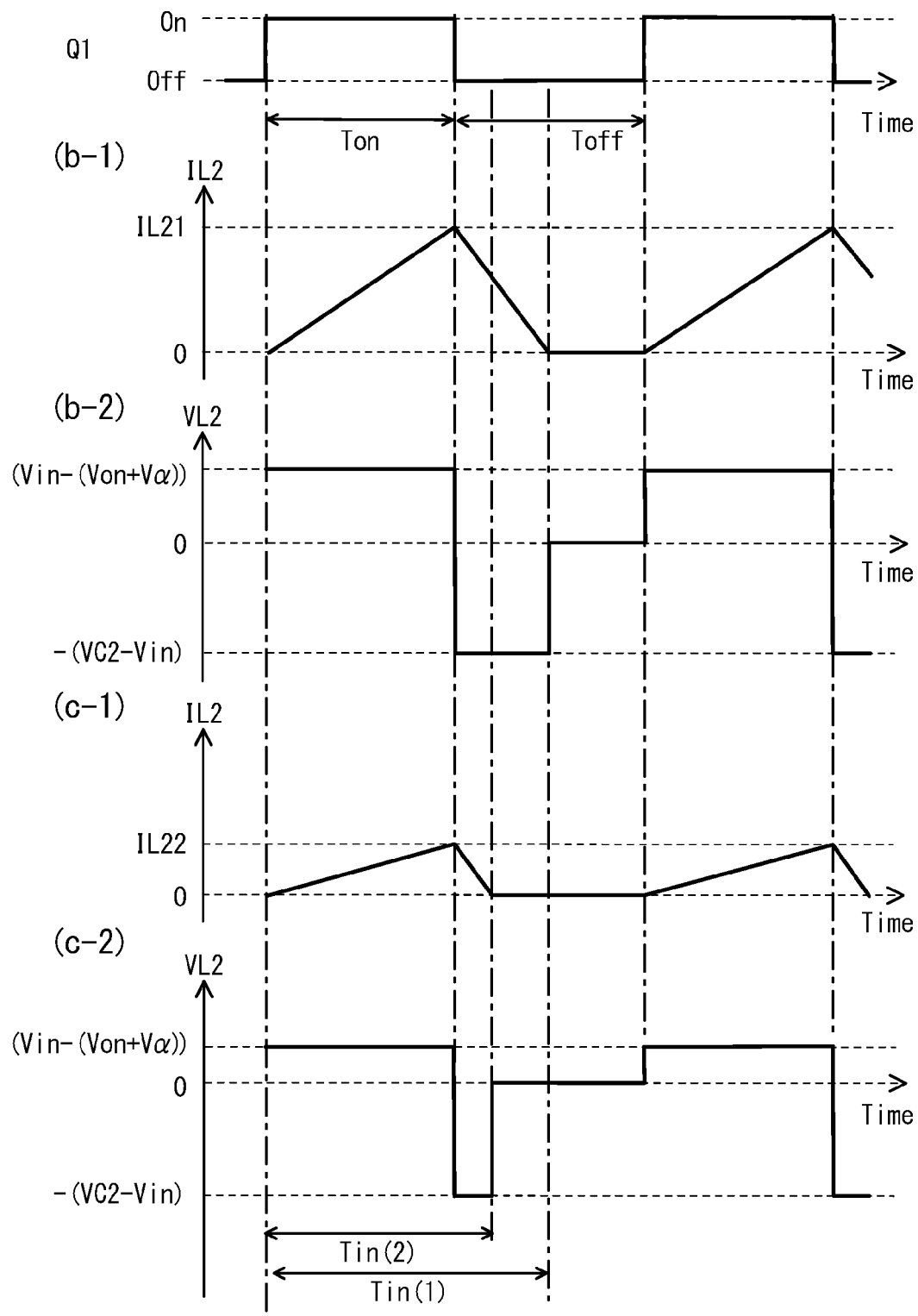
FIG. 5 illustrates, for the DC power supply circuit relating to the first embodiment, on-off operation of the switching element in section (a), a time series waveform of current flowing through the inductor in section (b-1), a time series waveform of voltage across the terminals of the inductor in section (b-2), a time series waveform of current flowing through the inductor in section (c-1), and a time series waveform of voltage across the terminals of the inductor in section (c-2).

Section (a) of FIG. 5 illustrates on-off operation of the switching element Q1 in the DC power supply circuit 1. Section (b-1) of FIG. 5 illustrates a time series waveform of the current IL2 flowing through the inductor L2 when the instantaneous magnitude Vin of the output voltage from the rectifier circuit 2 is a first voltage which is greater than 0 V. Section (b-2) of FIG. 5 illustrates a time series waveform of the voltage VL2 across the terminals of the inductor L2 when the instantaneous magnitude Vin of the output voltage from the rectifier circuit 2 is the first voltage. Section (c-1) illustrates a time series waveform of the current IL2 flowing through the inductor L2 when the instantaneous magnitude Vin of the output voltage from the rectifier circuit 2 is a second voltage which is greater than 0 V and less than the first voltage. Section (c-2) of FIG. 5 illustrates a time series waveform of the voltage VL2 across the terminals of the inductor L2 when the instantaneous magnitude Vin of the output voltage from the rectifier circuit 2 is the second voltage.

As can be seen from FIG. 5, a current in-flow period Tin(2) when the instantaneous magnitude Vin of the output voltage of the rectifier circuit 2 is the second voltage is shorter than a current in-flow period Tin(1) when the instantaneous magnitude Vin of the output voltage from the rectifier circuit 2 is the first voltage. The following explains reasoning behind the observation described above.

When the instantaneous magnitude Vin of the output voltage from the rectifier circuit 2 is the second voltage, a rate of increase in the current IL2 flowing through the inductor L2 is smaller, and thus a smaller amount of magnetic energy accumulates in the inductor L2 per unit time compared to when the instantaneous magnitude Vin of the output voltage from the rectifier circuit 2 is the first voltage. Reduction in the amount of magnetic energy accumulated in the inductor L2 results in a corresponding reduction in length of the period between the switching element Q1 being turned-off and completion of discharge of the magnetic energy accumulated in the inductor L2. In other words, compared to when the instantaneous magnitude Vin of the output voltage from the rectifier circuit 2 is the first voltage, when the instantaneous magnitude Vin of the output voltage is the second voltage, the amount of magnetic energy accumulated in the inductor L2 is reduced and the length of a period during which the magnetic energy is discharged is reduced, thereby reducing the length of a current in-flow period Tin. For the reasons described above, less time is necessary for discharge of the magnetic energy accumulated in the inductor L2 when the instantaneous magnitude Vin of the output voltage from the rectifier circuit 2 is the second voltage, compared to when the instantaneous magnitude Vin of the output voltage is the first voltage. Therefore, a period during which current continues to flow through the inductor L2, which in other words is a period during which current continues to flow through the diode D3, is shortened when the instantaneous magnitude Vin of the output voltage from the rectifier circuit 2 is the second voltage.

Note that the period during which current flowing through the inductor L2 gradually increases is relatively long compared to the period during which current flowing through the inductor L2 gradually decreases. The following explains reasoning behind the observation described above.

During the turned-on period of the switching element Q1, current flowing into the switching element Q1 from the inductor L2 and current flowing into the switching element Q1 from the second terminal of the capacitor C2, via the load 11 and the inductor L1, are for example limited by resistance of the switching element Q1 when in the turned-on state and resistance of the resistor R7. As a consequence, a relatively long period of time elapses before the current IL2, flowing through the inductor L2, reaches a current magnitude IL21 or IL22.

On the other hand, during the turned-off period of the switching element Q1, current limiting elements such as the switching element Q1 and the resistor R7 are not present in a current path along which current flows in accompaniment to discharge of the magnetic energy accumulated in the inductor L2. As a consequence, the magnetic energy accumulated in the inductor L2 is discharged relatively quickly, and thus only a comparatively short period of time elapses before the current IL2 no longer flows through the inductor L2.

Note that the instantaneous magnitude Vin of the output voltage from the rectifier circuit 2 exhibits pulsating variation. The current in-flow period Tin also changes in accompaniment to variation in the instantaneous magnitude Vin of the output voltage from the rectifier circuit 2.

Figure 6:
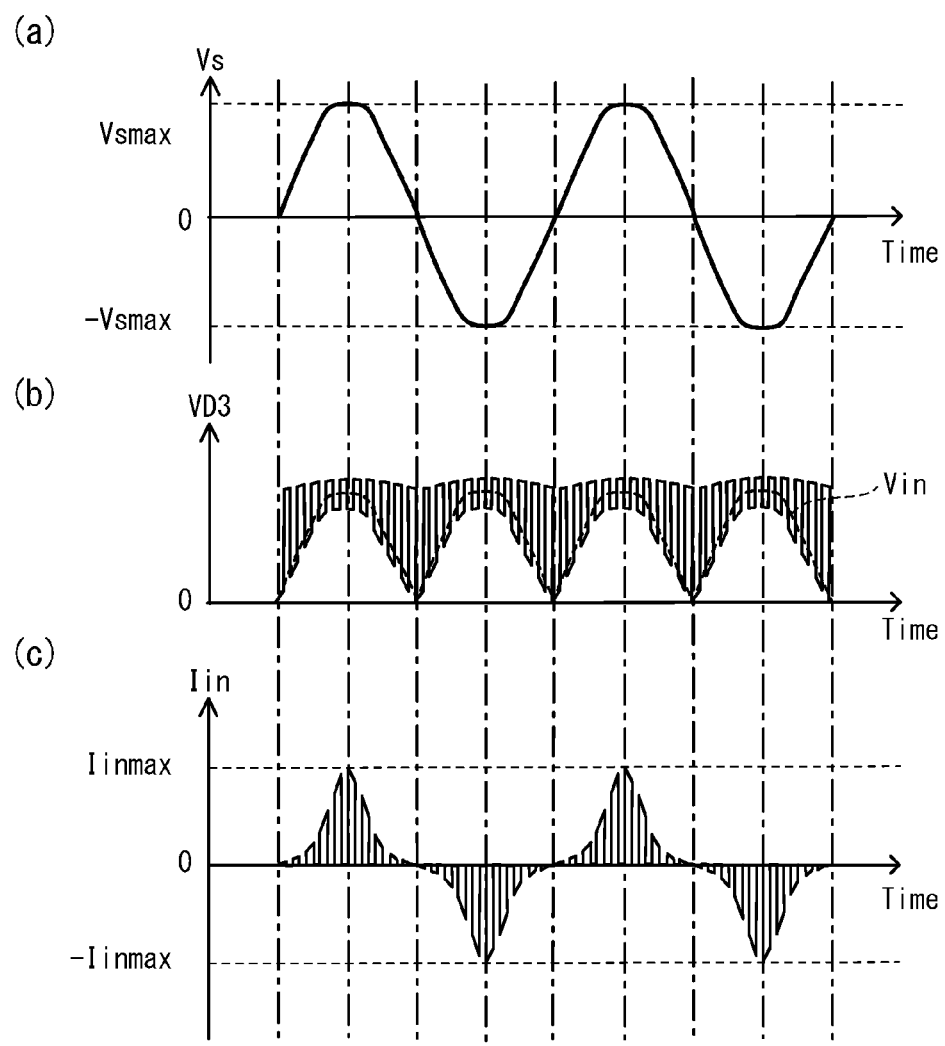
FIG. 6 illustrates, for the DC power supply circuit relating to the first embodiment, a time series waveform of input voltage to a rectifier circuit from an AC power supply in section (a), a time series waveform of cathode voltage of the diode in section (b), and a time series waveform of current flowing through the diode in section (c).

Section (a) of FIG. 6 illustrates a time series waveform of an input voltage Vs to the rectifier circuit 2 of the DC power supply circuit 1 from the power supply AC. Section (b) of FIG. 6 illustrates a time series waveform of the cathode voltage VD3 of the diode D3. Section (c) of FIG. 6 illustrates a time series waveform of a current Iin flowing into the voltage conversion circuit 3 from the power supply AC, via the rectifier circuit 2. Note that a dashed line in section (b) of FIG. 6 illustrates a time series waveform of the instantaneous magnitude Vin of the output voltage from the rectifier circuit 2.

The time series waveform of the input voltage Vs to the rectifier circuit 2 from the power supply AC has a sinusoidal shape (refer to section (a) of FIG. 6), and the time series waveform of the instantaneous magnitude Vin of the output voltage from the rectifier circuit 2 has a pulsating shape, maximums of which correspond to maximums of an absolute value of the input voltage Vs (refer to the dashed line in section (b) of FIG. 6).

The cathode voltage VD3 of the diode D3 varies between the voltage VC2, which is greater than the instantaneous magnitude Vin of the output voltage from the rectifier circuit 2, and the voltage (Vin−Von), which is lower than the instantaneous magnitude Vin of the output voltage (refer to section (b) of FIG. 6). When the cathode voltage VD3 is the voltage VC2, which is greater than the instantaneous magnitude Vin of the output voltage from the rectifier circuit 2, flow of the current Iin from the power supply AC to the voltage conversion circuit 3, via the rectifier circuit 2, is cut-off. On the other hand, when the cathode voltage VD3 is lower than the instantaneous magnitude Vin of the output voltage from the rectifier circuit 2, the current Iin continues to flow from the power supply AC to the voltage conversion circuit 3, via the rectifier circuit 2. The cathode voltage VD3 is synchronized with on-off cycles of the switching element Q1, and thus the input current Iin has a pulse shaped time series waveform which is synchronized with on-off cycles of the switching element Q1 (refer to section (c) of FIG. 6).

As illustrated in section (c) of FIG. 6, in the DC power supply circuit 1, the current Iin continues to flow intermittently from the power supply AC to the rectifier circuit 2 throughout each half cycle of the input voltage Vs. Therefore, power factor can be improved compared to a configuration (herein, referred to as a comparative example) in which flow of current from the power supply AC to the voltage conversion circuit 3, via the rectifier circuit 2, is cut-off during each half cycle of input voltage Vs once the instantaneous magnitude of the output voltage from the rectifier circuit 2 reaches a maximum. Also, magnitude of current flowing through the inductor L2 increases in accordance with increasing instantaneous magnitude Vin of the output voltage from the rectifier circuit 2, and consequently magnitude of current flowing through the diode D3 also increases. The above is reflected by the time series waveform of the input current Iin which exhibits a maximum, in terms of an absolute value thereof, close to a time at which the instantaneous magnitude Vin of the output voltage from the rectifier circuit 2 exhibits a maximum, in terms of an absolute value thereof (refer to section (c) of FIG. 6). The time series waveform of the input current Iin being similar to the time series waveform of the input voltage Vs as described above is a major cause of power factor improvement. In fact, a DC power supply circuit relating to the comparative example achieves a power factor of approximately 0.50 to 0.61, whereas the DC power supply circuit 1 relating to the present embodiment easily achieves an improved power factor of approximately 0.86, without any special control, when electrical power of 3.47 W is input to the DC power supply circuit 1 from the power supply AC.

Note that the amount of time necessary for the magnetic energy accumulated in the inductor L2 to be completely discharged changes in accordance with the instantaneous magnitude Vin of the output voltage from the rectifier circuit 2. In a configuration in which the drive circuit U1 drives the switching element Q1 by fixed voltage control, on-duty proportion and length of one operation cycle of the switching element Q1 also change. Thus, the DC power supply circuit 1 is not limited to operating in a mode in which a period occurs during which current does not flow through the inductor L2 (i.e., a so called discontinuous mode), such as explained which reference to FIG. 5. For example, alternatively the DC power supply circuit 1 may be operated in a mode in which the amount of time necessary for the magnetic energy accumulated in the inductor L2 to be completely discharged is equal to length of the turned-on period of the switching element Q1 (i.e., a so called critical mode of current in the inductor L2). Further alternatively, the DC power supply circuit 1 may be operated in a mode in which the amount of time necessary for the magnetic energy accumulated on the inductor L2 to be completely discharged is greater in length than the turned-on period of the switching element Q1 (i.e., a so called continuous mode of current in the inductor L2).

Figure 7:
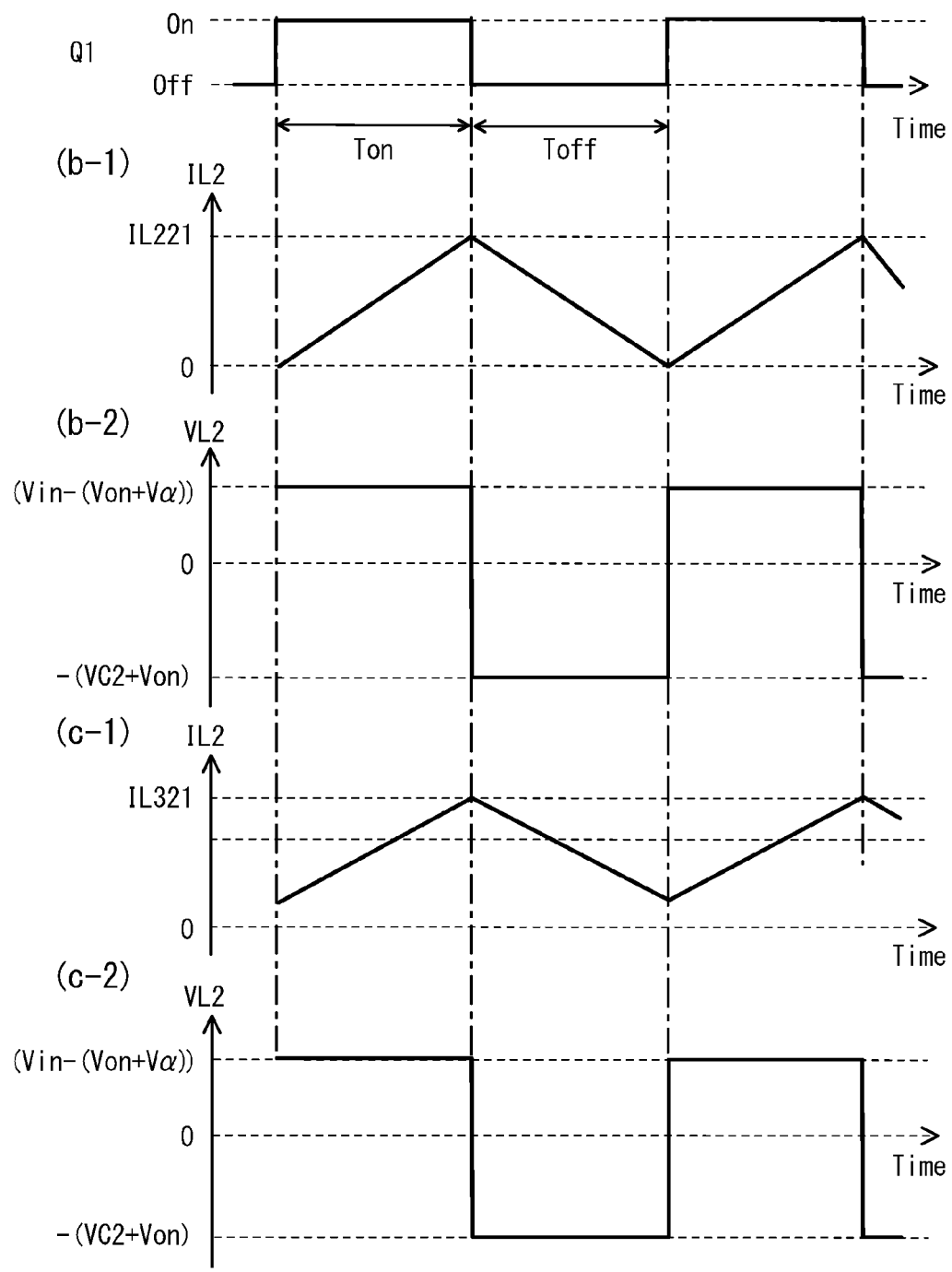
FIG. 7 illustrates, for the DC power supply circuit relating to the first embodiment, on-off operation of the switching element in section (a), a time series waveform of current flowing through the inductor in section (b-1), a time series waveform of voltage across the terminals of the inductor in section (b-2), a time series waveform of current flowing through the inductor in section (c-1), and a time series waveform of voltage across the terminals of the inductor in section (c-2).

Section (a) of FIG. 7 illustrates on-off operation of the switching element Q1 in the DC power supply circuit 1. Section (b-1) of FIG. 7 illustrates a time series waveform of the current IL2 flowing through the inductor L2 when the DC power supply circuit 1 is operated in the critical mode. Section (b-2) of FIG. 7 illustrates a time series waveform of the voltage VL2 across the terminals of the inductor L2 when the DC power supply circuit 1 is operated in the critical mode. Section (c-1) of FIG. 7 illustrates a time series waveform of the current IL2 flowing through the inductor L2 when the DC power supply circuit 1 is operated in the continuous mode. Section (c-2) of FIG. 7 illustrates a time series waveform of the voltage VL2 across terminals of the inductor L2 when the DC power supply circuit 1 is operated in the continuous mode.

As illustrated in sections (b-1), (b-2), (c-1), and (c-2) of FIG. 7, during the turned-on period of the switching element Q1, the current IL2 continues to flow along the first current path from the output terminal at the high-potential side of the rectifier circuit 2, passing through the inductor L2 and the switching element Q1, both when the DC power supply circuit 1 is operated the critical mode and when the DC power supply circuit 1 is operated in the continuous mode. During the turned-on period of the switching element Q1, the current IL2 flowing through the inductor L2 increases to a current magnitude IL221 or IL321, and during a subsequent turned-off period of the switching element Q1, the current IL2 decreases. On the other hand, during the turned-off period of the switching element Q1, current continues to flow along the third current path from the output terminal at the high-potential side of the rectifier circuit 2, passing through the diode D3, the inductor L2, the diode D1, and the capacitor C2 in respective order. Through the above, when the DC power supply circuit 1 is operated in the critical mode or the continuous mode, current continues to flow from the power supply AC to the voltage conversion circuit 3, via the rectifier circuit 2, at all times. Therefore, operating the DC power supply circuit 1 in the critical mode or the continuous mode throughout a half cycle of the input voltage Vs to the rectifier circuit 2 from the power supply AC is advantageous in terms of improving power factor. However, in terms of circuit efficiency, it is advantageous to operate the DC power supply circuit 1 in the discontinuous mode or the critical mode. Also, if the DC power supply circuit 1 is operated in the critical mode, it is necessary for the drive circuit U1 to finely adjust operation frequency of the switching element Q1 in accordance with the instantaneous magnitude of the output voltage from the rectifier circuit 2, and consequently it is necessary to provide a pseudo-resonant circuit or the like. On the other hand, if the DC power supply circuit 1 is operated in the discontinuous mode or the continuous mode, to a certain extent operation frequency of the switching element Q1 can be fixed regardless of current flowing through the inductor L2. Therefore, it is not necessary to provide a pseudo-resonant circuit or the like, thereby enabling simplification of circuit configuration. For the reasons explained above, when circuit efficiency and simplicity of circuit configuration are to be prioritized, preferably the DC power supply circuit 1 should be operated in the discontinuous mode.

<3> Summary

To summarize the above, in the DC power supply circuit 1 relating to present embodiment, current flows from the output terminal at the high-potential side of the rectifier circuit 2 to the output terminal at the low-potential side of the rectifier circuit 2 during each turned-on period of the switching element Q1, passing along the first current path through the voltage conversion circuit 3, and current flows from the output terminal at the high-potential side of the rectifier circuit 2 to the output terminal at the low-potential side of the rectifier circuit 2 even during each turned-off period of the switching element Q1, passing along the third current path through the voltage conversion circuit 3. The first current path and the third current path each extend from the output terminal at the high-potential side of the rectifier circuit 2 to the output terminal at the low-potential side of the rectifier circuit 2, and are each formed intermittently throughout each half cycle of the power supply AC. The switching element Q1 switches between the turned-on state and the turned-off state a plurality of times during each half cycle of the power supply AC, causing current to continue to flow from the rectifier circuit 2 to the voltage conversion circuit 3 substantially throughout the half cycle and improving power factor relative to the power supply AC.

Also, during each turned-on period of the switching element Q1, current flows through the load 11 along the second current path, and during each turned-off period of the switching element Q1, current flows through the load 11 along the fourth current path. Therefore, current flows through the load 11, not only during each turned-on period of the switching element Q1, but also during each turned-off period of the switching element Q1. Furthermore, the capacitor C2 is charged each time the switching element Q1 is turned off through current flowing along the third current path, thereby ensuring that there is a relatively small amount of variation in voltage across the terminals of the capacitor C2. As a consequence, variation in current flowing through the load 11 along the second current path, from the capacitor C2, is suppressed. The load 11 is therefore operable in a state in which only a relatively small amount variation occurs in current flowing therein.

In general, a DC power supply circuit that is designed in order to improve power factor has a configuration in which a power factor correction (PFC) circuit is connected to a rectifier circuit and a voltage conversion circuit is connected to the PFC circuit, downstream thereof. The PFC circuit includes elements such as a switching element, an inductor, and a control IC. In contrast to the configuration described above, the DC power supply circuit 1 relating to the present embodiment enables power factor improvement without the need to provide a PFC circuit. Therefore, the DC power supply circuit 1 relating to the present embodiment achieves advantageous effects of reduced circuit size and improved circuit efficiency by reducing power loss due to the PFC circuit.

Note that although the diode D2 is included in the present embodiment, alternatively the diode D2 may be omitted and the cathode of the diode D3 may be directly connected to the second terminal of the capacitor C2. The diode D2 breaks down when high voltage is applied to the load 11 due to an abnormality therein, thereby ensuring safe suspension of the DC power supply circuit 1.

In a configuration in which the diode D2 is omitted and in which the cathode of the diode D3 is directly connected to the second terminal of the capacitor C2, when the DC power supply circuit starts up, the capacitor C2 is only charged by current flowing along a current path via the inductor L2 and the load 11. Therefore, such a configuration prevents excessive inrush current from flowing into the capacitor C2 when the DC power supply circuit starts up.

Second Embodiment

Figure 8:
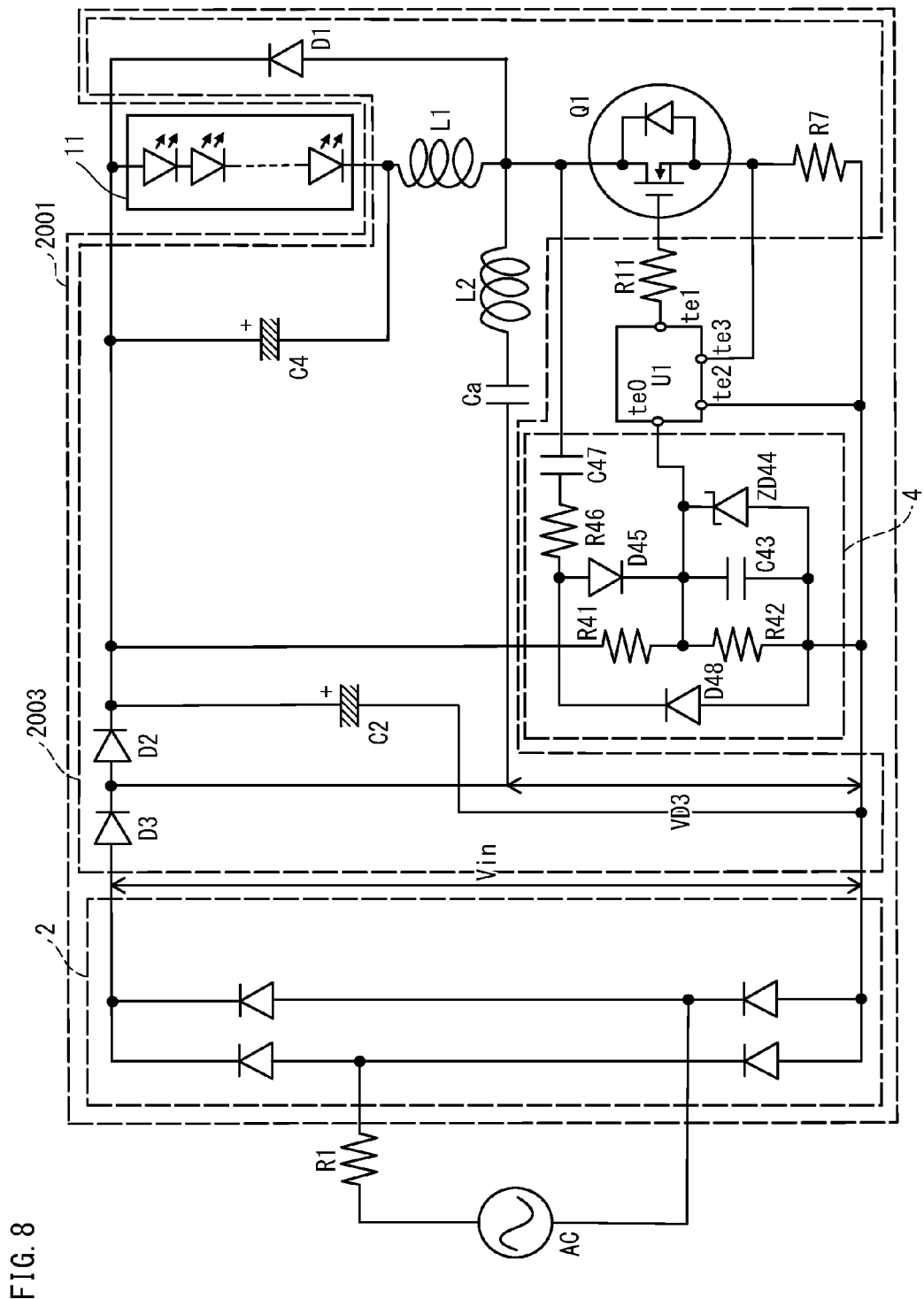
FIG. 8 is a circuit diagram illustrating a DC power supply circuit relating to a second embodiment.

FIG. 8 illustrates a circuit diagram of a DC power supply circuit 2001 relating to the present embodiment.

As illustrated in FIG. 8, configuration of a voltage conversion circuit 2003 in the DC power supply circuit 2001 differs from voltage conversion circuit configuration in the first embodiment. More specifically, the voltage conversion circuit 2003 includes a capacitor (auxiliary capacitor) Ca, which is connected in series to the inductor L2 in a circuit path including the inductor L2 and extending from the second terminal of the inductor L1 to the output terminal at the high-potential side of the rectifier circuit 2. A first terminal of the capacitor Ca is connected to the output terminal at the high-potential side of the rectifier circuit 2 and a second terminal of the capacitor Ca is connected to the second terminal of the inductor L2. Note that elements of configuration that are the same as in the first embodiment are labeled using the same reference signs and explanation thereof is omitted where appropriate.

The following explains operation of the DC power supply circuit 2001 relating to the present embodiment.

Figure 9A:
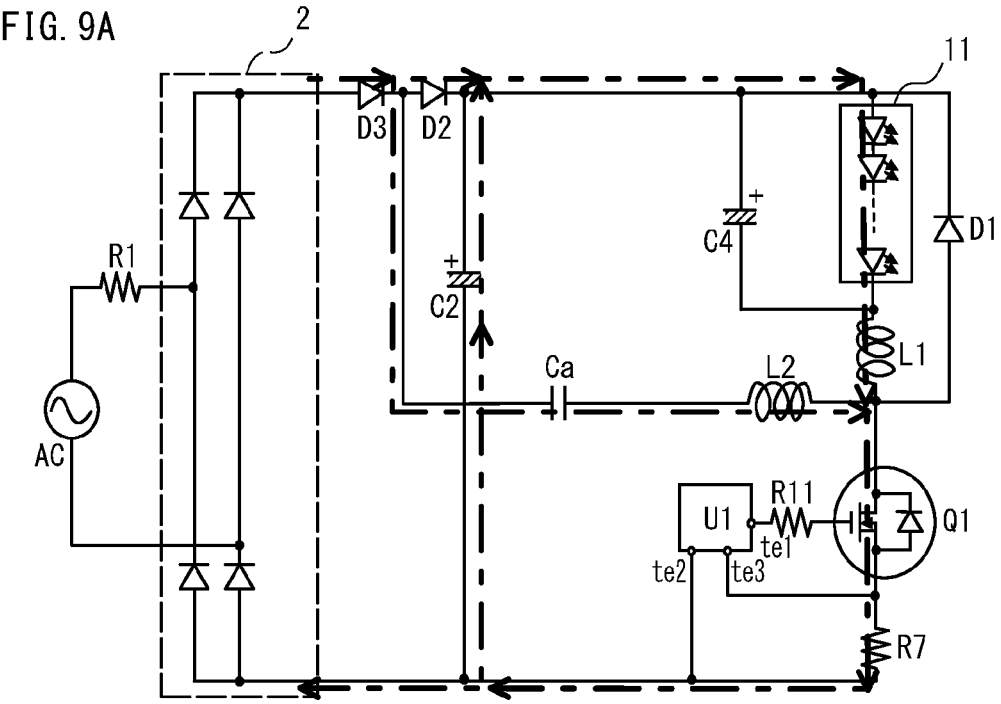
FIGS. 9A and 9B are circuit diagrams illustrating the DC power supply circuit relating to the second embodiment and flow of current in the DC power supply circuit.
Figure 9B:
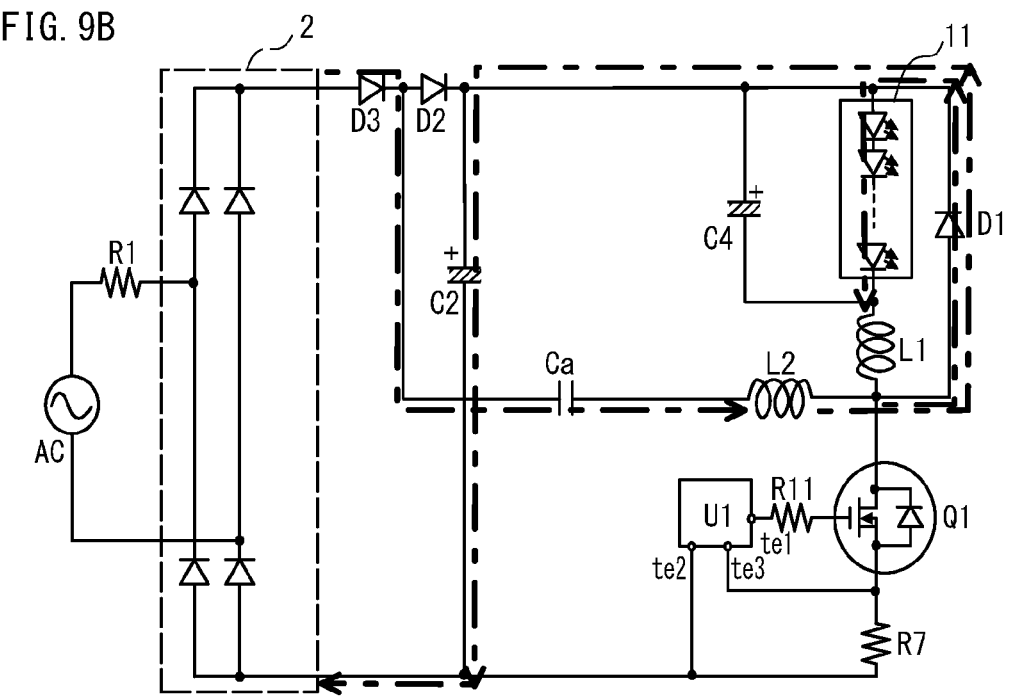
Figure 10:
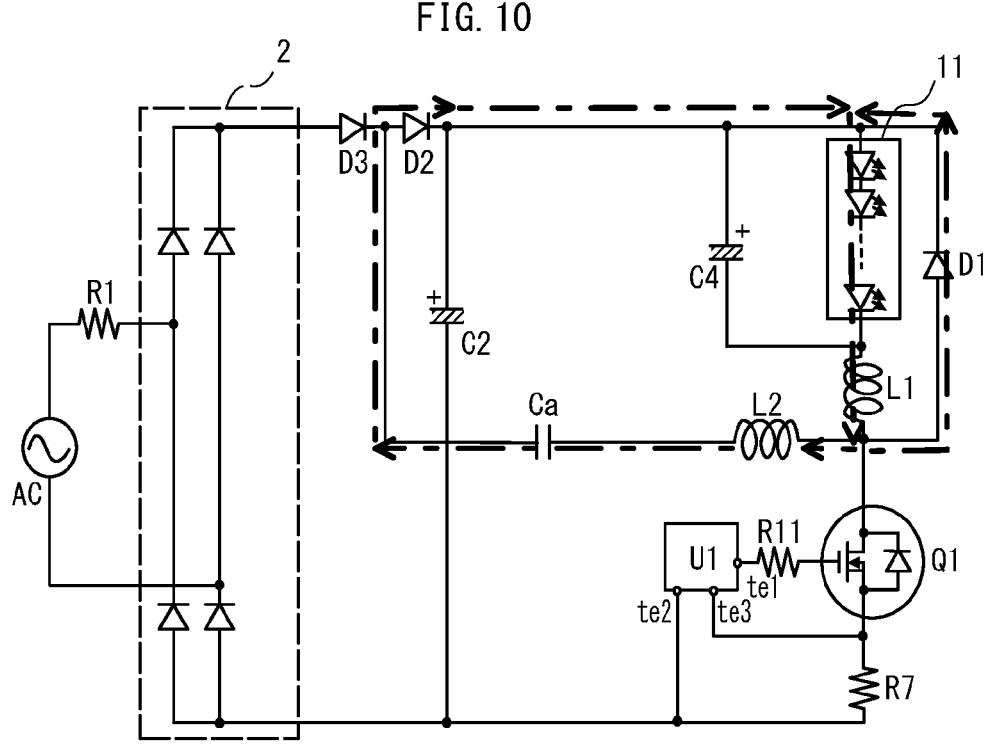
FIG. 10 is a circuit diagram illustrating the DC power supply circuit relating to the second embodiment and flow of current in the DC power supply circuit.

FIGS. 9A, 9B, and 10 are circuit diagrams illustrating the DC power supply circuit 2001 relating to the present embodiment and flow of current in the DC power supply circuit 2001. Note that illustration of the fixed voltage circuit 4 is omitted in FIGS. 9A, 9B, and 10.

FIG. 9A illustrates flow of current when the switching element Q1 is in the turned-on state, and FIGS. 9B and 10 illustrates flow of current when the switching element Q1 is in the turned-off state.

As illustrated in FIG. 9A, upon the switching element Q1 being turned on, a current path (herein, referred to as a first current path) is formed that extends from the output terminal at the high-potential side of the rectifier circuit 2 to the output terminal at the low-potential side of the rectifier circuit 2, via the diode D3, the capacitor Ca, the inductor L2, the switching element Q1, and the resistor R7 in respective order. At the same time, a current path (herein, referred to as a second current path) is formed that extends from the second terminal of the capacitor C2 to the first terminal of the capacitor C2, via the load 11, the inductor L1, the switching element Q1, and the resistor R7 in respective order. Also, a current path (herein, referred to as current path A) is formed that extends from the output terminal at the high-potential side of the rectifier circuit 2 to the output terminal at the low-potential side of the rectifier circuit 2, via the diode D3, the diode D2, the load 11, the inductor L1, the switching element Q1, and the resistor R7 in respective order.

During the above, current is supplied to the load 11 and the inductor L1 through current flowing along the second current path and the current path A, and thus magnetic energy accumulates in the inductor L1 and current variation in the load 11 is suppressed. By providing a stable supply of energy to the inductor L1 as described above, it is possible to suppress variation in voltage supplied to the load 11. Also, the capacitor Ca is charged and magnetic energy is accumulated in the inductor L2 through current flowing along the first current path.

On the other hand, as illustrated in FIG. 9B, upon the switching element Q1 being turned off, a current path (herein, referred to as a third current path) is formed that extends from the output terminal at the high-potential side of the rectifier circuit 2 to the output terminal at the low-potential side of the rectifier circuit 2, via the diode D3, the capacitor Ca, the inductor L2, the diode D1, and the capacitor C2 in respective order. At the same time, a current path (herein, referred to as a fourth current path) is formed that extends from the second terminal of the inductor L1 to the first terminal of the inductor L1, via the diode D1 and the load 11 in respective order.

During the above, the magnetic energy accumulated in the inductor L1 is discharged toward the load 11 through current flowing along the fourth current path, and the magnetic energy accumulated in the inductor L2 is discharged to the capacitor C2 through current flowing along the third current path, thereby charging the capacitor C2. The capacitor Ca continues to be charged through current flowing into the capacitor Ca from the output terminal at the high-potential side of the rectifier circuit 2.

Also note that while omitted in FIG. 9B, while the instantaneous magnitude Vin of the output voltage from the rectifier circuit 2 is increasing, current flows into the capacitor C2 from the output terminal at the high-potential side of the rectifier circuit 2, via the diode D3 and the diode D2, during a period in the which the instantaneous magnitude Vin of the output voltage is at least equal to the voltage VC2 across the terminals of the capacitor C2.

As illustrated in FIG. 10, upon subsequent completion of charging of the capacitor Ca after the switching element Q1 has been turned off, discharge of the capacitor Ca starts soon thereafter. Energy ECa accumulated in the capacitor Ca can be expressed as in Eqn. 1 shown below, where Ca represents electrostatic capacitance of the capacitor Ca and VCa represents voltage across the terminals of the capacitor Ca when discharge of the capacitor Ca starts.

[Math. 1]

$$ECa = \frac{Ca \times (VCa)^2}{2} \quad \text{(Eqn. 1)}$$

Discharge of the capacitor Ca is accompanied by supply of the energy ECa to the inductors L1 and L2.

In accompaniment to formation of the fourth current path, a current path (herein, referred to as a fifth current path) is formed that extends from the first terminal of the capacitor Ca to the second terminal of the capacitor Ca, via the diode D2, the load 11, the inductor L1, and the inductor L2 in respective order.

Section (a) of FIG. 11 illustrates on-off operation of the switching element Q1 in the DC power supply circuit 2001. Section (b) of FIG. 11 illustrates a time series waveform of the current IL2 flowing through the inductor L2. Section (c) of FIG. 11 illustrates a time series waveform of a voltage VCa across the terminals of the capacitor Ca. Section (d) of FIG. 11 illustrates a time series waveform of the cathode voltage VD3 of the diode D3. Section (e) of FIG. 11 illustrates a time series waveform of the current ID3 flowing through the diode D3.

Upon the switching element Q1 being turned on, the current IL2 starts to flow through the inductor L2 (time T0 in sections (a) and (b) of FIG. 11). The current IL2 flowing through the inductor L2 gradually increases while the switching element Q1 is in the turned-on state (period between times T0 and T1 in sections (a) and (b) in FIG. 11). During the above, the cathode voltage VD3 of the diode D3 is maintained at lower than the instantaneous magnitude Vin of the output voltage from the rectifier circuit 2 by the amount equal to the turn-on voltage Von of the diode D3, and the diode D3 is maintained in the conducting state (period between times T0 and T1 in section (d) of FIG. 11). Also, the current ID3 flowing through the diode D3 increases to a maximum value ID3max (period between times T0 and T1 in section (e) of FIG. 11).

Upon the switching element Q1 subsequently being turned off, the magnetic energy accumulated in the inductor L1 starts to be discharged. At the above time, charging of the capacitor Ca is not complete and current is flowing through the inductor L2. Current continues to flow through the inductor L2 until discharge of the magnetic energy from the inductor L1 is complete (period between times T1 and T2 in sections (a) and (b) in FIG. 11). The current IL2 flowing through the inductor L2 gradually decreases as the voltage VCa across the terminals of the capacitor Ca approaches a maximum charging voltage VCamax of the capacitor Ca (period between times T1 and T2 in sections (b) and (c) of FIG. 11). During the above, the cathode voltage VD3 of the diode D3 is maintained at lower than the instantaneous magnitude Vin of the output voltage from the rectifier circuit 2 by the amount equal to the turn-on voltage Von of the diode D3, and the diode D3 is maintained in the conducting state (period between times T1 and T2 in section (d) of FIG. 11). Also, the current ID3 flowing through the diode D3 gradually decreases from the maximum value ID3max (period between times T1 and T2 in section (e) of FIG. 11). The above occurs due to charging of the capacitor Ca approaching completion.

Once the voltage VCa across the terminals of the capacitor Ca reaches the maximum charging voltage VCamax while the switching element Q1 is in the turned-off state, discharge of the capacitor Ca starts as the magnetic energy accumulated in the inductor L2 is completely discharged, and the current IL2 flows, in the opposite direction to during the period between times T1 and T2, through the inductor L2 (time T2 in sections (a) and (b) of FIG. 11). At the above time, the cathode voltage VD3 of the diode D3 has increased to greater than the voltage VC2 across the terminals of the capacitor C2 by an amount equal to a turn-on voltage of the diode D2, and the diode D3 is in the non-conducting state (time T2 in section (d) of FIG. 11). Also, the current ID3 flowing through the diode D3 has decreased to zero (time T2 in section (e) of FIG. 11).

The capacitor Ca subsequently discharges through current flowing from the first terminal of the capacitor Ca and passing through the diode D2 and the load 11. Thus, the voltage across the terminals of the capacitor Ca gradually decreases in accompaniment to a gradual increase in the current IL2 flowing through the inductor L2 (period between times T2 and T3 in sections (b) and (c) of FIG. 11). While the capacitor Ca is discharging, the cathode voltage VD3 of the diode D3 is maintained at greater than the voltage VC2 across the terminals of the capacitor C2 by the amount equal to the turn-on voltage of the diode D2, and the diode D3 is maintained in the non-conducting state (period between times T2 and T3 in section (d) of FIG. 11).

Upon the switching element Q1 being subsequently turned on, the current IL2 once again starts to flow through the inductor L2 (time T3 in sections (a) and (b) in FIG. 11).

In the DC power supply circuit 2001, by changing the cathode voltage VD3 of the diode D3 in synchronization with cycles of on-off operation of the switching element Q1 as explained above, current continues to flow intermittently from the rectifier circuit 2 to the voltage conversion circuit 2003, via the diode D3, even when the instantaneous magnitude Vin of the output voltage from the rectifier circuit 2 is low. More specifically, while the cathode voltage VD3 of the diode D3 is greater than the voltage VC2 across the terminals of the capacitor C2 by the amount equal to the turn-on voltage Von of the diode D2, which in other words is while the cathode voltage VD3 is greater than the instantaneous magnitude Vin of the output voltage from the rectifier circuit 2, the diode D3 is in the non-conducting state and flow of current from the power supply AC to the voltage conversion circuit 2003, via the rectifier circuit 2, is cut-off.

On the other hand, while the cathode voltage VD3 of the diode D3 is lower than the instantaneous magnitude Vin of the output voltage from the rectifier circuit 2 by the amount equal to the turn-on voltage Von of the diode D3, the diode D3 is in the conducting state and current flows from the power supply AC to the voltage conversion circuit 2003, via the rectifier circuit 2. As can be seen from FIG. 11, in the DC power supply circuit 2001, by changing the cathode voltage VD3 of the diode D3, in synchronization with cycles of on-off operation of the switching element Q1, between a magnitude greater than the instantaneous magnitude Vin of the output voltage from the rectifier circuit 2 and a magnitude less than the instantaneous magnitude Vin of the output voltage from the rectifier circuit 2 by the amount equal to the turn-on voltage Von of the diode D3, current continues to flow intermittently from the rectifier circuit 2 to the voltage conversion circuit 2003, via the diode D3.

Explanation is given with reference to FIG. 11 for an example in which after the switching element Q1 has been turned off, a time at which discharge of the capacitor Ca is completed approximately coincides with a time at which the switching element Q1 is turned on, but in reality variation occurs in length of a single cycle of on-off operation of the switching element Q1 (herein, referred to as an operation cycle). The above occurs due to the drive circuit U1 changing the length of the operation cycle in order that a maximum value of current flowing through the load 11 remains constant. Therefore, a situation may arise in which the time at which the switching element Q1 is turned on occurs after the time at which discharge of the capacitor Ca is completed. Likewise, a situation may arise in which the time at which the switching element Q1 is turned on occurs before the time at which discharge of the capacitor Ca is completed. The following explains operation when the time at which the switching element Q1 is turned on occurs after the time at which discharge of the capacitor Ca is completed. Note that when the time at which the switching element Q1 is turned on occurs before the time at which discharge of the capacitor Ca is completed, operation is the same as explained with reference to FIG. 11; therefore, further explanation is omitted for such a situation.

Section (a) of FIG. 12 illustrates on-off operation of the switching element Q1 in the DC power supply circuit 2001. Section (b) of FIG. 12 illustrates a time series waveform of the current IL2 flowing through the inductor L2. Section (c) of FIG. 12 illustrates a time series waveform of the voltage VCa across the terminals of the capacitor Ca. Section (d) of FIG. 12 illustrates a time series waveform of the cathode voltage VD3 of the diode D3. Section (e) of FIG. 12 illustrates a time series waveform of the current ID3 flowing through the diode D3.

Upon the switching element Q1 being turned-on, current starts to flow to the capacitor Ca and the inductor L2 (time T20 in sections (a) and (b) of FIG. 12). The current flowing through the inductor L2 gradually increases while the switching element Q1 is in the turned-on state (period between times T20 and T21 in sections (a) and (b) of FIG. 12). During the above, the cathode voltage VD3 of the diode D3 is maintained at lower than the instantaneous magnitude Vin of the output voltage from the rectifier circuit 2 by the amount equal to the turn-on voltage Von of the diode D3, and the diode D3 is maintained in the conducting state (refer to section (d) of FIG. 12). Also, the current ID3 flowing through the diode D3 increases to the maximum value ID3max (period between times T20 and T21 in section (e) of FIG. 12).

Upon the switching element Q1 being subsequently turned off, the current IL2 continues to flow through the inductor L2 due to charging of the capacitor Ca not yet being complete (period between times T21 and T22 in sections (a) and (b) of FIG. 12). During the above, the current IL2 flowing through the inductor L2 gradually decreases from a maximum value IL2max1 (period between times T21 and T22 in sections (b) and (c) of FIG. 12). Meanwhile, the voltage VCa across the terminals of the capacitor Ca gradually increases from a voltage VCa1 to the maximum charging voltage VCamax. During the above, the cathode voltage VD3 of the diode D3 is maintained at lower than the instantaneous magnitude Vin of the output voltage from the rectifier circuit 2 by the amount equal to the turn-on voltage Von of the diode D3, and the diode D3 is maintained in the conducting state (period between times T21 and T22 in section (d) of FIG. 12). Also, the current ID3 flowing through the diode D3 gradually decreases from the maximum value ID3max (period between times T21 and T22 in section (e) of FIG. 12).

Once the voltage VCa across the terminals of the capacitor Ca reaches the maximum charging voltage VCamax while the switching element Q1 is in the turned-off state, the magnetic energy accumulated in the inductor L2 has been completely discharged. Next, discharge of the capacitor Ca starts and the current IL2 flows, in an opposite direction to during the period between times T21 and T22, through the inductor L2 (time T22 in sections (a) and (b) of FIG. 12). Once the current IL2 has gradually increased to −IL2max2, the current IL2 gradually decreases. At the above time, the cathode voltage VD3 of the diode D3 has increased to greater than the voltage VC2 across the terminals of the capacitor C2 by the amount equal to the turn-on voltage Von of the diode D2, and the diode D3 changes to the non-conducting state (refer to section (d) of FIG. 12). Also, the current ID3 flowing through the diode D3 has decreased to zero (refer to section (e) of FIG. 12). The capacitor Ca starts to discharge at the above time (period between times T22 and T23 in sections (b) and (c) of FIG. 12).

Once current flowing through the diode D2 from the first terminal of the capacitor Ca decreases to zero while the switching element Q1 is in the turned-off state, the cathode voltage VD3 of the diode D3 is maintained at lower than the instantaneous magnitude Vin of the output voltage from the rectifier circuit 2 by the amount equal to the turn-on voltage Von of the diode D3 (period between times T23 and T24 in section (d) of FIG. 12). Note that current flowing through the diode D2 from the first terminal of the capacitor Ca decreases to zero due to a difference between on-off timing of the switching element Q1 and timing at which the capacitor Ca is completely discharged. Once current flowing to the capacitor Ca decreases to zero, the magnetic energy accumulated in the inductor L2 has also decreased to approximately zero. In the above situation, the capacitor Ca is unlikely to be recharged in an opposite direction through the magnetic energy accumulated in the inductor L2. Reasoning for the above is that not enough magnetic energy is accumulated in the inductor L2 in order to turn on the diode D2. In other words, it is not possible to generate a sufficient voltage in the inductor L2 for turning on the diode D2 and all of the LEDs that form the load 11. In the above situation, the cathode voltage VD3 of the diode D3 is lower than the instantaneous magnitude Vin of the output voltage from the rectifier circuit 2 by the amount equal to the turn-on voltage Von of the diode D3 due to, for example, the influence of stray capacitance and leakage current of the diode D3.

Upon the switching element Q1 being subsequently turned on, current once again starts to flow from the output terminal at the high-potential side of the rectifier circuit 2 to the capacitor Ca and the inductor L2, via the diode D3 (time T24 in sections (a) and (b) of FIG. 12). During the above, the cathode voltage VD3 of the diode D3 is maintained at lower than the instantaneous magnitude Vin of the output voltage from the rectifier circuit 2 by the amount equal to the turn-on voltage Von of the diode D3, and the diode D3 is maintained in the conducting state (refer to section (d) of FIG. 12). Also, the current ID3 flowing through the diode D3 increases to the maximum value ID3max (refer to section (e) of FIG. 12).

Section (a) of FIG. 13 illustrates a time series waveform of the input voltage Vs to the rectifier circuit 2 of the DC power supply circuit 2001 from the power supply AC. Section (b) of FIG. 13 illustrates a time series waveform of the instantaneous magnitude Vin of the output voltage from the rectifier circuit 2. Section (c) of FIG. 13 illustrates a time series waveform of the cathode voltage VD3 of the diode D3. Section (d) of FIG. 13 illustrates a time series waveform of the input current Iin to the rectifier circuit 2 from the power supply AC.

The time series waveform of the input voltage Vs to the rectifier circuit 2 from the power supply AC has a sinusoidal shape. In comparison, the time series waveform of the instantaneous magnitude Vin of the output voltage from the rectifier circuit 2 has an approximately pulsating shape that exhibits maximums at times coinciding with maximums of an absolute value of the input voltage Vs to the rectifier circuit 2 from the power supply AC.

The cathode voltage VD3 of the diode D3 changes, in synchronization with cycles of on-off operation of the switching element Q1, between a voltage greater than the instantaneous magnitude Vin of the output voltage from the rectifier circuit 2 and a voltage lower than the instantaneous magnitude Vin of the output voltage (refer to section (c) of FIG. 13). When the cathode voltage VD3 of the diode D3 is lower than the instantaneous magnitude Vin of the output voltage from the rectifier circuit 2 by the amount equal to the turn-on voltage Von of the diode D3, an absolute value of the current Iin flowing from the power supply AC to the rectifier circuit 2 is approximately equal to the current ID3 flowing through the diode D3. Current flowing through the inductor L2 increases with increasing instantaneous magnitude Vin of the output voltage from the rectifier circuit 2, and thus the current ID3 also increases. The above is reflected by the current Iin, which flows from the power supply AC to the rectifier circuit 2, changing between ±Iinmax (refer to section (d) of FIG. 13). As illustrated in sections (a) and (d) of FIG. 13, in the DC power supply circuit 2001, the current Iin continues to flow intermittently from the power supply AC to the rectifier circuit 2 throughout each cycle of the output voltage Vs of the power supply AC. Therefore, the DC power supply circuit 2001 enables power factor improvement. In fact, the DC power supply circuit 2001 relating to the present embodiment enables a power factor of 0.9 or greater.

To summarize, in the DC power supply circuit 2001 relating to the present embodiment, current flows from the output terminal at the high-potential side of the rectifier circuit 2 to the output terminal at the low-potential side of the rectifier circuit 2 during each turned-on period of the switching element Q1, passing along the first current path, and current also flows from the output terminal at the high-potential side of the rectifier circuit 2 to the output terminal at the low-potential side of the rectifier circuit 2 during each turned-off period of the switching element Q1, passing along the third current path. The first current path and the third current path are equivalent to the inter-terminal current paths described further above. The switching element Q1 is changed between the turned-on state and the turned-off state a plurality of times during each half cycle of the power supply AC, causing current to flow from the rectifier circuit 2 to the voltage conversion circuit 2003 substantially throughout the half cycle and improving power factor relative to the power supply AC. Additionally, current is supplied to the load 11 from the second terminal of the inductor L1 during each turned-off period of the switching element Q1. Therefore, electricity is conducted through the load 11 during each turned-on period of the switching element Q1 and also during each turned-off period of the switching element Q1, thereby enabling the load 11 to be operated with a relatively small amount of variation in output.

In general, a DC power supply circuit that is designed in order to improve power factor has a configuration in which a PFC circuit is connected to a rectifier circuit and a voltage conversion circuit is connected to the PFC circuit, downstream thereof. The PFC circuit includes elements such as a switching element, an inductor, and a control IC. In contrast, in the DC power supply circuit 2001 relating to the present embodiment, a section which functions as a so called PFC circuit (i.e., a circuit including the capacitor Ca and the inductor L2), and a section that functions as a step-down chopper circuit (i.e., a circuit including the inductor L1 and the diode D3), both make use of the same switching element Q1. As a consequence, the number of switching elements that is necessary is reduced, thereby enabling reduction in circuit size. Also, reducing the number of switching elements has an advantageous effect of reducing an amount of switching loss due to the switching elements, thereby improving circuit efficiency.

Third Embodiment

Figure 14:
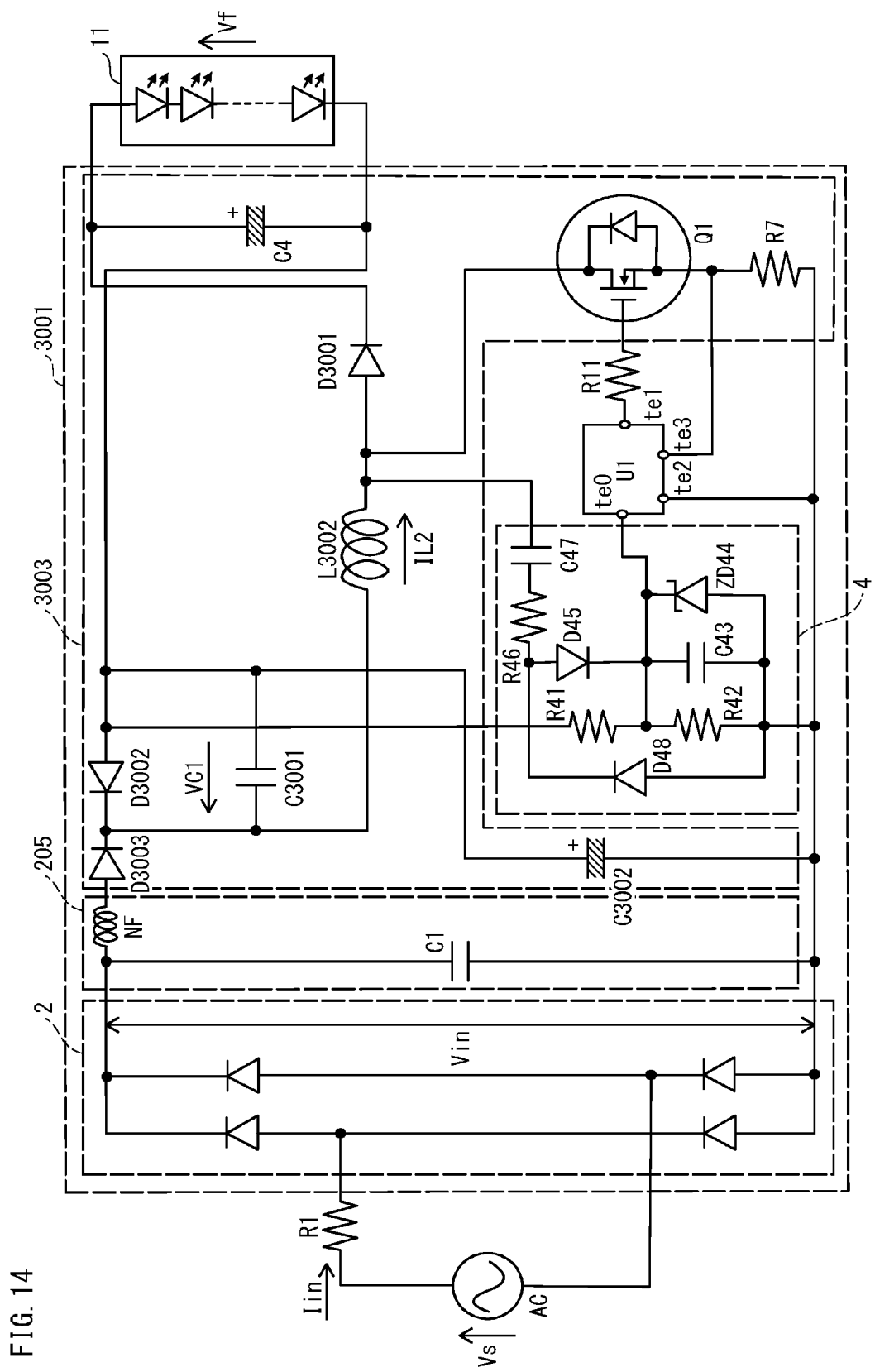
FIG. 14 is a circuit diagram illustrating a DC power supply circuit relating to a third embodiment.

FIG. 14 illustrates a circuit diagram of a DC power supply circuit 3001 relating to the present embodiment.

The DC power supply circuit 3001 differs from the first embodiment in terms of configuration of a voltage conversion circuit 3003. Note that elements of configuration that are the same as in the first embodiment are labeled using the same reference signs and explanation thereof is omitted where appropriate.

The voltage conversion circuit 3003 includes a switching element Q1, an inductor L3002, diodes D3001, D3002, and D3003, capacitors C4, C3001, and C3002, and a resistor R7.

A first terminal of the inductor L3002 is connected to the output terminal at the high-potential side of the rectifier circuit 2.

The switching element Q1 is an N-channel MOSFET. A source of the switching element Q1 is connected to the output terminal at the low-potential side of the rectifier circuit 2, via the resistor R7, a gate of the switching element Q1 is connected to the drive circuit U1, via the resistor R11, and a drain of the switching element Q1 is connected to a second terminal of the inductor L3002. The resistor R7 is provided in order to a detect a drain current flowing in the switching element Q1 based on a voltage across terminals of the resistor R7.

A first terminal of the capacitor (first capacitor) C3001 is connected to the output terminal at the high-potential side of the rectifier circuit 2. The capacitor C3001 is for example a ceramic capacitor. Charging and discharging of the capacitor C3001 promotes flow of current to the capacitor C3002 from the output terminal at the high-potential side of the rectifier circuit 2. Note that detailed explanation is provided further below. The capacitor C3001 has a low electrostatic capacitance compared to the capacitor C3002. More specifically, the electrostatic capacitance of the capacitor C3001 is set in a range of between 1/38 to 1/40 of the electrostatic capacitance of the capacitor C3002.

A first terminal of the capacitor (second capacitor) C3002 is connected to the output terminal at the low-potential side of the rectifier circuit 2 and a second terminal of the capacitor C3002 is connected to a second terminal of the capacitor C3001 and the first terminal of the load 11.

The diode (first unidirectional element) D3001 is connected between a second terminal of the inductor L3002 and the load 11. An anode of the diode D3001 is connected to the second terminal of the inductor L3002 and a cathode of the diode D3001 is connected to the second terminal of the load 11. The diode D3001 has a function of preventing current accompanying discharge of the capacitor C4 from flowing toward the switching element Q1.

The diode (second unidirectional element) D3002 is connected between the first terminal of the inductor L3002 and the second terminal of the capacitor C3002. An anode of the diode D3002 is connected to the second terminal of the capacitor C3002 and a cathode of the diode D3002 is connected to the first terminal of the inductor L3002. The diode D3002 has a function of preventing current from flowing directly to the capacitor C3002 from the output terminal at the high-potential side of the rectifier circuit 2.

The diode (third unidirectional element) D3003 is connected between the output terminal at the high-potential side of the rectifier circuit 2 and the first terminal of the inductor L3002. An anode of the diode D3003 is connected to the output terminal at the high-potential side of the rectifier circuit 2 and a cathode of the diode is connected to the first terminal of the inductor L3002. The diode D3003 has a function of preventing reverse flow of current from the capacitors C3001 and C3002 to the rectifier circuit 2.

A capacitor C1 is connected across the output terminals of the rectifier circuit 2. An inductor NF is connected to the output terminal at the high-potential side of the rectifier circuit 2. The capacitor C1 and the inductor NF form a noise filter 205.

The capacitor C47 of the fixed voltage circuit 4 is connected to the second terminal of the inductor L3002. The capacitor C47 is charged during each turned-off period of the switching element Q1 through current supplied from the second terminal of the inductor L3002. The capacitor C47 discharges during each turned-on period of the switching element Q1, thereby transferring electrical charge accumulated in the capacitor C47 to the capacitor C43.

The following explains operation of the DC power supply circuit 3001 relating to the present embodiment.

FIGS. 15, 16A, 16B, 17A, 17B, 18A, 18B, and 19 are circuit diagrams illustrating the DC power supply circuit 3001 relating to the present embodiment and flow of current in the DC power supply circuit 3001. Note that illustration of the fixed voltage circuit 4 is omitted in FIGS. 15, 16A, 16B, 17A, 17B, 18A, 18B, and 19.

Figure 15:
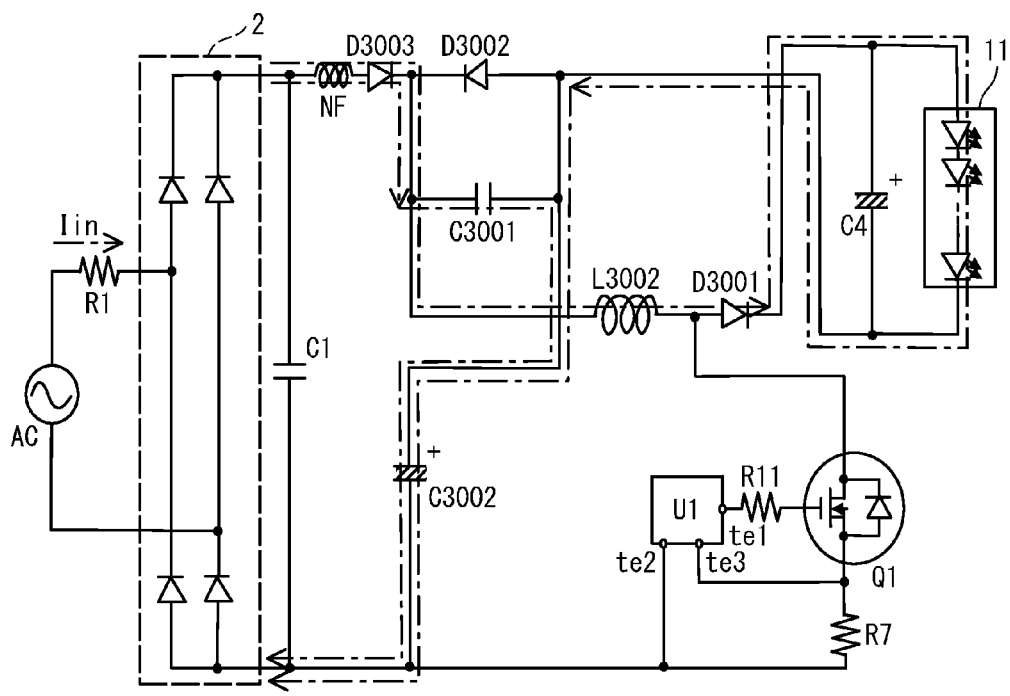
FIG. 15 is a circuit diagram illustrating the DC power supply circuit relating to the third embodiment and flow of current in the DC power supply circuit.

FIG. 15 illustrates flow of current in the DC power supply circuit 3001 when the DC power supply circuit 3001 starts up. In the above situation, in the DC power supply circuit 3001, the switching element Q1 is in the turned-off state and a current path (herein, referred to as a first charging path) is formed that extends from the output terminal at the high-potential side of the rectifier circuit 2 to the output terminal at the low-potential side of the rectifier circuit 2, via the inductor NF, the diode D3003, the capacitor C3001, and the capacitor C3002 in respective order. At the same time, a current path (herein, referred to as a second charging path) is formed that extends from the output terminal at the high-potential side of the rectifier circuit 2 to the output terminal at the low-potential side of rectifier circuit 2, via the diode D3003, the inductor L3002, the diode D3001, the load 11, and the capacitor C3002 in respective order. The capacitors C3001 and C3002 are charged through current flowing along the first and second charging paths. Note that a portion of current flowing from the output terminal at the high-potential side of the rectifier circuit 2 flows to the output terminal at the low-potential side of the rectifier circuit 2 via the capacitor C1, thereby charging the capacitor C1. The capacitors C3001 and C3002 are charged such that the sum (VC1+VC2) of a voltage VC1 across the terminals of the capacitor C3001 and a voltage VC2 across the terminals of the capacitor C3002 reaches a magnitude lower than the instantaneous magnitude Vin of the output voltage from the rectifier circuit 2 by an amount equal to a turn-on voltage Von of the diode D3003. The voltage across the terminals of capacitor C3002 is thus lower than the instantaneous magnitude Vin of the output voltage from the rectifier circuit 2 by the amount equal to the turn-on voltage Von of the diode D3003 and an amount equal to a voltage drop Vf across the load 11.

The following explains flow of current during normal operation of the DC power supply circuit 3001.

First explanation is given of a situation in which the instantaneous magnitude Vin of the output voltage from the rectifier circuit 2 is at least equal to the voltage VC2 across the terminals of the capacitor C3002.

Figure 17A:
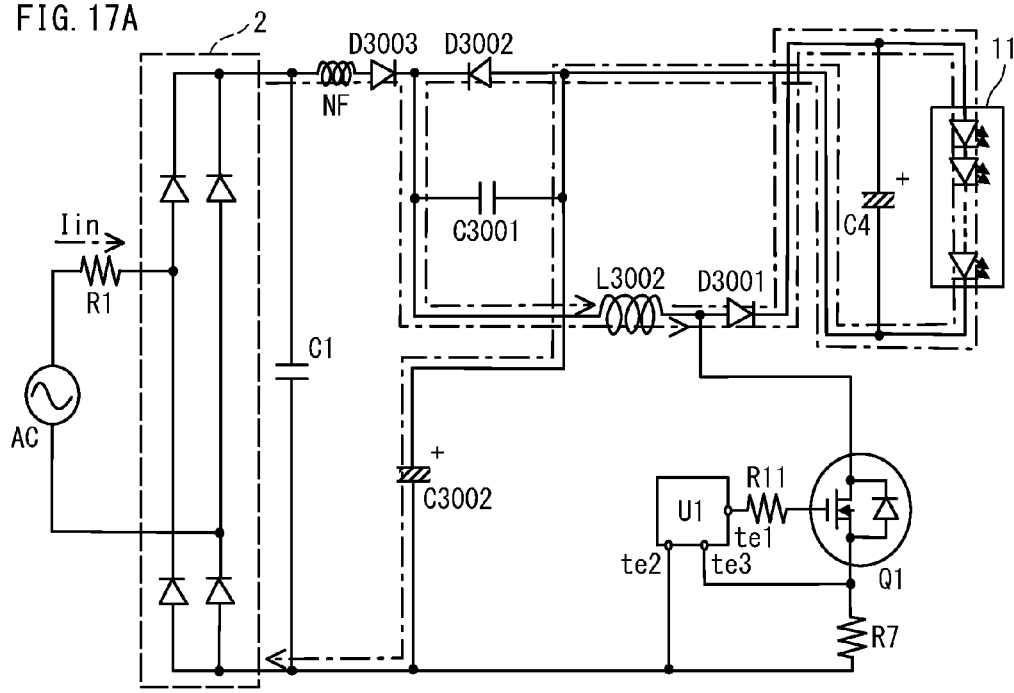
FIGS. 17A and 17B are circuit diagrams illustrating the DC power supply circuit relating to the third embodiment and flow of current in the DC power supply circuit.
Figure 17B:
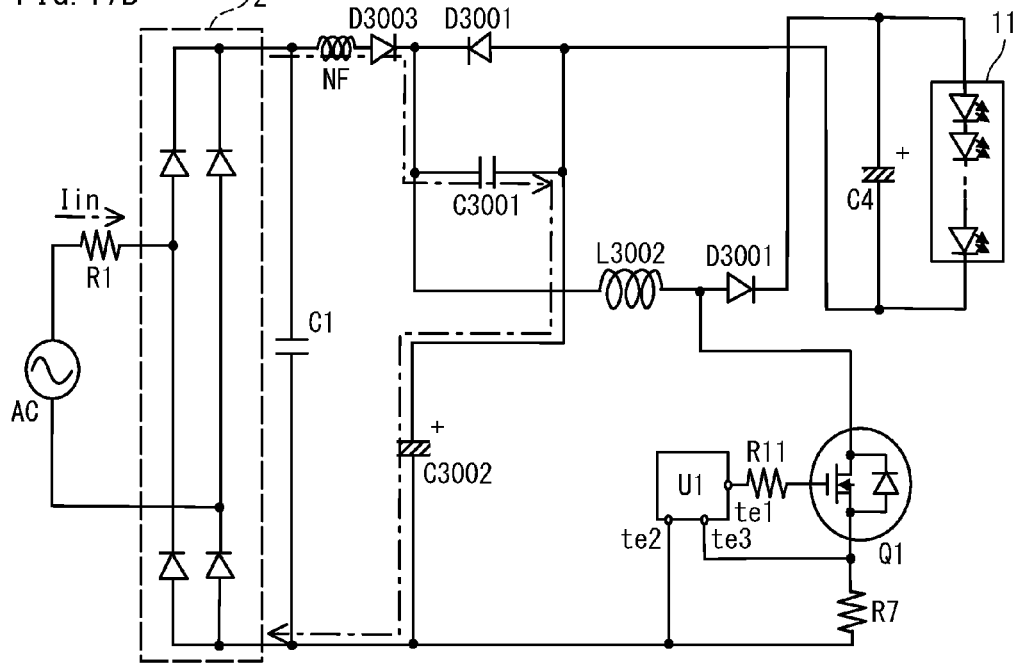

FIG. 16A illustrates flow of current during a turned-on period of the switching element Q1. FIGS. 16B, 17A, and 17B illustrate flow of current during a turned-off period of the switching element Q1.

As illustrated in FIG. 16A, during the turned-off period of the switching element Q1, a current path (herein, referred to as a first current path) is formed that extends from the first terminal of the capacitor C3001 to the second terminal of the capacitor C3002, via the inductor L3002, the switching element Q1, and the resistor R7 in respective order. At the same time, a current path (herein, referred to as current path C) is formed that extends from the output terminal at the high-potential side of the rectifier circuit 2 to the output terminal at the low-potential side of the rectifier circuit 2, via the inductor NF, the diode D3003, the inductor L3002, the switching element Q1, and the resistor R7 in respective order, and magnetic energy accumulates in the inductor L3002. Current flowing along the current path C includes a component resulting from discharge of the capacitor C1, via the inductor NF. When the current Iin flowing from the power supply AC is reduced through flow restriction due to an impedance component of the power supply AC, resistance of the resistor R1, and an impedance component of the rectifier circuit 2, the component of current resulting from discharge from the capacitor C1 becomes a controlling component of the current. Once discharge of the capacitor C3001 is complete, upon the instantaneous magnitude Vin of the output voltage from the rectifier circuit 2 becoming lower than the voltage (VC1+VC2) across the terminals of the capacitors C3001 and C3002, the diode D3003 is turned off and flow of current along the current path C is cut-off. At the above time, the input current Iin to the rectifier circuit 2 only flows into the capacitor C1.

On the other hand, as illustrated in FIG. 16B, during the turned-off period of the switching element Q1, a current path (herein, referred to as a second current path) is formed that extends from the second terminal of the inductor L3002 to the first terminal of the inductor L3002, via the diode D3001, the load 11, and the capacitor C3001 in respective order. At the same time, a current path (herein, referred to as a third current path) is formed that extends from the output terminal at the high-potential side of the rectifier circuit 2 to the output terminal at the low-potential side of the rectifier circuit 2, via the inductor NF, the diode D3003, the inductor L3002, the diode D3001, the load 11, and the capacitor C3002 in respective order. The third current path is the same as the second charging path for charging of the capacitor C3002. During the above, residual charge in the capacitor C3001 and the magnetic energy accumulated in the inductor L3002 are discharged toward the load 11 through current flowing along the second current path. In the above situation, a voltage applied to the load 11 is equal to the sum of a voltage across the terminals of the inductor L3002 and a voltage across the terminals of the capacitor C3001. Also, the capacitor C3002 is charged through current flowing along the third current path. Until the instantaneous magnitude Vin of the output voltage from the rectifier circuit and the voltage (VC1+VC2) across the terminals of the capacitors C3002 and C3001 become equal, current flows along the third current path in accordance with a difference between the aforementioned voltages. The voltage across the terminals of the capacitor C3002 exhibits a relatively small amount of variation compared to the voltage across the terminals of the capacitor C3001. When the capacitor C3001 is not fully discharged during the turned-on period of the switching element Q1 and there is residual charge in the capacitor C3001, the residual charge is discharged toward the load 11 during a next turned-off period of the switching element Q1. The amount of residual charge in the capacitor C3001 is determined by a relationship between on-period length of the switching element Q1, a time constant of the capacitor C3001, and the instantaneous magnitude Vin of the output voltage from the rectifier circuit 2.

As illustrated in FIG. 17A, upon subsequent completion of discharge of the capacitor C3001, a current path (herein, referred to as a fourth current path) is formed that extends from the second terminal of the inductor L3002 to the first terminal of the inductor L3002, via the diode D3001, the load 11, and the diode D3002 in respective order. At the same time, a current path (herein, referred to as a fifth current path) is formed that extends from the output terminal at the high-potential side of the rectifier circuit 2 to the output terminal at the low-potential side of the rectifier circuit 2, via the inductor NF, the diode D3003, the inductor L3002, the diode D3001, the load 11, and the capacitor C3002 in respective order. The fifth current path is the same as the second charging path for charging of the capacitor C3002. During the above, the magnetic energy accumulated in the inductor L3002 is discharged toward the load 11 through current flowing along the fourth current path, and the capacitor C3002 is charged through current flowing along the fifth current path. Current flowing through the diode D3002 gradually decreases as the capacitor C3002 is charged through current flowing to the capacitor C3002 from the output terminal at the high-potential side of the rectifier circuit 2, via the diode D3003 and the diode D3002. At the same time, the voltage across the terminals of the capacitor C3002 decreases, by the amount equal to the voltage drop Vf of the load 11, from the voltage greater than the instantaneous magnitude of the output voltage from the rectifier circuit 2 by the amount equal to the voltage across the terminals of the inductor L3002. The voltage across the terminals of the capacitor C3001 is approximately equal to a turn-on voltage Von of the diode D3002, and thus is maintained at approximately 0 V.

As illustrated in FIG. 17B, upon completion of discharge of the magnetic energy accumulated in the inductor L3002, a current path (herein, referred to as a sixth current path) is formed that extends from the output terminal at the high-potential side of the rectifier circuit 2 to the output terminal at the low-potential side of the rectifier circuit 2, via the inductor NF, the diode D3003, the capacitor C3001, and the capacitor C3002 in respective order. The sixth current path is the same as the first charging path for charging of the capacitors C3001 and C3002. Therefore, once the capacitor C3001 has been completely discharged and the magnetic energy accumulated in the inductor L3002 has been completely discharged during the turned-off period of the switching element Q1, charging current flows not only to the capacitor C3002, but also to the capacitor C3001 along the sixth current path while the switching element Q1 remains in the turned-off state. As a result, during the turned-off period of the switching element Q1, the capacitor C3002 is first charged through the third current path or the fifth current path, and is also subsequently charged through the sixth current path.

The following explains a situation in which the instantaneous magnitude Vin of the output voltage from the rectifier circuit 2 is lower than the voltage VC2 across the terminals of the capacitor C3002.

Figure 18A:
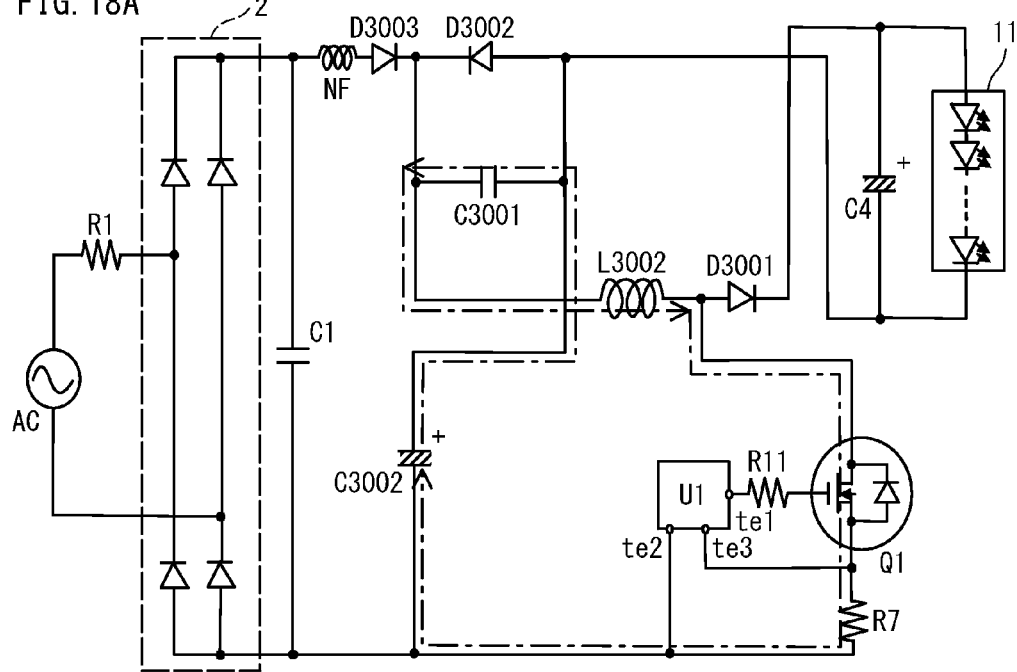
FIGS. 18A and 18B are circuit diagrams illustrating the DC power supply circuit relating to the third embodiment and flow of current in the DC power supply circuit.
Figure 18B:
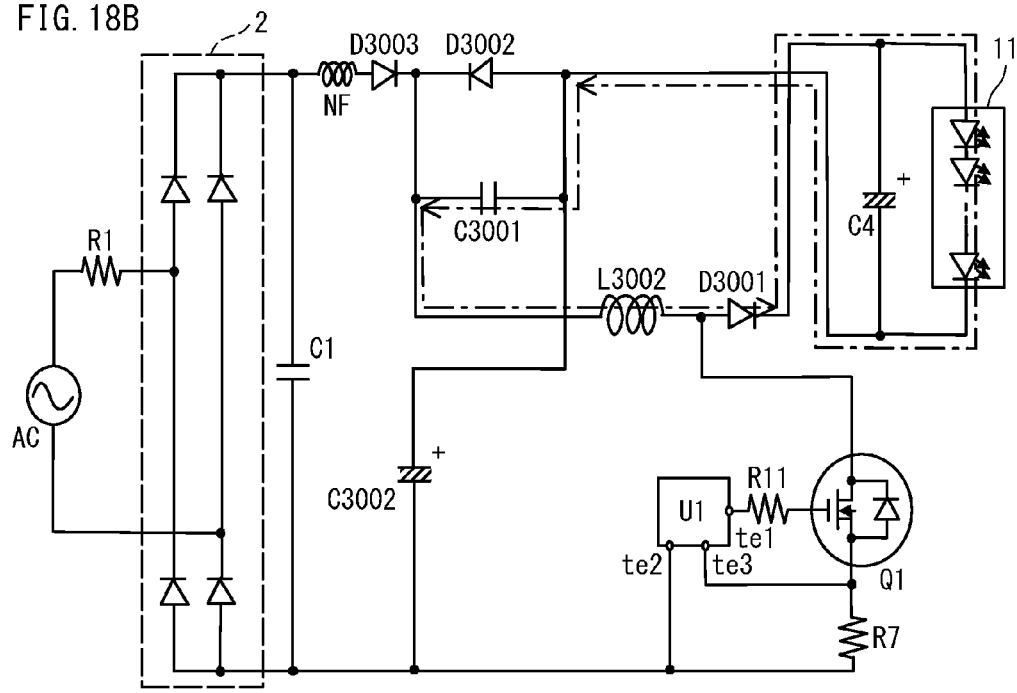
Figure 19:
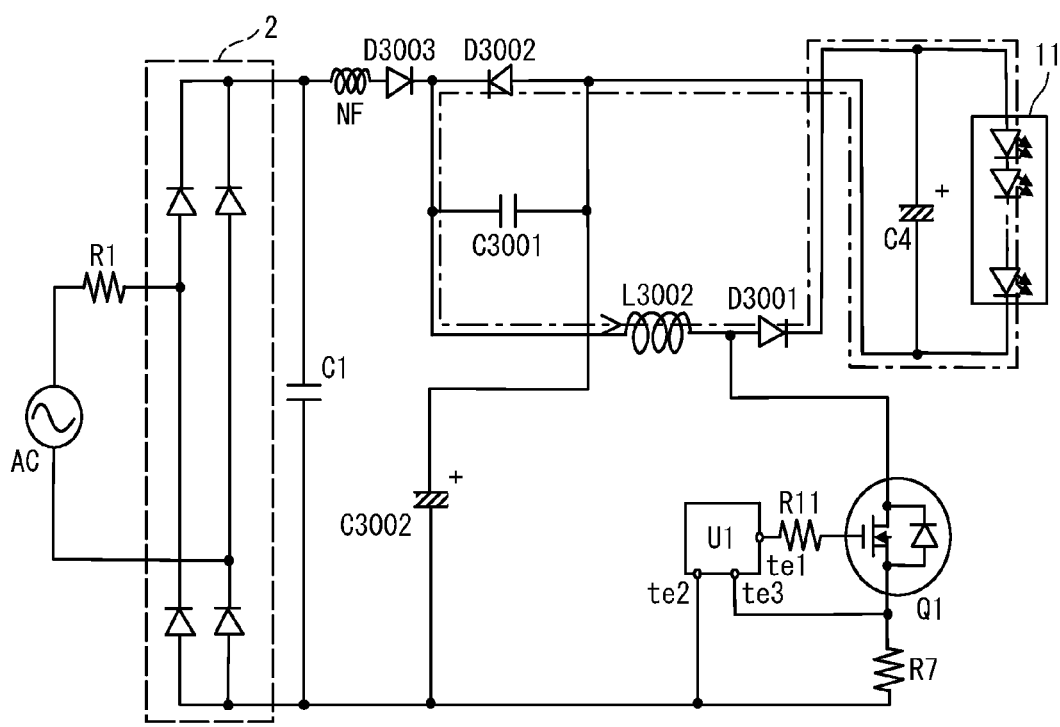
FIG. 19 is a circuit diagram illustrating the DC power supply circuit relating to the third embodiment and flow of current in the DC power supply circuit.

FIG. 18A illustrates flow of current during the turned-on period of the switching element Q1. FIGS. 18B and 19 illustrate flow of current during the turned-off period of the switching element Q1.

As illustrated in FIG. 18A, during the turned-on period of the switching element Q1, a current path (herein, referred to as a seventh current path) is formed that extends from the first terminal of the capacitor C3001 to the second terminal of the capacitor C3002, via the inductor L3002, the switching element Q1, and the resistor R7 in respective order. During the above, magnetic energy is accumulated in the inductor L3002 through discharge from the first terminal of the capacitor C3001 along the seventh current path. Also, the voltage (VC1+VC2) becomes greater than the instantaneous magnitude Vin of the output voltage from the rectifier circuit 2. As a consequence, the diode D3003 is in the non-conducting state and current flowing to the voltage conversion circuit 3003 from the rectifier circuit 2 is cut-off.

On the other hand, as illustrated in FIG. 18B, during the turned-off period of the switching element Q1, a current path (herein, referred to as an eighth current path) is formed that extends from the second terminal of the inductor L3002 to the first terminal of the inductor L3002, via the diode D3001, the load 11, and the capacitor C3001 in respective order. During the above, the magnetic energy accumulated in the inductor L3002 and electrical charge accumulated in the capacitor C3001 are discharged toward the load 11 through current flowing along the eighth current path. In the above situation, a voltage applied to the load 11 is equal to the sum of the voltage across the terminals of the inductor L3002 and the voltage across the terminals of the capacitor C3001. During the above, the voltage across the terminals of the capacitor C3002 is maintained approximately constant.

As illustrated in FIG. 19, upon subsequent completion of discharge of the capacitor C3001, a current path (herein, referred to as a ninth current path) is formed that extends from the second terminal of the inductor L3002 to the first terminal of the inductor L3002, via the diode D3001, the load 11, and the diode D3002 in respective order. During the above, the magnetic energy accumulated in the inductor L3002 is discharged toward the load 11 through current flowing along the ninth current path. The voltage across the terminals of the capacitor C3001 is approximately equal to the turn-on voltage Von of the diode D3002, and thus is maintained at approximately 0 V.

Once the magnetic energy accumulated in the inductor L3002 has been completely discharged, current only flows in the DC power supply circuit 3001 as discharge current from the capacitor C4 toward the load 11.

The following explains time series waveforms of a current IL2 flowing through the inductor L3002, the voltage VC1 across the terminals of the capacitor C3001, a cathode voltage VD3 of the diode D3003, and the current Iin flowing from the power supply AC to the rectifier circuit 2.

Figure 20:
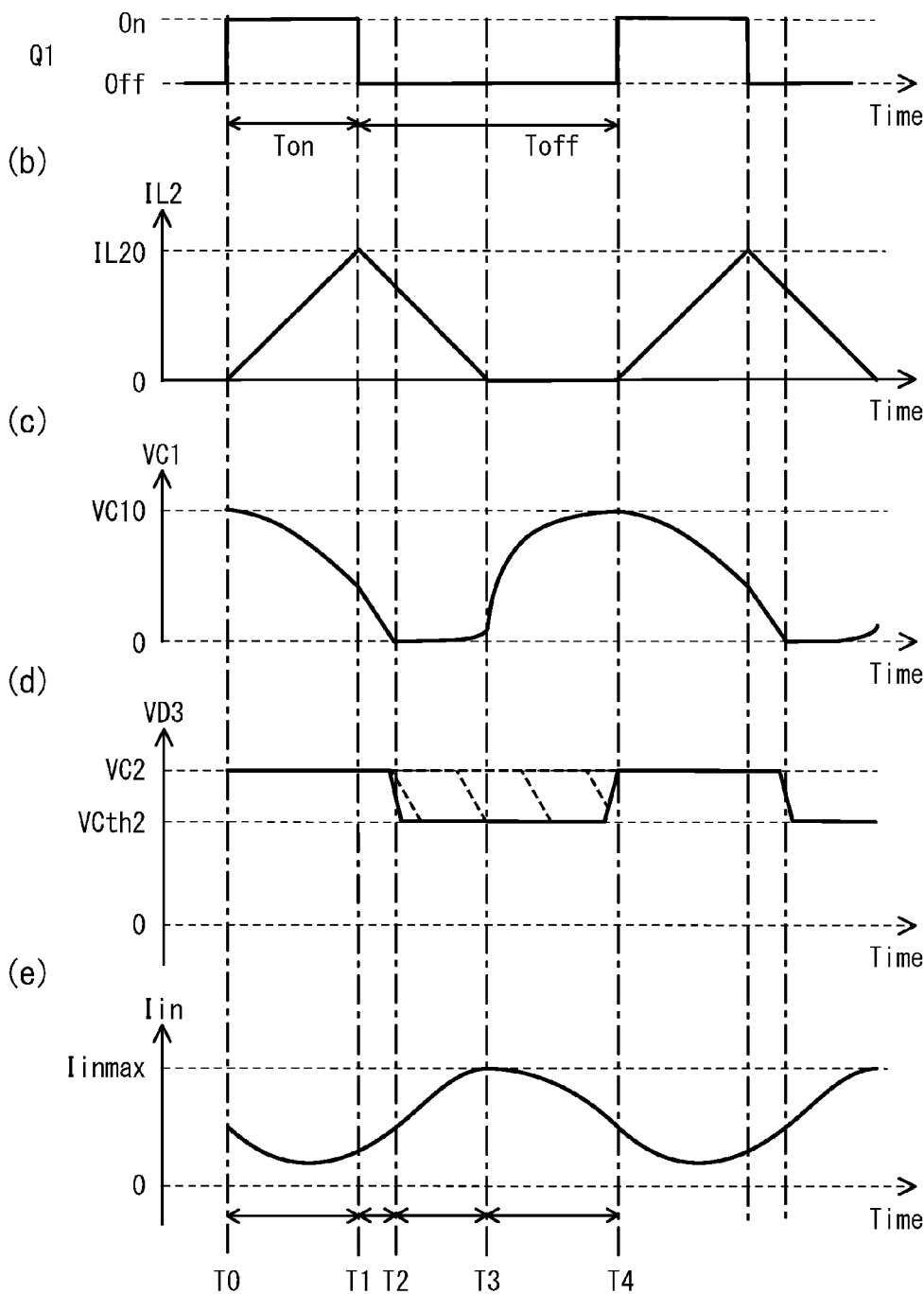
FIG. 20 illustrates, for the DC power supply circuit relating to the third embodiment, on-off operation of a switching element in section (a), a time series waveform of current flowing through an inductor in section (b), a time series waveform of voltage across terminals of a capacitor in section (c), a time series waveform of voltage between a cathode of a diode and an output terminal at a low-potential side of a rectifier circuit in section (d), and a time series waveform of input current to the rectifier circuit from an AC power supply in section (e).

Section (a) of FIG. 20 illustrates on-off operation of the switching element Q1 in the DC power supply circuit 3001. Section (b) of FIG. 20 illustrates a time series waveform of the current IL2 flowing through the inductor L3002. Section (c) of FIG. 20 illustrates a time series waveform of the voltage VC1 across the terminals of the capacitor C3001. Section (d) of FIG. 20 illustrates a time series waveform of the cathode voltage VD3 of the diode D3003. Section (e) of FIG. 20 illustrates a time series waveform of the current Iin flowing from the power supply AC to the rectifier circuit 2. Sections (a) to (c) of FIG. 20 illustrate the situation in which the instantaneous magnitude Vin of the output voltage from the rectifier circuit 2 is at least equal to the voltage VC2 across the terminals of the capacitor C3002.

During the turned-on period of the switching element Q1, the current IL2 flows through the inductor L3002 along the first current path and, at the same time, a current is generated along the current path C. The current IL2 flowing through the inductor L3002 gradually decreases during the turned-on period of the switching element Q1 (period between times T0 and T1 in sections (a) and (b) of FIG. 20). The voltage VC1 across the terminals of the capacitor C3001 gradually decreases as the capacitor C3001 is discharged (period between times T0 and T1 in section (c) of FIG. 20). During the above, the cathode voltage VD3 of the diode D3003 is maintained approximately constant at the voltage VC2, which is greater than the instantaneous magnitude Vin of the output voltage from the rectifier circuit 2, and the diode D3003 is in the conducting state. Also, the current Iin flows from the power supply AC to the voltage conversion circuit 3003, via the rectifier circuit 2, during the above period (period between times T0 and T1 in section (e) of FIG. 20).

During a subsequent turned-off period of the switching element Q1, the magnetic energy accumulated in the inductor L3002 starts to be discharged and the current IL2 flowing through the inductor L3002 decreases (period between times T1 and T2 in sections (a) and (b) of FIG. 20). During the above, the voltage VC1 across the terminals of the capacitor C3001 decreases even further due to discharge of the capacitor C3001 (period between times T1 and T2 in section (c) of FIG. 20). The cathode voltage VD3 of the diode D3003 is maintained at the voltage VC2, which is greater than the instantaneous magnitude Vin of the output voltage from the rectifier circuit 2, immediately after the switching element Q1 is turned off.

Upon subsequent completion of discharge of the capacitor C3001, current flows along the fourth current path in accompaniment to discharge of the magnetic energy from the inductor L3002. At the same time, current flows along the fifth current path due to the instantaneous magnitude Vin of the output voltage becoming at least equal to the voltage VC2 across the terminals of the capacitor C3002. In accordance with a difference between the instantaneous magnitude Vin of the output voltage from the rectifier circuit 2 and the voltage VC2 across the terminals of the capacitor C3002, the cathode voltage VD3 of the diode D3003 decreases to a voltage VCth2 which is lower than the instantaneous magnitude Vin of the output voltage by an amount equal to the turn-on voltage Von of the diode D3003 (period between times T2 and T3 in section (d) of FIG. 20). The current Iin flowing from the power supply AC to the voltage conversion circuit 3003, via the rectifier circuit 2, increases in accompaniment to increasing current flowing along the fifth current path (period between times T2 and T3 in section (e) of FIG. 20).

Upon subsequent completion of discharge of the magnetic energy accumulated in the inductor L3002, the current IL2 in the inductor L3002 becomes equal to zero (period between times T3 and T4 in section (b) of FIG. 20). Also, a current is generated along the sixth current path. The capacitors C3001 and C3002 are charged through the current flowing along the sixth current path, and the voltage VC1 across the terminals of the capacitor C3001 increases (period between times T3 and T4 in section (c) of FIG. 20). Once the cathode voltage VD3 of the diode D3003 has decreased to the voltage VCth2, which is lower than the instantaneous magnitude Vin of the output voltage from the rectifier circuit 2 by the amount equal to the turn-on voltage Von of the diode D3003, the cathode voltage VD2 is maintained at the voltage VCth2 during the above period (period between times T3 and T4 in section (d) of FIG. 20). In a situation in which the cathode voltage VD3 decreases to the voltage VCth2 during the period between times T2 and T3, the cathode voltage VD3 is simply maintained at the voltage VCth2 during the period between times T3 and T4. As charging of the capacitors C3001 and C3002 approaches completion, the current flowing along the sixth current path decreases. The current Iin, which flows from the power supply AC to the voltage conversion circuit 3003 via the rectifier circuit 2, also decreases in accompaniment to the above (period between times T3 and T4 in section (e) of FIG. 20).

Upon the switching element Q1 being turned on once again, the current IL2 is generated along the first current path (refer to sections (a) and (b) of FIG. 20), and a current is generated along the current path C. The phenomenon described above is repeated in accordance with on-off operation of the switching element Q1.

As explained above, the cathode voltage VD3 of the diode D3003 and the current Iin vary in accordance with on-off operation of the switching element Q1. If on-off operation of the switching element Q1 is performed at high frequency, the cathode voltage VD3 and the current Iin also exhibit high frequency variation in accordance with operation of the switching element Q1.

Figure 21:
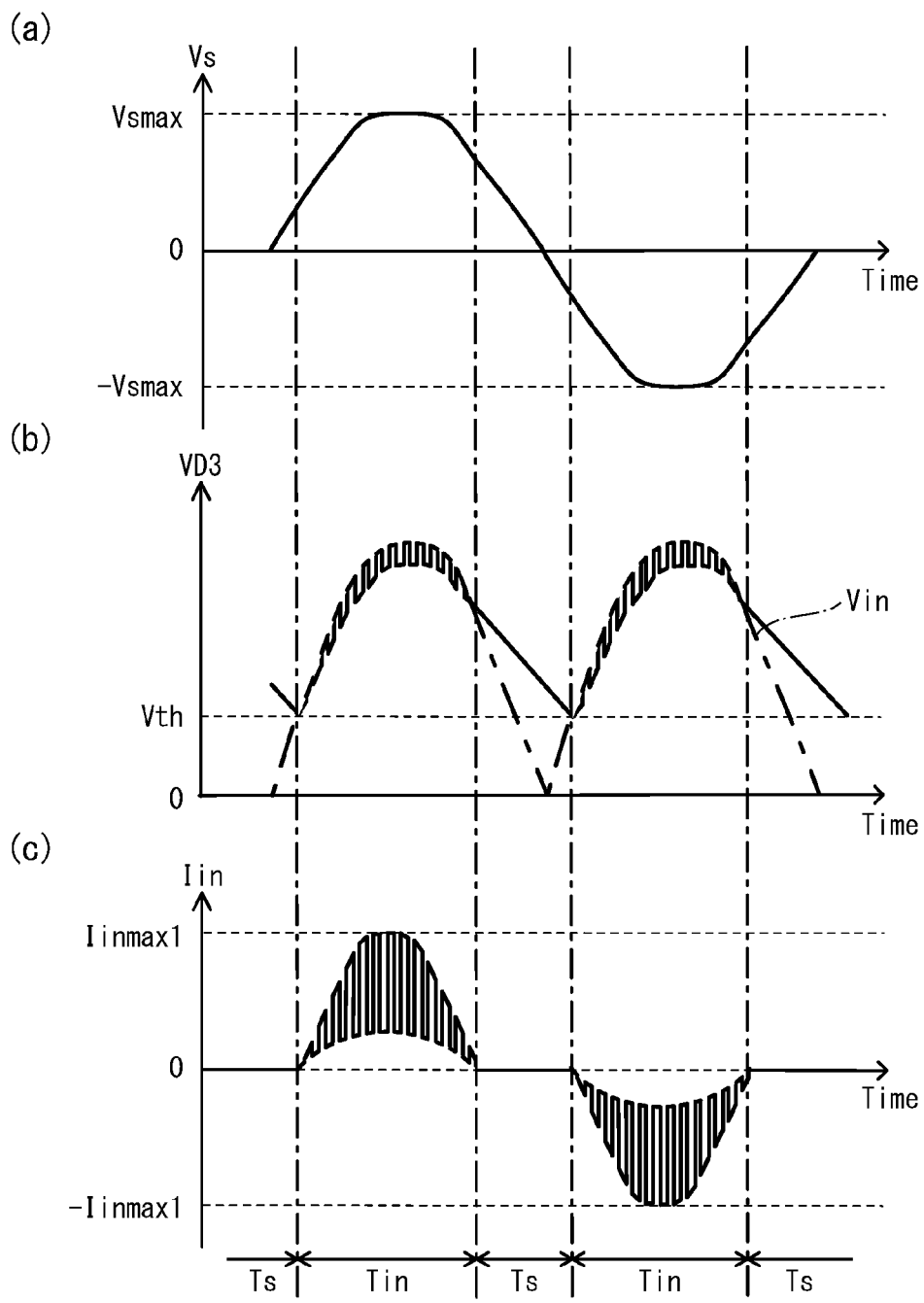
FIG. 21 illustrates, for the DC power supply circuit relating to the third embodiment, a time series waveform of input voltage to the rectifier circuit from the AC power supply in section (a), a time series waveform of cathode voltage of the diode in section (b), and a time series waveform of input current to the rectifier circuit from the AC power supply in section (c).

Section (a) of FIG. 21 illustrates a time series waveform of an input voltage Vs to the rectifier circuit 2 in the DC power supply circuit 3001 from the power supply AC. Section (b) of FIG. 21 illustrates a time series waveform of the cathode voltage VD3 of the diode D3003. Section (c) of FIG. 21 illustrates a time series waveform of the current Iin flowing from the rectifier circuit 2 to the voltage conversion circuit 3003. Note that a dashed line in section (b) of FIG. 21 illustrates a time series waveform of the instantaneous magnitude Vin of the output voltage from the rectifier circuit 2.

The time series waveform of the input voltage Vs to the rectifier circuit 2 from the power supply AC has a sinusoidal shape. The time series waveform of the instantaneous magnitude Vin of the output voltage from the rectifier circuit 2 has an approximately pulsating shape that exhibits maximums at times coinciding with maximums of an absolute value of the input voltage Vs (refer to the dashed line in section (b) of FIG. 21).

During a period in which the instantaneous magnitude Vin of the output voltage from the rectifier circuit 2 is at least equal to the voltage VC2 across the terminals of the capacitor C3002 (period Tin in section (b) of FIG. 21), the cathode voltage VD3 of the diode D3003 changes between the voltage VC2, which is greater than the instantaneous magnitude Vin of the output voltage, and the voltage VCth2, which is lower than the instantaneous magnitude Vin of the output voltage by the amount equal to the turn-on voltage Von of the diode D3003 (refer to section (b) of FIG. 21). In terms of the current Iin flowing from the power supply AC to the voltage conversion circuit 3003, via the rectifier circuit 2, during the period Tin, the current Iin decreases dramatically when the cathode voltage VD3 is the voltage VC2, which is greater than the instantaneous magnitude Vin of the output voltage from the rectifier circuit 2, and continues to flow when the cathode voltage VD3 is the voltage VCth2, which is lower than the instantaneous magnitude Vin of the output voltage (refer to section (c) of FIG. 21). Note that due to presence of the inductor NF, a small amount of the aforementioned current flows even when the cathode voltage VD3 is equal to the voltage VC2.

The cathode voltage VD3 of the diode D3003 changes at high frequency in synchronization with on-off operation of the switching element Q1. A wave envelope of the voltage VC2 is dependent on a time constant determined by the inductor L3002, the load 11, and the capacitor C3002 included in the third current path, and lags behind the pulsating shape of the output voltage from the rectifier circuit 2. As a consequence, at a time at which the instantaneous magnitude Vin of the output voltage from the rectifier circuit 2 is at a maximum value, the voltage VCth2 is low compared to the maximum value. Once the instantaneous magnitude Vin of the output voltage from the rectifier circuit 2 has reached the maximum value, the instantaneous magnitude Vin of the output voltage is maintained at least equal to the voltage VCth2 during a period until the instantaneous magnitude Vin of the output voltage is equal to the voltage VC2 across the terminals of the capacitor C3002. During the turned-off period of the switching element Q1, current continues to flow from the output terminal at the high-potential side of the rectifier circuit 2 to the output terminal at the low-potential side of the rectifier circuit 2 along the third current path, the fifth current path, or the sixth current path.

On the other hand, during a period in which the instantaneous magnitude Vin of the output voltage from the rectifier circuit 2 is lower than the voltage VC2 across the terminals of the capacitor C3002 (refer to period Ts in section (b) of FIG. 21), the cathode voltage VD3 is maintained at greater than the instantaneous magnitude Vin of the output voltage, and the current Iin flowing from the power supply AC to the voltage conversion circuit 3003, via the rectifier circuit 2, is cut-off (refer to sections (b) and (c) of FIG. 21).

As described above, a period during which the instantaneous magnitude Vin of the output voltage from the rectifier circuit 2 is at least equal to the voltage VC2 across the terminals of the capacitor C3002, which in other words is a period during which the diode D3003 is intermittently in the turned-on state, is extended to longer than a half cycle of the output voltage from the rectifier circuit 2, thereby improving power factor.

Also, the time series waveform of the input current Iin exhibits maximums at similar times to maximums of a difference between the instantaneous magnitude of output voltage from the rectifier circuit 2 and the voltage VC2 across the terminals of the capacitor C3002. In other words, as illustrated in FIG. 21, during each period Tin a maximum of the difference between the instantaneous magnitude Vin of the output voltage from the rectifier circuit 2 and the voltage VC2 across the terminals of the capacitor C3002 occurs at a time approximately corresponding to the middle of the period Tin. The above occurs as a result of input current to the capacitor C3002 during the turned-off period of the switching element Q1, and thus also the current Iin flowing from the power supply AC to the voltage conversion circuit 3003 via the rectifier circuit 2, increasing in accordance with increasing difference between the instantaneous magnitude Vin of the output voltage from the rectifier circuit 2 and the voltage VC2 across the terminals of the capacitor C3002.

Note that a threshold voltage Vth is determined by electrostatic capacitance of the capacitors C3001 and C3002, and inductance of the inductor L3002. Therefore, the threshold voltage Vth can be set freely by changing the electrostatic capacitance of the capacitors C3001 and C3002, or the inductance of the inductor L3002.

The following explains characteristics of the DC power supply circuit 3001 relating to the present embodiment through comparison with a DC power supply circuit 1001 relating to a comparative example.

Figure 22:
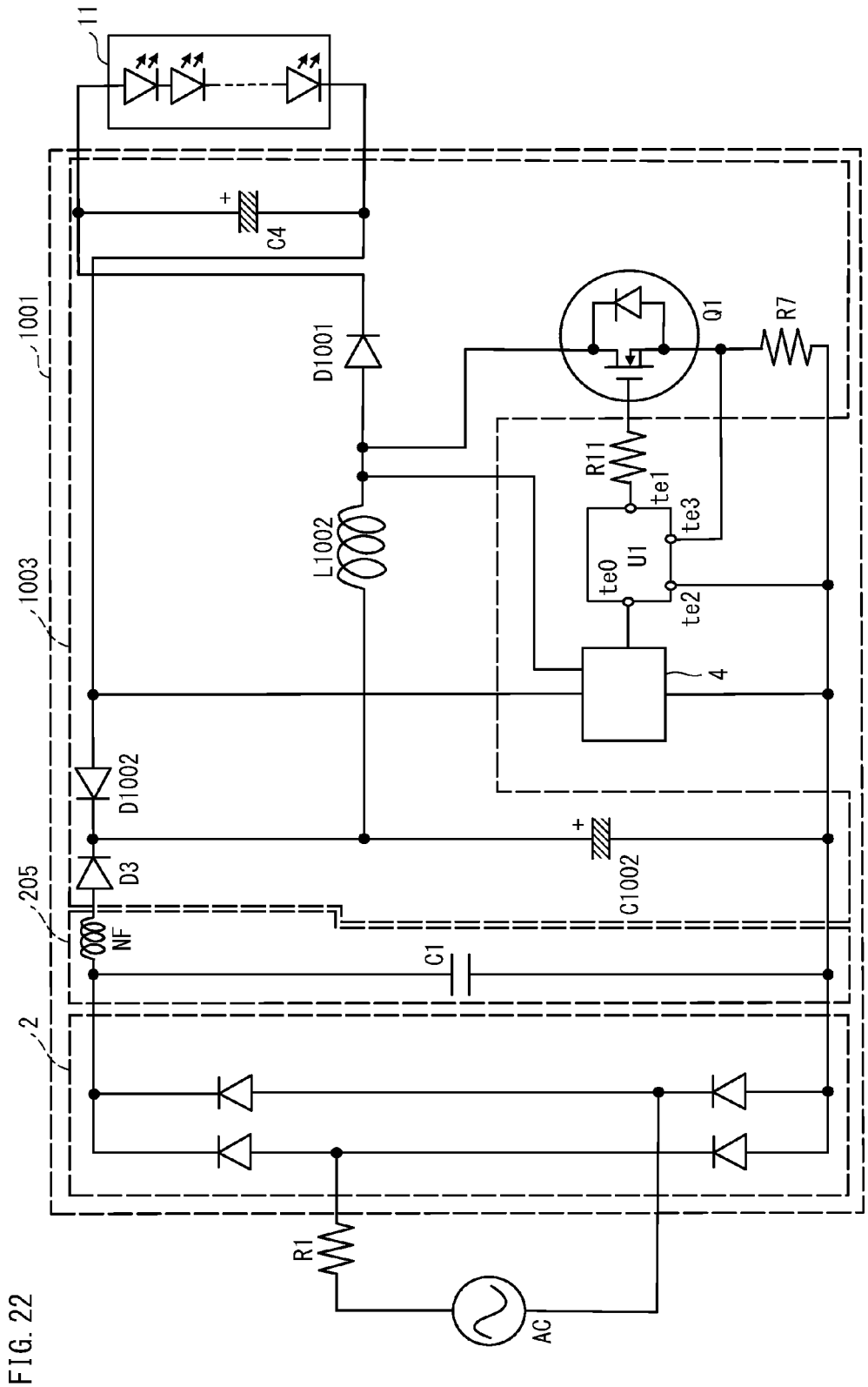
FIG. 22 is a circuit diagram illustrating a DC power supply circuit relating to a comparative example.

FIG. 22 is a circuit diagram illustrating the DC power supply circuit 1001 relating to the comparative example. Note that elements of configuration that are the same as in the third embodiment are labeled using the same reference signs and explanation thereof is omitted where appropriate.

The DC power supply circuit 1001 includes a voltage conversion circuit 1003. The voltage conversion circuit 1003 includes a switching element Q1, an inductor L1002, diodes D3, D1001, and D1002, capacitors C4 and C1002, and a resistor R7. A first terminal of the inductor L1002 is connected to a drain of the switching element Q1. An anode of the diode D1002 is connected to the load 11 and a cathode of the diode D1002 is connected to the capacitor C1002.

A first terminal of the capacitor C4 is connected to a cathode of the diode D1001 and a second terminal of the capacitor C4 is connected to the anode of the diode D1002.

The DC power supply circuit 1001 relating to the comparative example differs from the DC power supply circuit 3001 in terms that the capacitor C1002 is connected across the output terminals of the rectifier circuit 2.

Section (a) of FIG. 23 illustrates a time series waveform of the input voltage Vs to the rectifier circuit 2 in the DC power supply circuit 3001 from the power supply AC. Section (b-1) of FIG. 23 illustrates a time series waveform of the cathode voltage VD3 of the diode D3003 in the DC power supply circuit 3001. Section (b-2) of FIG. 23 illustrates a time series waveform of the current Iin flowing from the power supply AC to the rectifier circuit 2 in the DC power supply circuit 3001. Section (c-1) of FIG. 23 illustrates a time series waveform of the cathode voltage VD3 of the diode D3 in the DC power supply circuit 1001 relating to the comparative example. Section (c-2) of FIG. 23 illustrates a time series waveform of the current Iin flowing from the power supply AC to the rectifier circuit 2 in the DC power supply circuit 1001. In the present comparison, electrical power supplied from the power supply AC and electrical power supplied to the load 11 are set approximately equal for the DC power supply circuit 3001 and the DC power supply circuit 1001.

As can be seen from comparison of sections (b-1) and (b-2) of FIG. 23 with sections (c-1) and (c-2) of FIG. 23, a period Tin during which the current Iin flows intermittently from the power supply AC to the rectifier circuit 2 in the DC power supply circuit 3001 is longer than an equivalent period Tin0 for the DC power supply circuit 1001 relating to the comparative example, during which the current Iin flows from the power supply AC to the rectifier circuit 2 in the DC power supply circuit 1001. Also, a maximum value (wave height) Iinmax1 of the input current Iin for the DC power supply circuit 3001 is low compared to a maximum value (wave height) Iinmax2 of the input current Iin for the DC power supply circuit 1001 relating to the comparative example. Due to electrical power supplied from the power supply AC and electrical power supplied to the load 11 being set approximately equal for the DC power supply circuit 3001 and the DC power supply circuit 1001, an integrated value of the input current Iin over time is approximately equal for the DC power supply circuit 3001 and the DC power supply circuit 1001. In other words, compared to the DC power supply circuit 1001 relating to the comparative example, for the DC power supply circuit 3001 the time series waveform of the input current Iin has a low wave height and the period Tin during which the input current Iin flows is long. Therefore, the DC power supply circuit 3001 enables power factor improvement relative to the DC power supply circuit 1001 relating to the comparative example. In fact, the DC power supply circuit 1001 relating to the comparative example achieves a power factor of 0.58 with respect to an input electrical power of 5.45 W, whereas the DC power supply circuit 3001 relating to the third embodiment achieves a power factor of 0.82 with respect to an input electrical power of 5.77 W, even when increased loss due to environmental considerations such as various types of noise and in-rush is taken into account. In a conventional DC power supply circuit, typically a reduction of approximately 5% occurs when losses due to environmental considerations are included. In contrast, the DC power supply circuit 3001 has an advantageous effect of enabling circuit efficiency to be maintained at approximately 82%.

In the DC power supply circuit 3001, an increase in a ratio of electrostatic capacitance of the capacitor C3001 relative to electrostatic capacitance of the capacitor C3002 (herein, referred to as a capacitance ratio) results in a decrease in power factor. In an actual example, the DC power supply circuit 3001 has a power factor of 0.82 when the capacitor C3001 has an electrostatic capacitance of 0.022 μF and when the capacitor C3002 has an electrostatic capacitance of 7.5 μF (i.e., when the capacitance ratio is 0.022/7.5), whereas the power factor of the DC power supply circuit 3001 is reduced to 0.71 when the electrostatic capacitance of the capacitor C3001 is increased to 0.1 μF (i.e., when the capacitance ratio is 0.1/7.5). Reasoning for the above is that as the electrostatic capacitance of the capacitor C3001 increases, a voltage division ratio for the capacitor C3001 relative to the capacitor C3002 decreases causing influence of discharge of the capacitor C3001 to be reduced relative to the capacitor C3002.

To summarize, in the DC power supply circuit 3001 relating to the present embodiment, current flows from the output terminal at the high-potential side of the rectifier circuit 2 to the output terminal at the low-potential side of the rectifier circuit 2 during each turned-off period of the switching element Q1, flowing along the third current path, the fifth current path, or the sixth current path. The third current path, the fifth current path, and the sixth current path are equivalent to the inter-terminal current paths described further above. The capacitor C3002 is first charged through the third current path or the fifth current path, and is subsequently charged through the sixth current path. During a subsequent turned-on period of the switching element Q1, magnetic energy is accumulated in the inductor L3002 due to current generated by discharge of the capacitor C3002 flowing through the inductor L3002. The magnetic energy accumulated in the inductor L3002 is supplied toward the load 11 during a subsequent turned-off period of the switching element Q1. The third current path, the fifth current path, and the sixth current path are each formed intermittently through repeated on-off operation of the switching element Q1.

During a half cycle of the instantaneous magnitude Vin of the output voltage from the rectifier circuit 2, a charging voltage of the capacitor C3002 lags behind the instantaneous magnitude Vin of the output voltage. As a consequence, at a time at which the instantaneous magnitude Vin of the output voltage from the rectifier circuit 2 is at a maximum value, the voltage VC2 across the terminals of the capacitor C3002 is low compared to the maximum value. Furthermore, once the instantaneous magnitude Vin of the output voltage from the rectifier circuit 2 has reached the maximum value, the instantaneous magnitude Vin of the output voltage continues to be greater than the voltage VC2 across the terminals of the capacitor C3002 during a period lasting until the instantaneous magnitude Vin of the output voltage and the voltage VC2 become equal. In a single cycle of the instantaneous magnitude Vin of the output voltage from the rectifier circuit 2, during a period from the instantaneous magnitude Vin of the output voltage starting to increase until the instantaneous magnitude Vin of the output voltage becomes equal to the voltage VC2 across the terminals of the capacitor C3002, current continues to flow intermittently from the output terminal at the high-potential side of the rectifier circuit 2 to the output terminal at the low-potential side of the rectifier circuit 2, along the third current path, the fifth current path, or the sixth current path, through repeated on-off operation of the switching element Q1. In other words, current flows intermittently from the output terminal at the high-potential side of the rectifier circuit 2 to the output terminal at the low-potential side of the rectifier circuit 2 throughout a period which is longer than a half cycle of the output voltage from the rectifier circuit 2.

As explained above, in the present configuration a period is present during which current flows from the power supply AC to the capacitor C3002, via the rectifier circuit 2, even after the instantaneous magnitude Vin of the output voltage from the rectifier circuit 2 reaches the maximum value. Therefore, compared to a configuration in which current flowing from the power supply AC to the capacitor C3002, via the rectifier circuit 2, is cut-off once the instantaneous magnitude Vin of the output voltage from the rectifier circuit 2 reaches the maximum value, the present configuration enables lengthening of a period during which current flows through the rectifier circuit 2, and thereby enables power factor improvement.

In general, a DC power supply circuit that is designed in order to improve power factor has a configuration in which a PFC circuit is connected to a rectifier circuit and a voltage conversion circuit is connected to the PFC circuit, downstream thereof. The PFC circuit includes elements such as a switching element, an inductor, and a control IC. In contrast to the above, the DC power supply circuit 3001 relating to the present embodiment improves power factor without the need to provide a PFC circuit. Therefore, the DC power supply circuit 3001 relating to the present embodiment has advantageous effects of reduced circuit size and improved circuit efficiency by reducing power loss due to the PFC circuit.

Fourth Embodiment

The first embodiment was explained for an example in which the voltage conversion circuit 3 is a step-down chopper circuit, but the above is not a limitation. Alternatively, the voltage conversion circuit 3 may be a step-up/step-down chopper circuit.

Figure 24:
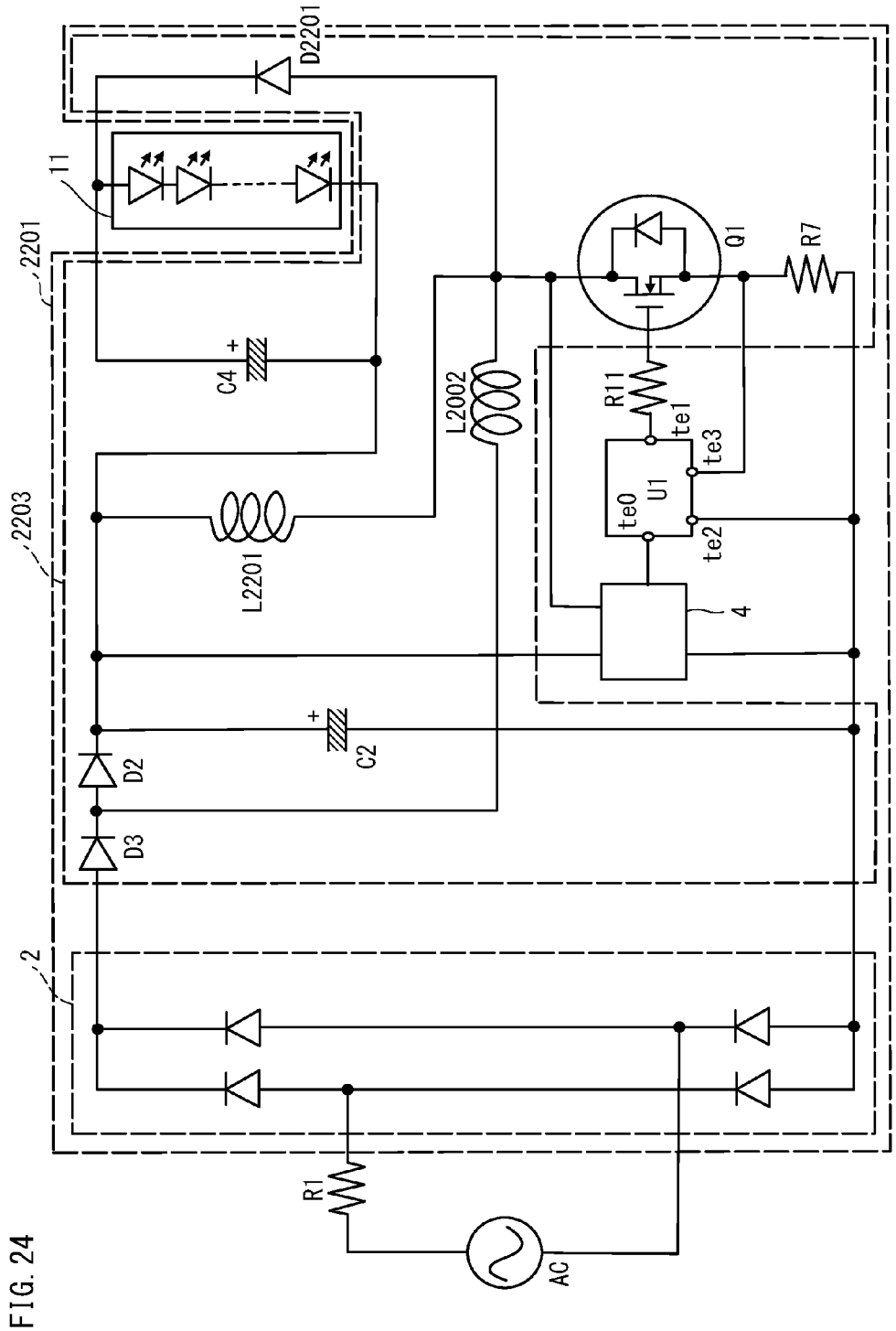
FIG. 24 is a circuit diagram illustrating a DC power supply circuit relating to a fourth embodiment.

FIG. 24 illustrates a circuit diagram of a DC power supply circuit 2201 relating to the present embodiment.

As illustrated in FIG. 24, a voltage conversion circuit 2203 is a step-up/step-down chopper circuit and connection relationship of an inductor (first inductor) L2201 and the load 11 differs from the first embodiment.

More specifically, a first terminal of the inductor L2201 is connected not only to the load 11, but also to the capacitor C2, and a second terminal of the inductor L2201 is connected to the drain of the switching element Q1. The first terminal of the inductor L2201 is connected directly to the capacitor C2 without passing through the load 11.

The following explains operation of the DC power supply circuit 2201 relating to the present embodiment.

When the DC power supply circuit 2201 starts up, the switching element Q1 is in the turned-off state and upon a voltage being input to the voltage conversion circuit 2203 from the rectifier circuit 2, an in-rush current flows to the capacitor C2 from the output terminal at the high-potential side of the rectifier circuit 2, via the diode D3 and the diode D2. Through the above, the capacitor C2 is charged to a voltage that is approximately equal to the output voltage from the rectifier circuit 2. Subsequently, current paths explained below are formed in the DC power supply circuit 2201 in accordance with on-off operation of the switching element Q1.

Figure 25A:
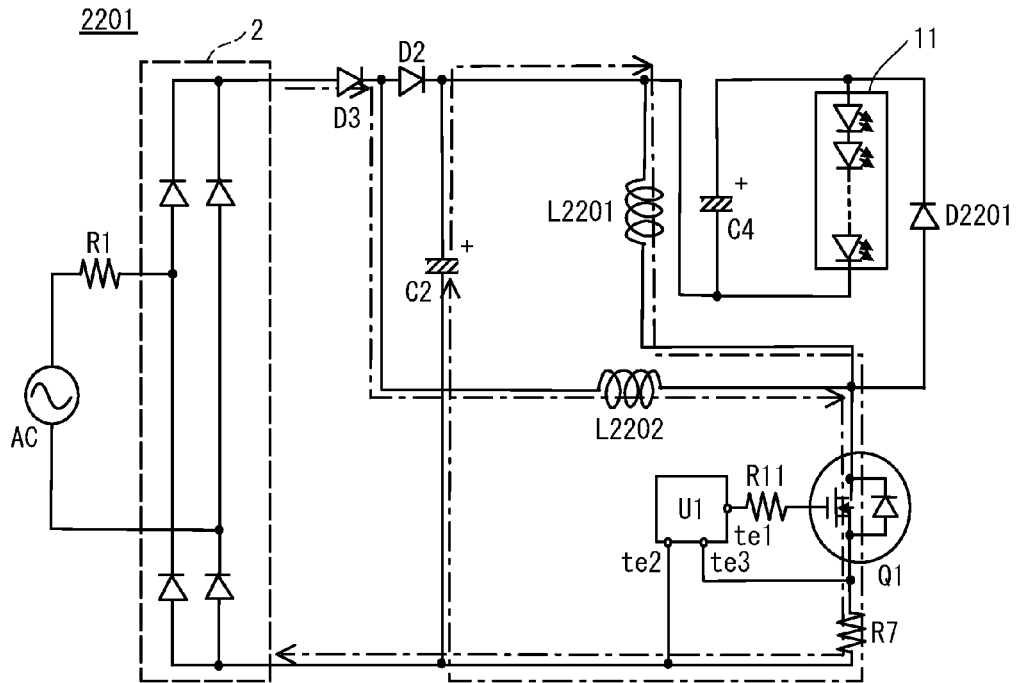
FIGS. 25A and 25B are circuit diagrams illustrating the DC power supply circuit relating to the fourth embodiment and flow of current in the DC power supply circuit.
Figure 25B:
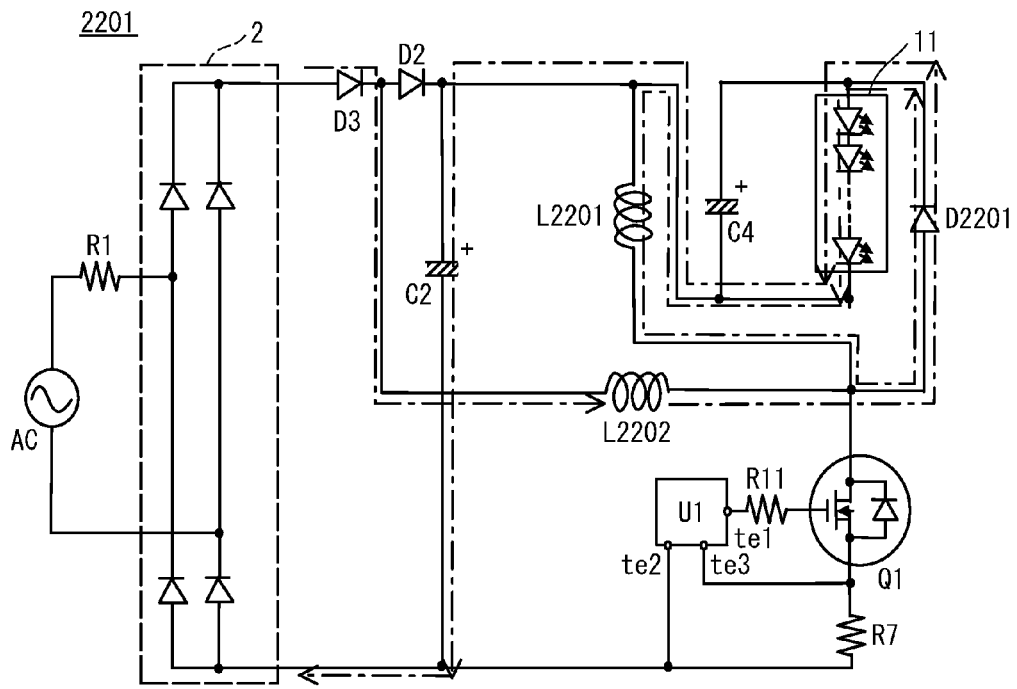
Figure 26:
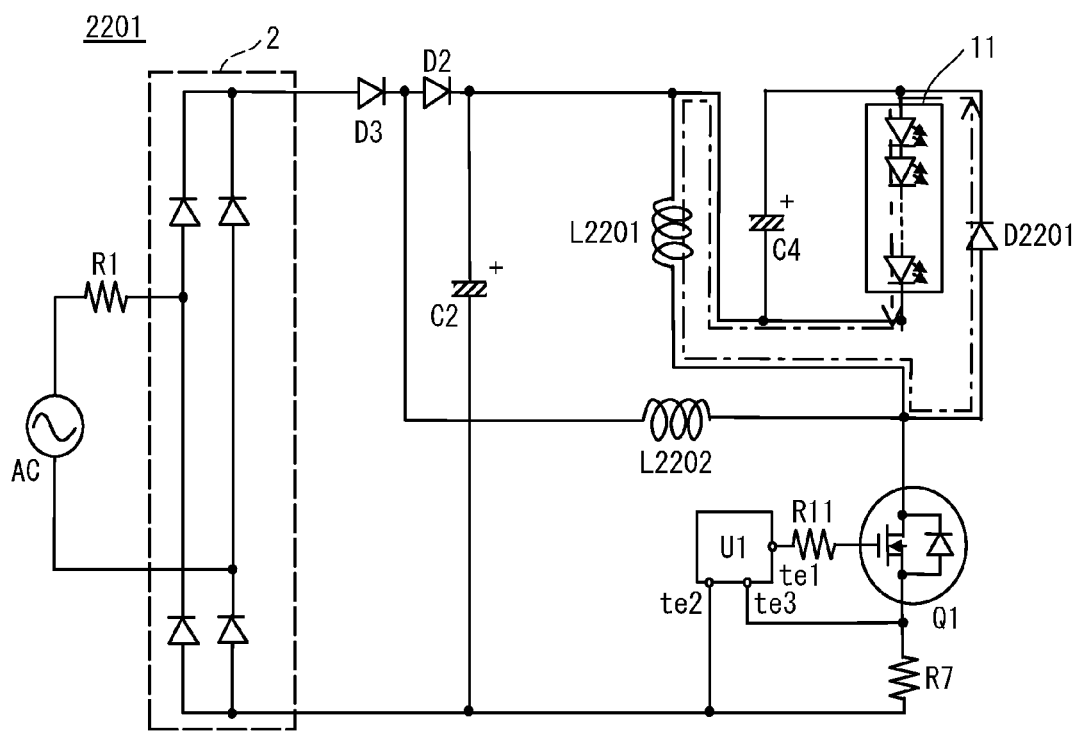
FIG. 26 is a circuit diagram illustrating the DC power supply circuit relating to the fourth embodiment and flow of current in the DC power supply circuit.

FIGS. 25A, 25B, and 26 are circuit diagrams illustrating the DC power supply circuit 2201 and flow of current in the DC power supply circuit 2201. Note that illustration of the fixed voltage circuit 4 is omitted in FIGS. 25A, 25B, and 26.

FIG. 25A illustrates flow of current when the switching element Q1 is in the turned-on state. FIGS. 25B and 26 illustrate flow of current when the switching element Q1 is in the turned-off state.

As illustrated in FIG. 25A, upon the switching element Q1 being turned on, a current path (herein, referred to as a first current path) is formed that extends from the output terminal at the high-potential side of the rectifier circuit 2 to the output terminal at the low-potential side of the rectifier circuit 2, via the diode D3, an inductor (second inductor) L2202, the switching element Q1, and a resistor R7 in respective order. At the same time, a current path (herein, referred to as a second current path) is formed that extends from the second terminal of the capacitor C2 to the first terminal of the capacitor C2, via the inductor L2201, the switching element Q1, and the resistor R7 in respective order. During the above, a voltage across the terminals of the capacitor C2 becomes greater than an output voltage from the rectifier circuit 2 and the diode D2 is in the non-conducting state. The diode D2201 is also in the non-conducting state due to electric potential at a node between the inductor L2202 and the switching element Q1 being approximately equal to 0 V. Magnetic energy accumulates in the inductor L2201 through current flowing along the second current path. The second current path is equivalent to a discharge path along which electrical charge accumulated in the capacitor C2 during a previous turned-off period of the switching element Q1 is discharged. Magnetic energy also accumulates in the inductor L2202 due to current flowing along the first current path.

On the other hand, as illustrated in FIG. 25B, upon the switching element Q1 being turned off, a current path (herein, referred to as a third current path) is formed that extends from the output terminal at the high-potential side of the rectifier circuit 2 to the output terminal at the low-potential side of the rectifier circuit 2, via the diode D3, the inductor L2202, the diode D2201, the load 11, and the capacitor C2. At the same time, a current path (herein, referred to as a fourth current path) is formed that extends from the second terminal of the inductor L2201 to the first terminal of the inductor L2201, via the diode D2201 and the load 11. During the above, electric potential of the node between the inductor L2201 and the switching element Q1 becomes greater than electric potential of a node between the load 11 and a cathode of the diode D2201 by an amount equal to a turn-on voltage of the diode D2201, and the diode D2201 is in a conducting state. Also, when the magnetic energy accumulated in the inductor L2202 is discharged, the capacitor C2 is charged through current flowing along the third current path.

As illustrated in FIG. 26, upon subsequent completion of discharge of the magnetic energy accumulated in the inductor L2202, current flowing along the third current path is cut-off and current continues to flow along the fourth current path until discharge of the magnetic energy accumulated in the inductor L2201 is completed.

In the DC power supply circuit 2201 relating to the present embodiment, current flows from the output terminal at the high-potential side of the rectifier circuit 2 to the output terminal at the low-potential side of the rectifier circuit 2 during each turned-on period of the switching element Q1, passing along the first current path, and current flows from the output terminal at the high-potential side of the rectifier circuit 2 to the output terminal at the low-potential side of the rectifier circuit 2 even during each turned-off period of the switching element Q1, passing along the third current path. The first current path and the third current path are equivalent to the inter-terminal current paths described further above. The switching element Q1 switches between the turned-on state and the turned-off state a plurality of times during each half cycle of the power supply AC, and thus current continues to flow from the rectifier circuit 2 to the voltage conversion circuit 2203 substantially throughout the half cycle. Through the above, power factor of the DC power supply circuit 2201 relative to the power supply AC is improved.

Furthermore, the capacitor C2 is charged through current flowing along the third current path each time the switching element Q1 is turned off, ensuring that the voltage across the terminals of the capacitor C2 only exhibits a relatively small amount of variation. As a consequence, the above configuration also suppresses variation in current flowing to the load 11 along the fourth current path from the second terminal of the capacitor C2. The DC power supply circuit 2201 therefore enables operation of the load 11 in a state in which only a relatively small amount of variation occurs in current flowing therein.

Fifth Embodiment

Figure 27:
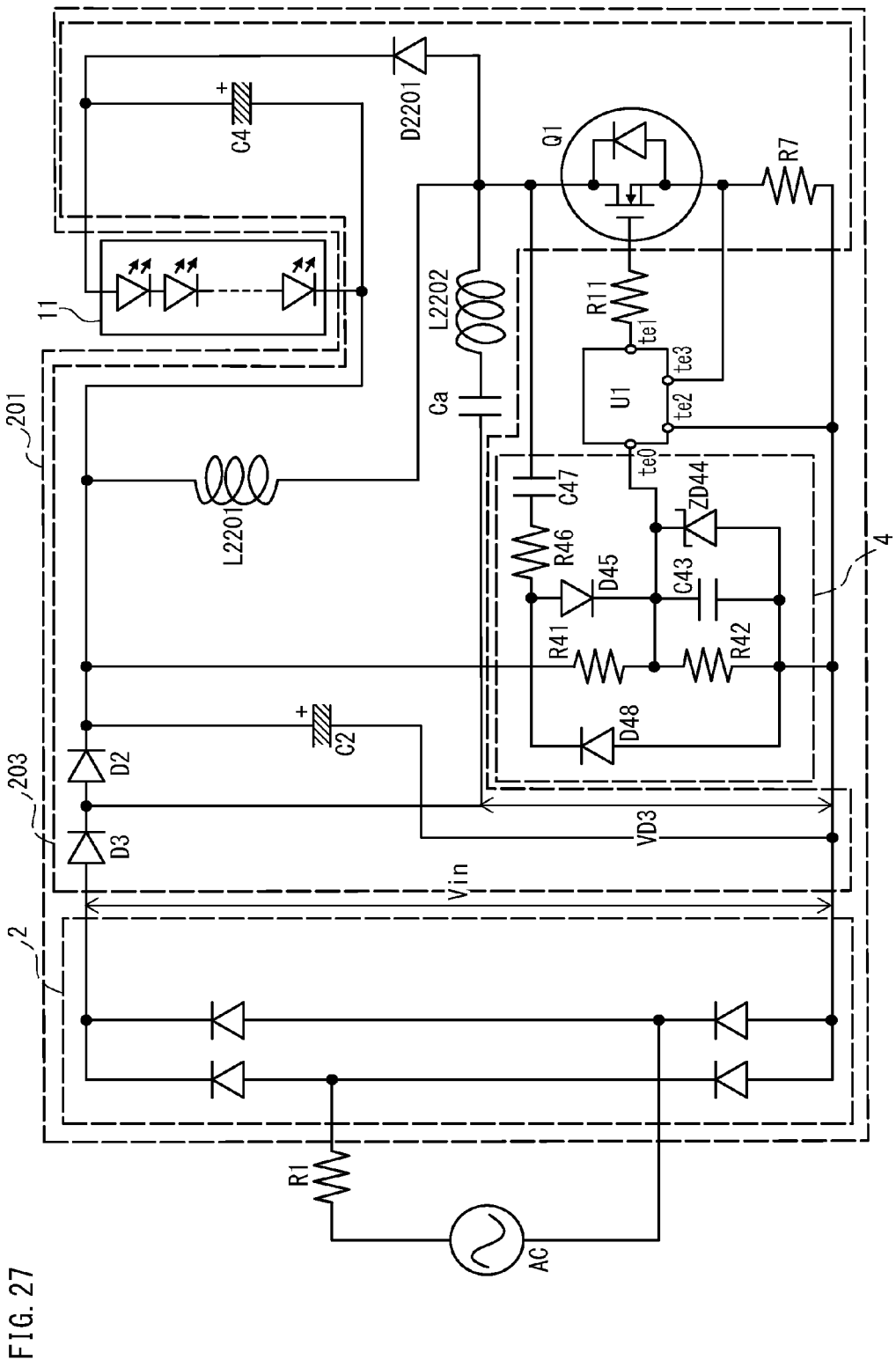
FIG. 27 is a circuit diagram illustrating a DC power supply circuit relating to a fifth embodiment.

FIG. 27 illustrates a circuit diagram of a DC power supply circuit 201 relating to the present embodiment.

As illustrated in FIG. 27, configuration of a voltage conversion circuit 203 in the DC power supply circuit 201 differs from voltage conversion circuit configuration in the fourth embodiment. More specifically, the voltage conversion circuit 203 further includes a capacitor (auxiliary capacitor) Ca that is connected in series to the inductor L2202 in a circuit path extending from the second terminal of the inductor L2201 to the output terminal at the high-potential side of the rectifier circuit 2 and including the inductor L2202. A first terminal of the capacitor Ca is connected to the output terminal at the high-potential side of the rectifier circuit 2 and a second terminal of the capacitor Ca is connected to the inductor L2202. Note that elements of configuration that are the same as in the fourth embodiment are labeled using the same reference signs and explanation thereof is omitted where appropriate.

The following explains operation of the DC power supply circuit 201 relating to the present embodiment.

Figure 28A:
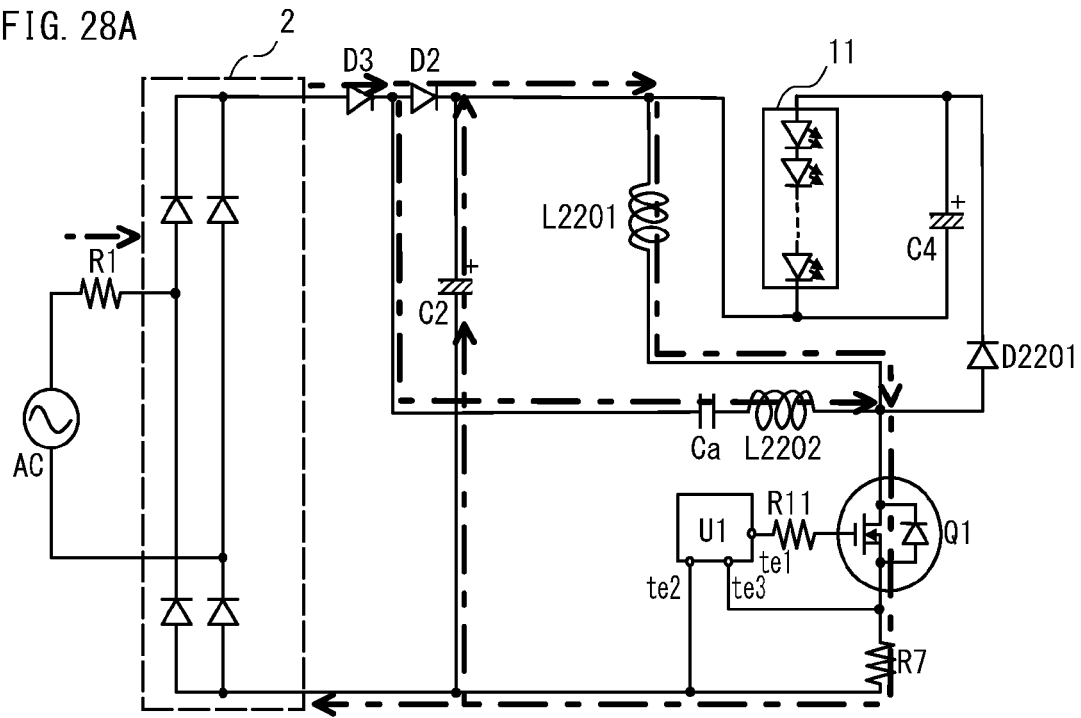
FIGS. 28A and 28B are circuit diagrams illustrating the DC power supply circuit relating to the fifth embodiment and flow of current in the DC power supply circuit.
Figure 28B:
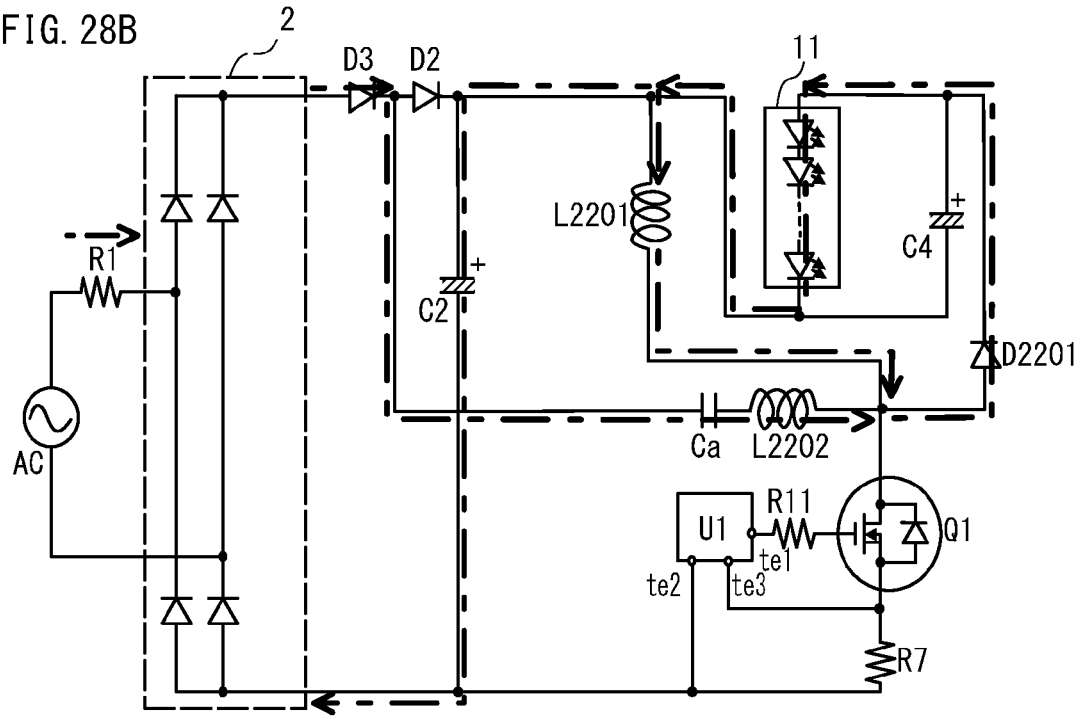

FIGS. 28A and 28B are circuit diagrams illustrating the DC power supply circuit 201 relating to the present embodiment and flow of current in the DC power supply circuit 201. Note that illustration of the fixed voltage circuit 4 is omitted in FIGS. 28A and 28B.

Figure 29:
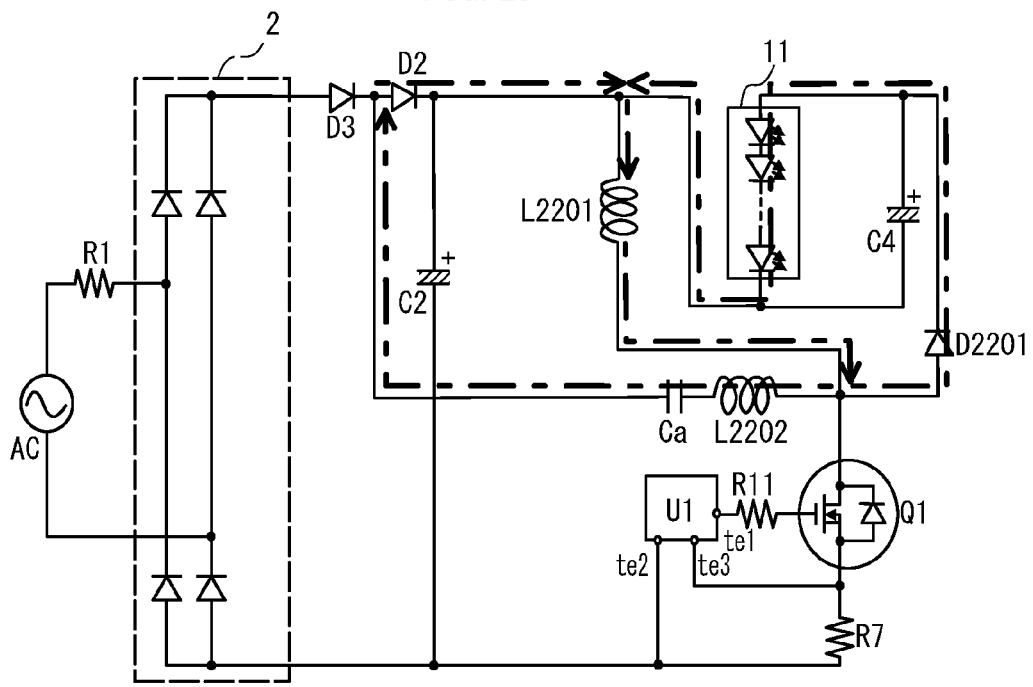
FIG. 29 is a circuit diagram illustrating the DC power supply circuit relating to the fifth embodiment and flow of current in the DC power supply circuit.

FIG. 28A illustrates flow of current when the switching element Q1 is in the turned-on state. FIGS. 28B and 29 illustrate flow of current when the switching element Q1 is in the turned-off state.

As illustrated in FIG. 28A, upon the switching element Q1 being turned on, a current path (herein, referred to as a first current path) is formed that extends from the output terminal at the high-potential side of the rectifier circuit 2 to the output terminal at the low-potential side of the rectifier circuit 2, via the diode D3, the capacitor (auxiliary capacitor) Ca, the inductor L2202, and the switching element Q1 in respective order. At the same time, a current path (herein, referred to as a second current path) is formed that extends from the second terminal of the capacitor C2 to the first terminal of the capacitor C2, via the inductor L2201, the switching element Q1, and the resistor R7 in respective order. Also, a current path (herein, referred to as current path B) is formed that extends from the output terminal at the high-potential side of the rectifier circuit 2 to the output terminal at the low-potential side of the rectifier circuit 2, via the diode D3, the diode D2, the inductor L2201, the switching element Q1, and the resistor R7 in respective order.

During the above, the capacitor Ca is charged and magnetic energy accumulates in the inductor L2202 through current flowing along the first current path from the output terminal at the high-potential side of the rectifier circuit 2. Magnetic energy also accumulates in the inductor L2201 through current flowing along the second current path and the current path B.

Note that current supplied to the inductor L2201 from the second terminal of the capacitor C2 decreases as the capacitor C2 discharges. With respect to the above, in the DC power supply circuit 201, current is supplied to the inductor L2201 through current flowing along the second current path and also through current flowing along the current path B, thereby restricting the decrease in current flowing to the inductor L2201.

On the other hand, as illustrated in FIG. 28B, upon the switching element Q1 being turned off, a current path (herein, referred to as a third current path) is formed that extends from the output terminal at the high-potential side of the rectifier circuit 2 to the output terminal at the low-potential side of the rectifier circuit 2, via the diode D3, the capacitor Ca, the inductor L2202, the diode D2201, the load 11, and the capacitor C2. At the same time, a current path (herein, referred to as a fourth current path) is formed that extends from the second terminal of the inductor L2201 to the first terminal of the inductor L2201, via the diode D2201 and the load 11 in respective order.

During the above, the capacitor C2 is charged through current flowing along the third current path and the magnetic energy accumulated in the inductor L2201 is discharged toward the load 11 through current flowing along the fourth current path. Charging of the capacitor Ca also continues through current flowing along the third current path.

As illustrated in FIG. 29, once charging of the capacitor Ca is completed while the switching element Q1 is in the turned-off state, discharge of the capacitor Ca starts soon thereafter. Thus, a current path (herein, referred to as a fifth current path) is formed that extends from the first terminal of the capacitor Ca to the second terminal of the capacitor Ca, via the diode D2, the inductor L2201, and the inductor L2202 in respective order. Current also continues to flow along the fourth current path. Energy accumulated in the capacitor Ca is transferred to the inductor L2201 as magnetic energy. The magnetic energy which is transferred to the inductor L2201 is supplied to the load 11 from the second terminal of the inductor L2201, via the diode D2201 and the load 11, along the fourth current path. Therefore, the magnetic energy is not lost from the circuit.

In the present embodiment, a time series waveform of the cathode voltage VD3 of the diode D3 is the same as time series waveforms illustrated in section (d) of FIG. 11 and section (d) of FIG. 12. Also, a time series waveform of the current ID3 flowing through the diode D3 in the present embodiment is the same as the time series waveforms illustrated in section (e) of FIG. 11 and section (e) of FIG. 12. Consequently, in the same way as in the second embodiment, throughout each half cycle of AC supplied to the rectifier circuit 2 from the power supply AC, current continues to flow intermittently from the power supply AC to the voltage conversion circuit 203, via the rectifier circuit 2, in accordance with on-off operation of the switching element Q1 (refer to sections (c) and (d) of FIG. 13). The first current path and the third current path are equivalent to the inter-terminal current paths described further above.

Modified Examples (1) In the first embodiment, the fixed voltage circuit 4 is explained for an example of configuration in which the capacitor C47 is charged during each turned-off period of the switching element Q1 through current supplied from the inductors L1 and L2, and the electrical charge accumulated in the capacitor C47 is transferred to the capacitor C43 during each turned-on period of the switching element Q1 through discharge of the capacitor C47 via the diode D48. However, configuration of the fixed voltage circuit 4 and supply of current thereto are not limited to the configuration described above. For example, alternatively a transformer may be included in place of the inductor L2 and current may be supplied to the fixed voltage circuit 4 from a secondary coil of the transformer.

Figure 30:
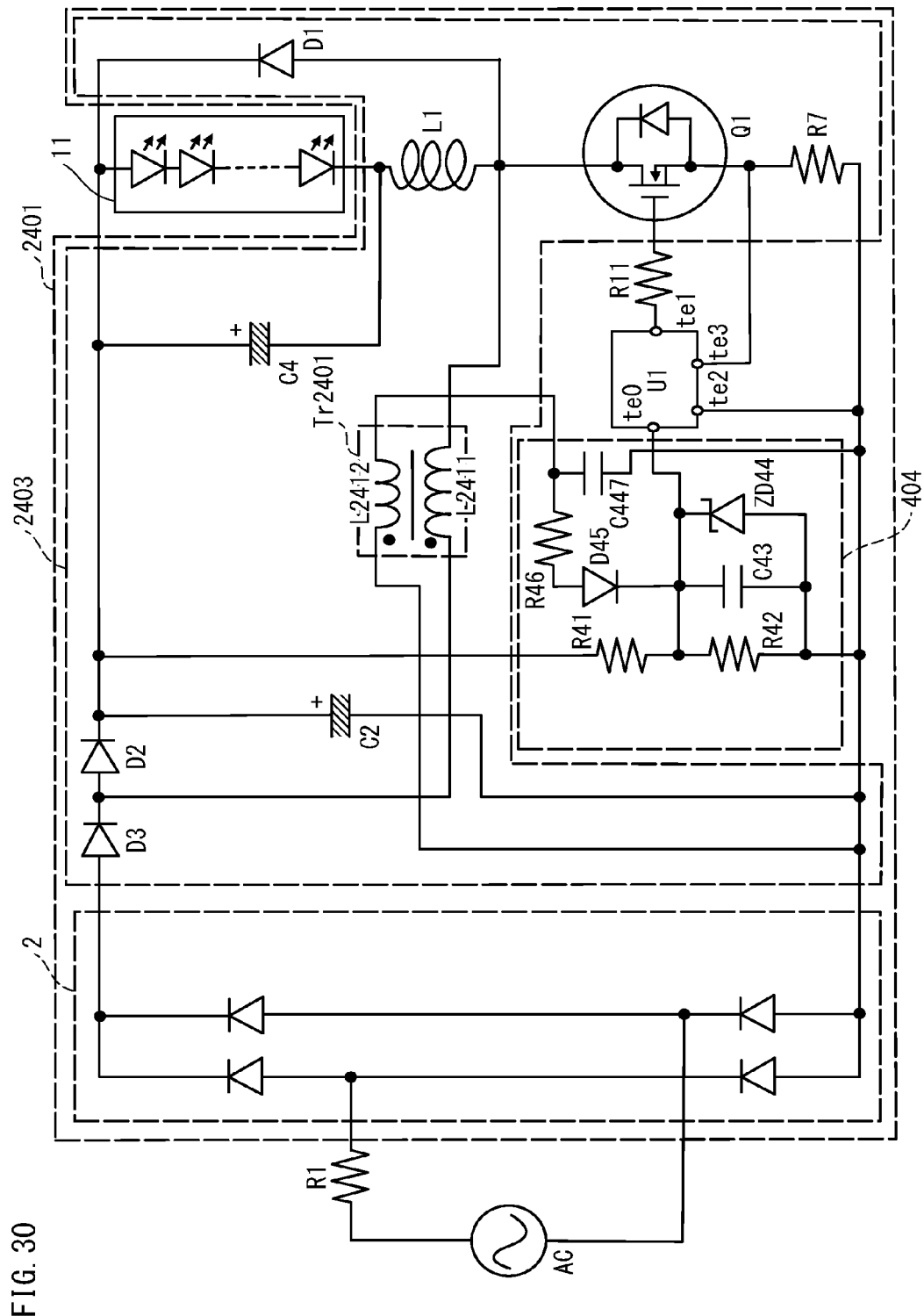
FIG. 30 is a circuit diagram illustrating a DC power supply circuit relating to a modified example.

FIG. 30 is a circuit diagram illustrating a DC power supply circuit 2401 relating to the present modified example. Note that elements of configuration that are the same as in the first embodiment are labeled using the same reference signs and explanation thereof is omitted where appropriate.

In the DC power supply circuit 2401, a voltage conversion circuit 2403 includes a transformer Tr2401 which has a primary coil L2411 and a secondary coil L2412. The primary coil L2411 functions in the same way as the inductor L2 in the first embodiment. In the transformer Tr2401, polarity of the primary coil L2411 is the same as polarity of the secondary coil L2412. In a fixed voltage circuit 404, a capacitor C447 is connected between an input terminal at a high-potential side of the fixed voltage circuit 404 (i.e., a node between the resistor R46 and the secondary coil L2412 of the transformer Tr2401) and the output terminal at the low-potential side of the rectifier circuit 2. Compared to the fixed voltage circuit 4 illustrated in FIG. 1, the capacitor C447 is additionally included in the fixed voltage circuit 404 but the capacitor C47 and the diode D48 are omitted from the fixed voltage circuit 404. The capacitor C447 functions as a so called "snubber capacitor" with respect to the secondary coil L2412 and absorbs excessive surge voltage arising across the terminals of the secondary coil L2412. Note that the fixed voltage circuit 404 may alternatively have a configuration in which the capacitor C447 is omitted. In the present modified example, current is supplied to the fixed voltage circuit 404 from the secondary coil L2412 of the transformer Tr2401 while the switching element Q1 is turned off (i.e., while magnetic energy discharges from the primary coil L2411 of the transformer Tr2401). More specifically, the capacitor C43 is charged through current flowing to the capacitor C43 from the secondary coil L2412, via the resistor R46 and the diode D45.

Note that although the configuration of the DC power supply circuit 2401 illustrated in FIG. 30 is explained for an example in which the polarity of the primary coil L2411 of the transformer Tr2401 is the same as the polarity of the secondary coil L2412 of the transformer Tr2401, alternatively the polarity of the primary coil L2411 may be the opposite of the polarity of the secondary coil L2412. In such an alternative configuration, current is supplied to the fixed voltage circuit 404 from the secondary coil L2412 while the switching element Q1 is turned on (i.e., while magnetic energy accumulates in the primary coil L2411).

The modified example of configuration illustrated in FIG. 30 is explained above for an example in which current is supplied to the fixed voltage circuit 404 from the secondary coil L2412 while magnetic energy discharges from the primary coil L2411 and an example in which current is supplied to the fixed voltage circuit 404 from the secondary coil L2412 while magnetic energy accumulates in the primary coil L2411, but the above is not a limitation. Alternatively, current may be supplied to the fixed voltage circuit 404 from the secondary coil L2412 while magnetic energy discharges from the primary coil L2411 and also while magnetic energy accumulates in the primary coil L2411.

Figure 31:
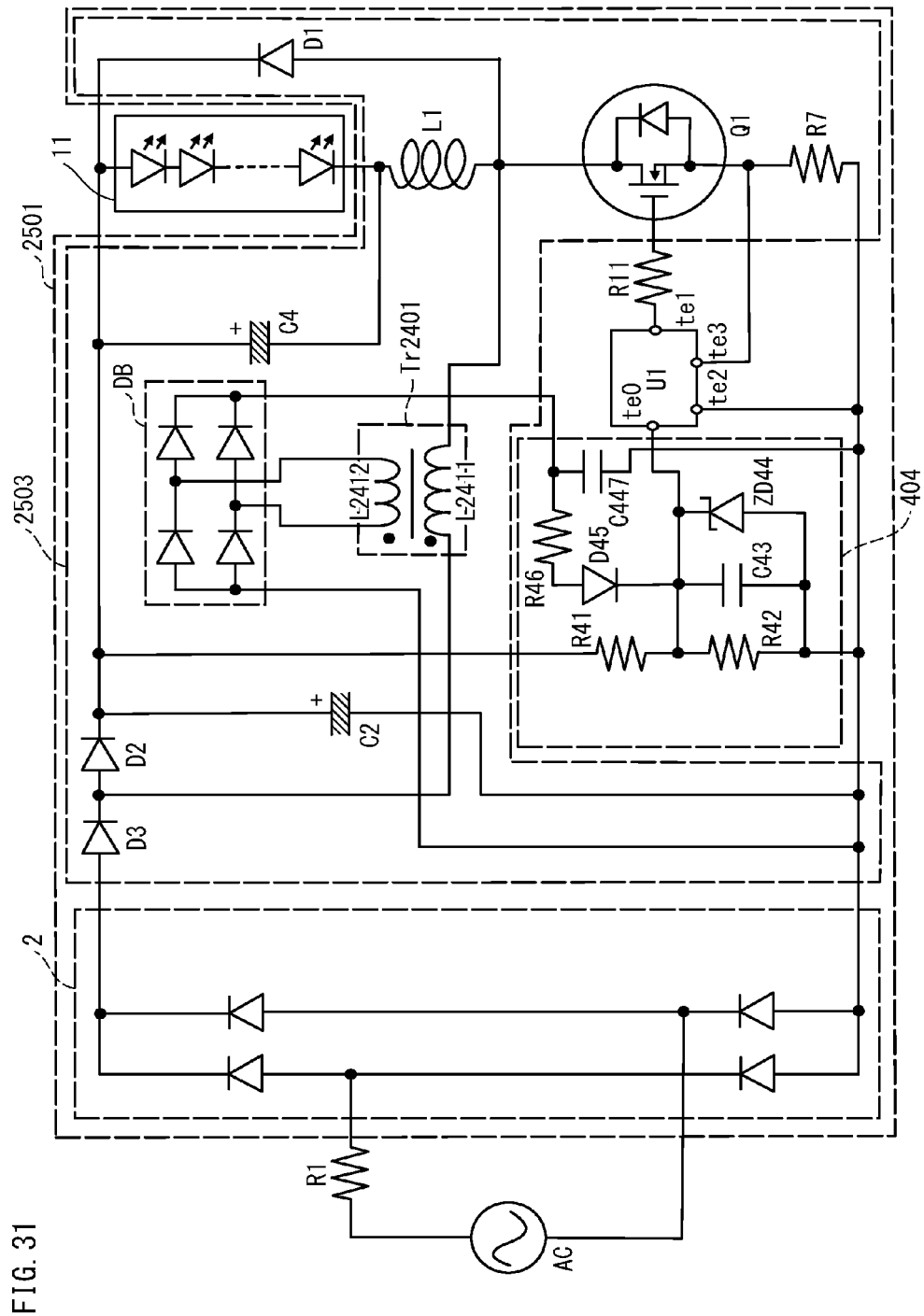
FIG. 31 is a circuit diagram illustrating a DC power supply circuit relating to a modified example.

FIG. 31 illustrates a circuit diagram of a DC power supply circuit 2501 relating to another modified example. Note that elements of configuration that are the same as in FIG. 30 are labeled using the same reference signs and explanation thereof is omitted where appropriate.

The DC power supply circuit 2501 differs from the configuration illustrated in FIG. 30 in terms that a voltage conversion circuit 2503 includes a diode bridge DB which has input terminals that are connected to two terminals of the secondary coil L2412 of the transformer Tr2401. An output terminal at a high-potential side of the diode bridge DB is connected to the fixed voltage circuit 404 and an output terminal at a low-potential side of the diode bridge DB is connected to the output terminal at the low-potential side of the rectifier circuit 2. Note that in the transformer Tr2401, the polarity of the primary coil L2411 may alternatively be the opposite of the polarity of the secondary coil L2412.

In the present configuration, current is supplied to the fixed voltage circuit 404 from the diode bridge DB while the switching element Q1 is turned on and also while the switching element Q1 is turned off.

Furthermore, in terms of a configuration for supplying electrical power from the voltage conversion circuit 3 to the fixed voltage circuit 4, electrical power may for example be supplied while voltage at a node between the inductor L1 and the anode of the diode D1 is no greater than a certain voltage during the turned-off period of the switching element Q1.

Figure 32:
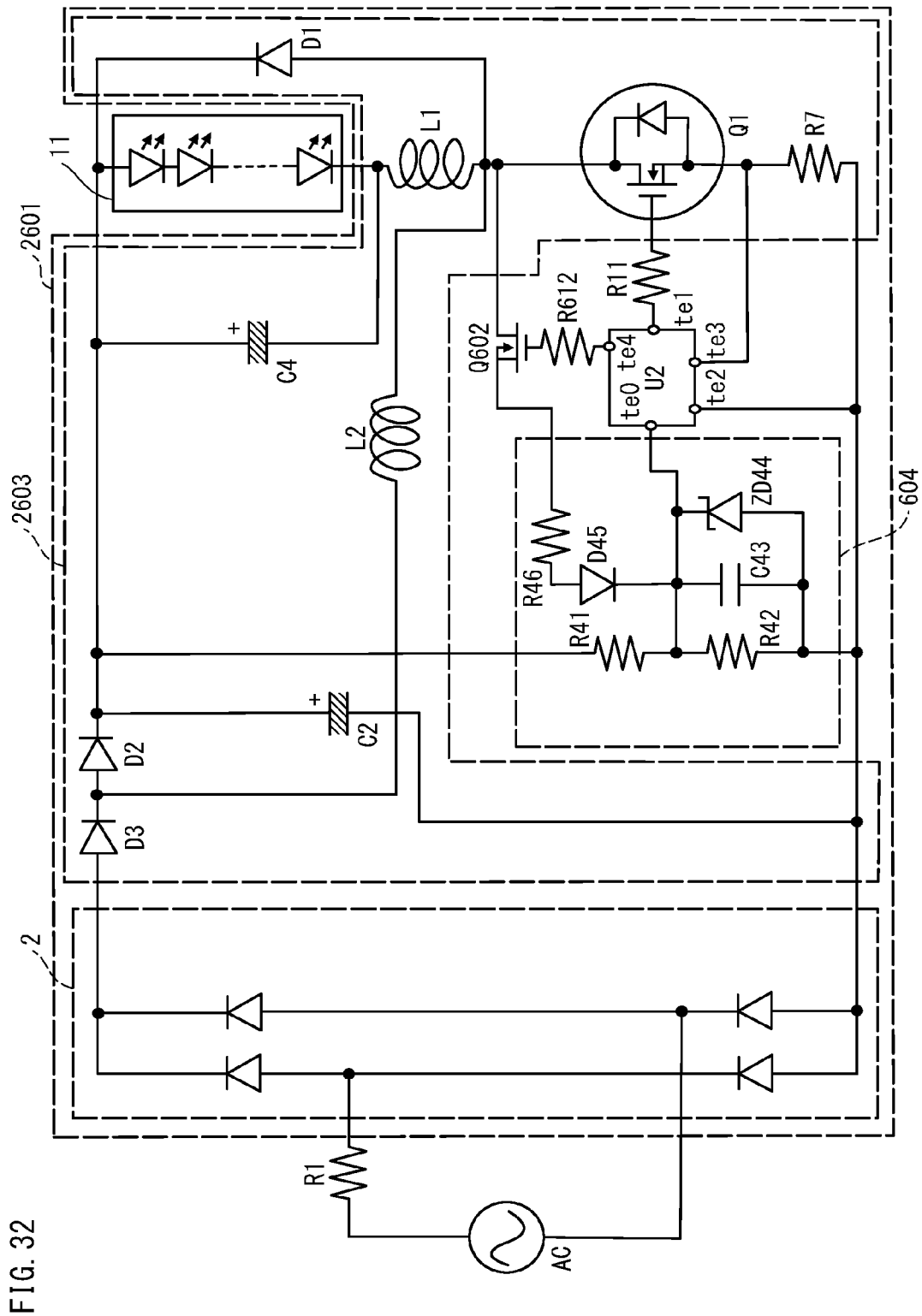
FIG. 32 is a circuit diagram illustrating a DC power supply circuit relating to a modified example.

FIG. 32 is a circuit diagram illustrating a DC power supply circuit 2601 relating to a modified example. Note that elements of configuration that are the same as in the first embodiment are labeled using the same reference signs and explanation thereof is omitted where appropriate.

The DC power supply circuit 2601 includes a switching element Q602 that is connected between a fixed voltage circuit 604 and the node between the inductor L1 and the anode of the diode D1 in a voltage conversion circuit 2603. A drive circuit U2 has a control terminal te4 that outputs a control signal voltage for controlling the switching element Q602.

The switching element Q602 is an N-channel MOSFET. A source of the switching element Q602 is connected to the fixed voltage circuit 604, a gate of the switching element Q602 is connected to the control terminal te4 of the drive circuit U2, via a resistor R612, and a drain of the switching element Q602 is connected to the node between the inductor L1 and the anode of the diode D1.

During a period in which the gate voltage of the switching element Q1 is maintained at a voltage lower than the turn-on voltage of the switching element Q1 (i.e., approximately 0V), once the switching element Q1 is in a turned-off state and voltage at the node between the inductor L1 and the anode of the diode D1 is no greater than a certain voltage, the drive circuit U2 turns on the switching element Q602 by outputting a signal voltage from the control terminal te4 that is at least equal to the turn-on voltage of the switching element Q602. The switching element Q602 is turned on at a preset timing. Through the above, circuit efficiency is improved by reducing electrical power loss due to the resistor R46 in the fixed voltage circuit 604. Note that the fixed voltage circuit 604 also has a reduced number of circuit elements, thereby enabling reduction in circuit size.

(2) The first embodiment is explained for an example in which the voltage conversion circuit 3 is a non-insulation type voltage conversion circuit, but the above is not a limitation. Alternatively, an insulation type voltage conversion circuit may be provided.

Figure 33:
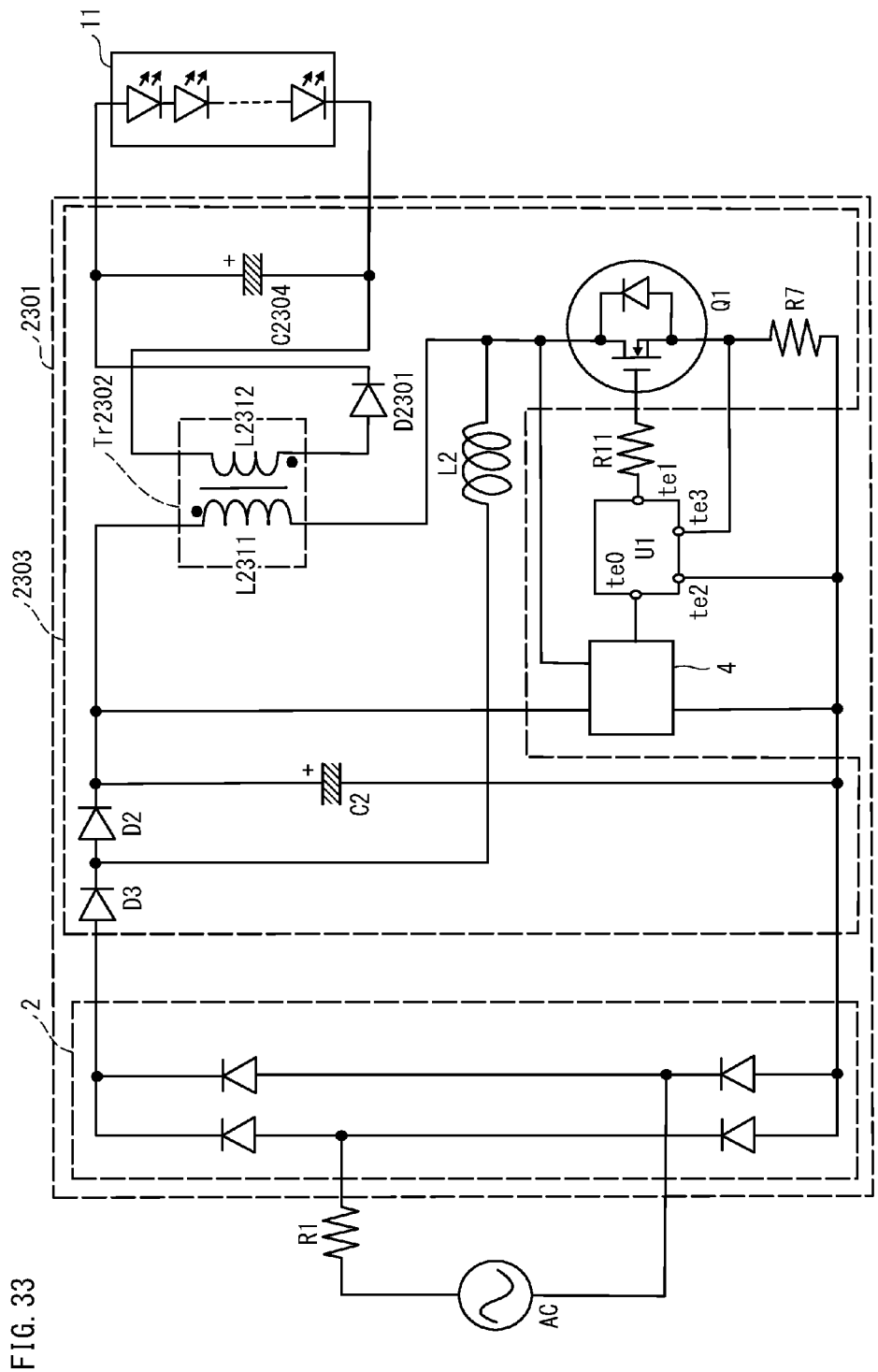
FIG. 33 is a circuit diagram illustrating a DC power supply circuit relating to a modified example.

FIG. 33 is a circuit diagram illustrating a DC power supply circuit 2301 relating to the present modified example. Note that elements of configuration that are the same as in the first embodiment are labeled using the same reference signs and explanation thereof is omitted where appropriate.

As illustrated in FIG. 33, a voltage conversion circuit 2303 is a flyback converter that includes a switching element Q1, a transformer Tr2302 having a primary coil L2311 and a secondary coil L2312, diodes D2, D3, and D2301, capacitors C2 and C2304, and a resistor R7. In the transformer Tr2302, polarity of the primary coil L2311 is the opposite of polarity of the secondary coil L2312. A source of the switching element Q1 is connected to the output terminal at the low-potential side of the rectifier circuit 2, via the resistor R7, a gate of the switching element Q1 is connected to the drive circuit U1, via the resistor R11, and a drain of the switching element Q1 is connected to a first terminal of the primary coil L2311 of the transformer Tr2302. A second terminal of the primary coil L2311 is connected to the capacitor C2. A first terminal of the secondary coil L2312 of the transformer 2302 is connected to the second terminal of the load 11, via the diode D2301, and a second terminal of the secondary coil L2312 is connected to the first terminal of the load 11. The capacitor C2304 is connected in parallel to the load 11.

The DC power supply circuit 2301 described above is applicable in a situation in which it is necessary to ensure a high degree of insulation between an input side and an output side of the DC power supply circuit 2301.

(3) The second embodiment is explained for an example in which the inductor L1 is connected to a node between the inductor L2 and the switching element Q1 in the voltage conversion circuit 2003, but alternatively the inductor L2 may for example be connected to a node between the inductor L1 and the capacitor Ca.

Figure 34:
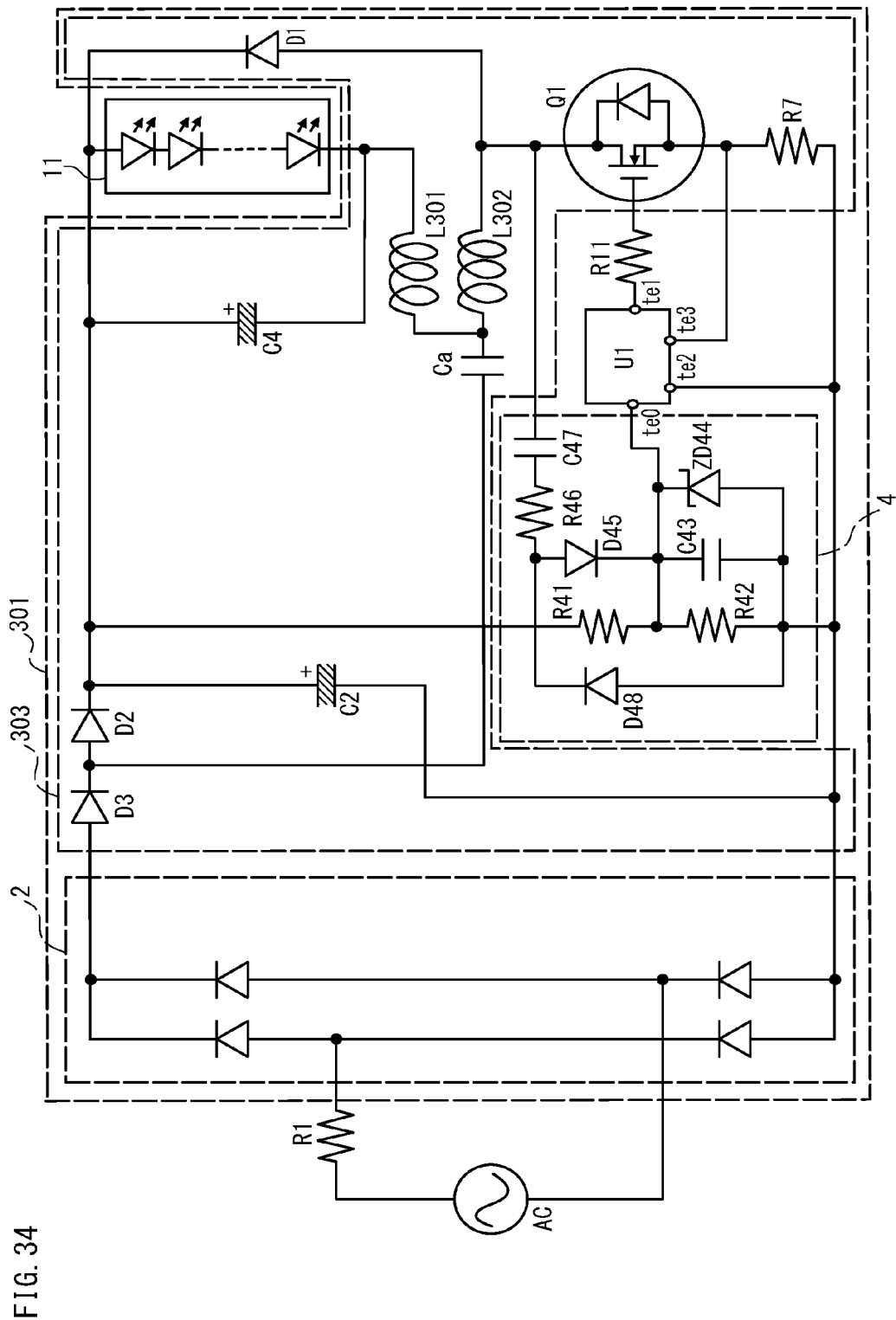
FIG. 34 is a circuit diagram illustrating a DC power supply circuit relating to a modified example.

FIG. 34 is a circuit diagram illustrating a DC power supply circuit 301 relating to the present modified example. Note that elements of configuration that are the same as in the second embodiment are labeled using the same reference signs and explanation thereof is omitted where appropriate.

As illustrated in FIG. 34, a voltage conversion circuit 303 includes a series circuit formed by the capacitor Ca and an inductor L302. The voltage conversion circuit 303 also includes an inductor L301 that is connected to a node between the capacitor Ca and the inductor L302. A drain of the switching element Q1 is connected to the inductor L302 at an opposite side of the inductor L302 relative to the capacitor Ca. In the present modified example, the inductor L301 functions in the same way as the inductor L1 in the second embodiment and the inductor L302 functions in the same way as the inductor L2 in the second embodiment.

(4) The second embodiment is explained for an example including the inductors L1 and L2, but inclusion of two inductors is not a limitation. Alternatively, the inductors L1 and L2 may be replaced by a single inductor which has a center tap.

Figure 35:
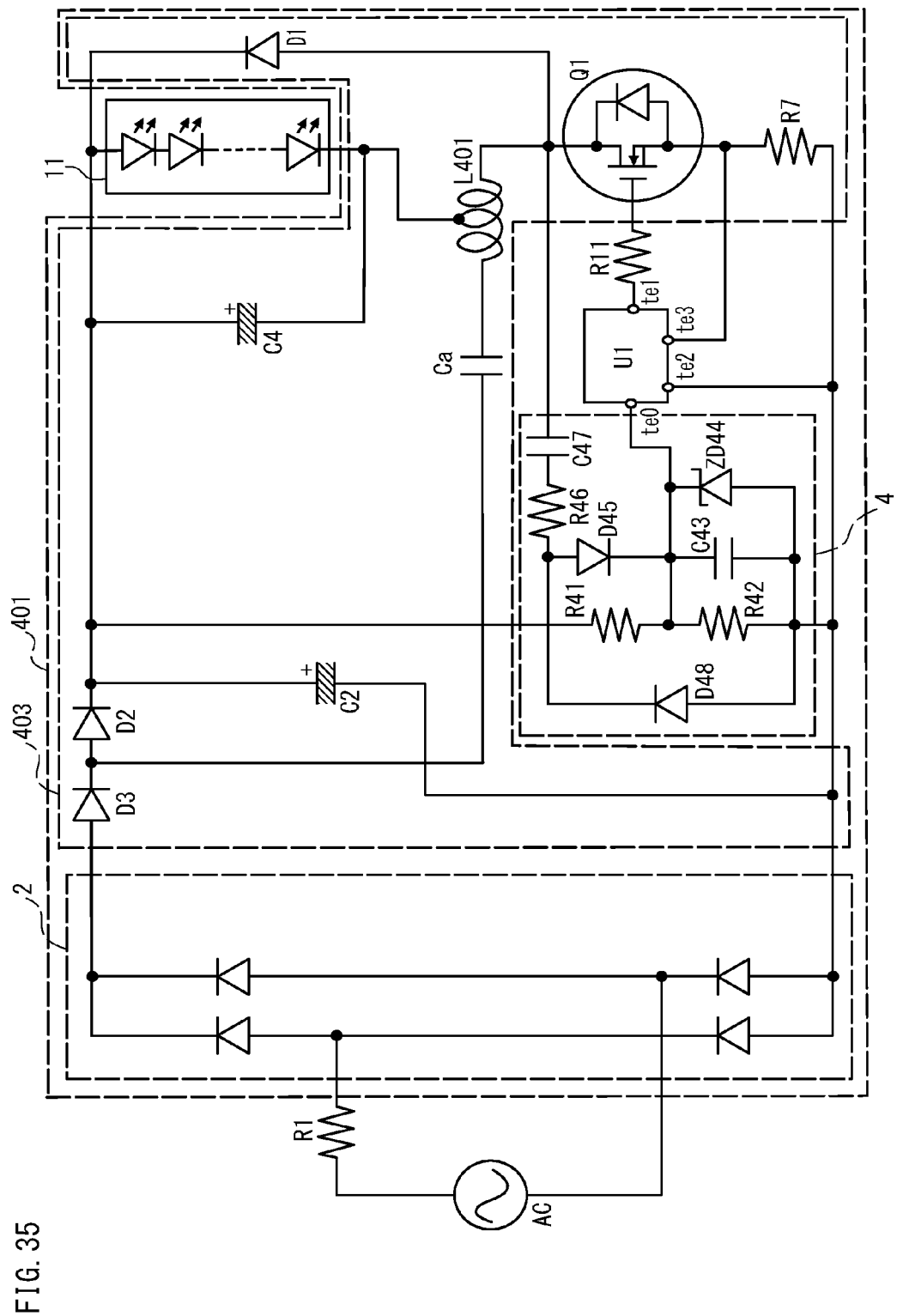
FIG. 35 is a circuit diagram illustrating a DC power supply circuit relating to a modified example.

FIG. 35 is a circuit diagram illustrating a DC power supply circuit 401 relating to the present modified example. Note that elements of configuration that are the same as in the second embodiment are labeled using the same reference signs and explanation thereof is omitted where appropriate.

As illustrated in FIG. 35, a voltage conversion circuit 403 includes an inductor L401 which has a center tap. A first terminal of the inductor L401 is connected to the capacitor Ca, a second terminal of the inductor L401 is connected to the drain of the switching element Q1, and the center tap of the inductor L401 is connected to the load 11. In the present modified example, a section of the inductor L401 located toward the drain of the switching element Q1 relative to the center tap functions in the same way as the inductor L1 in the second embodiment and a section of the inductor L401 located toward the capacitor Ca relative to the center tap functions in the same way as the inductor L2 in the second embodiment.

The present configuration reduces the number of circuit elements and thereby enables reduction in circuit size.

(5) The second embodiment is explained for an example of configuration in which the capacitor C47 is charged during each turned-off period of the switching element Q1 through current supplied from the inductors L1 and L2, and the electrical charge accumulated in the capacitor C47 is transferred to the capacitor C43 during each turned-on period of the switching element Q1 through discharge of the capacitor C47. However, configuration of the fixed voltage circuit 4 and supply of current thereto are not limited to the configuration described above. For example, alternatively a transformer may be included in place of the inductor L2 and current may be supplied to the fixed voltage circuit 4 from a secondary coil of the transformer.

Figure 36:
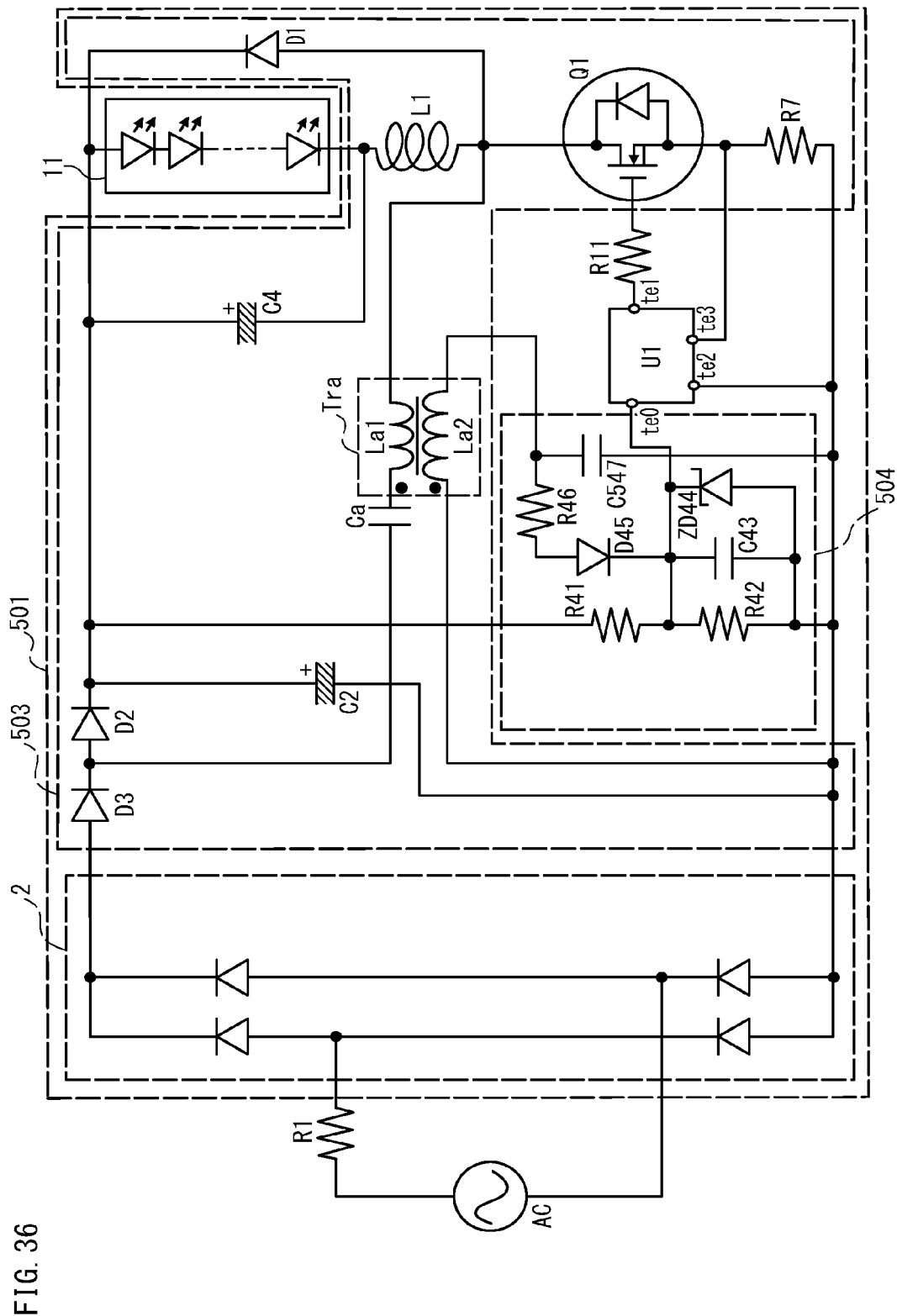
FIG. 36 is a circuit diagram illustrating a DC power supply circuit relating to a modified example.

FIG. 36 is a circuit diagram illustrating a DC power supply circuit 501 relating to the present modified example. Note that elements of configuration that are the same as in the second embodiment are labeled using the same reference signs and explanation thereof is omitted where appropriate.

In the DC power supply circuit 501, a voltage conversion circuit 503 includes a transformer Tra which has a primary coil La1 and a secondary coil La2. The primary coil La1 functions in the same way as the inductor L2 in the second embodiment. In the transformer Tra, polarity of the primary coil La1 is the same as polarity of the secondary coil La2. In a fixed voltage circuit 504, a capacitor C547 is connected between an input terminal at a high-potential side of the fixed voltage circuit 504 (i.e., a node between the resistor R46 and the secondary coil La2 of the transformer Tra) and the output terminal at the low-potential side of the rectifier circuit 2. The capacitor C547 functions as a so called "snubber capacitor" with respect to the secondary coil La2 and absorbs excessive surge voltage arising across the terminals of the secondary coil La2. Through the present modified example, current is supplied from the secondary coil La2 of the transformer Tra to the fixed voltage circuit 504 while the switching element Q1 is turned off (i.e., while magnetic energy discharges from the primary coil La1 of the transformer Tra). More specifically, current flows into the capacitor C43 from the secondary coil La2, via the resistor R46 and the diode D45, thereby charging the capacitor C43. Note that in an alternative configuration the capacitor C547 may be omitted.

Although configuration of the DC power supply circuit 501 illustrated in FIG. 36 is explained for an example in which the polarity of the primary coil La1 of the transformer Tra is the same as the polarity of the secondary coil La2 of the transformer Tra, alternatively the polarity of the primary coil La1 may be the opposite of the polarity of the secondary coil La2. In such an alternative configuration, current is supplied to the fixed voltage circuit 504 from the secondary coil La2 while the switching element Q1 is turned on (i.e., while magnetic energy accumulates in the primary coil La1).

Furthermore, although configuration of the modified example illustrated in FIG. 36 is explained for examples in which current is supplied to the fixed voltage circuit 504 from the secondary coil La2 either while magnetic energy discharges from the primary coil La1 or while magnetic energy accumulates in the primary coil La1, alternatively current may be supplied to the fixed voltage circuit 504 from the secondary coil La2 while magnetic energy discharges from the primary coil La1 and also while magnetic energy accumulates in the primary coil La1.

Figure 37:
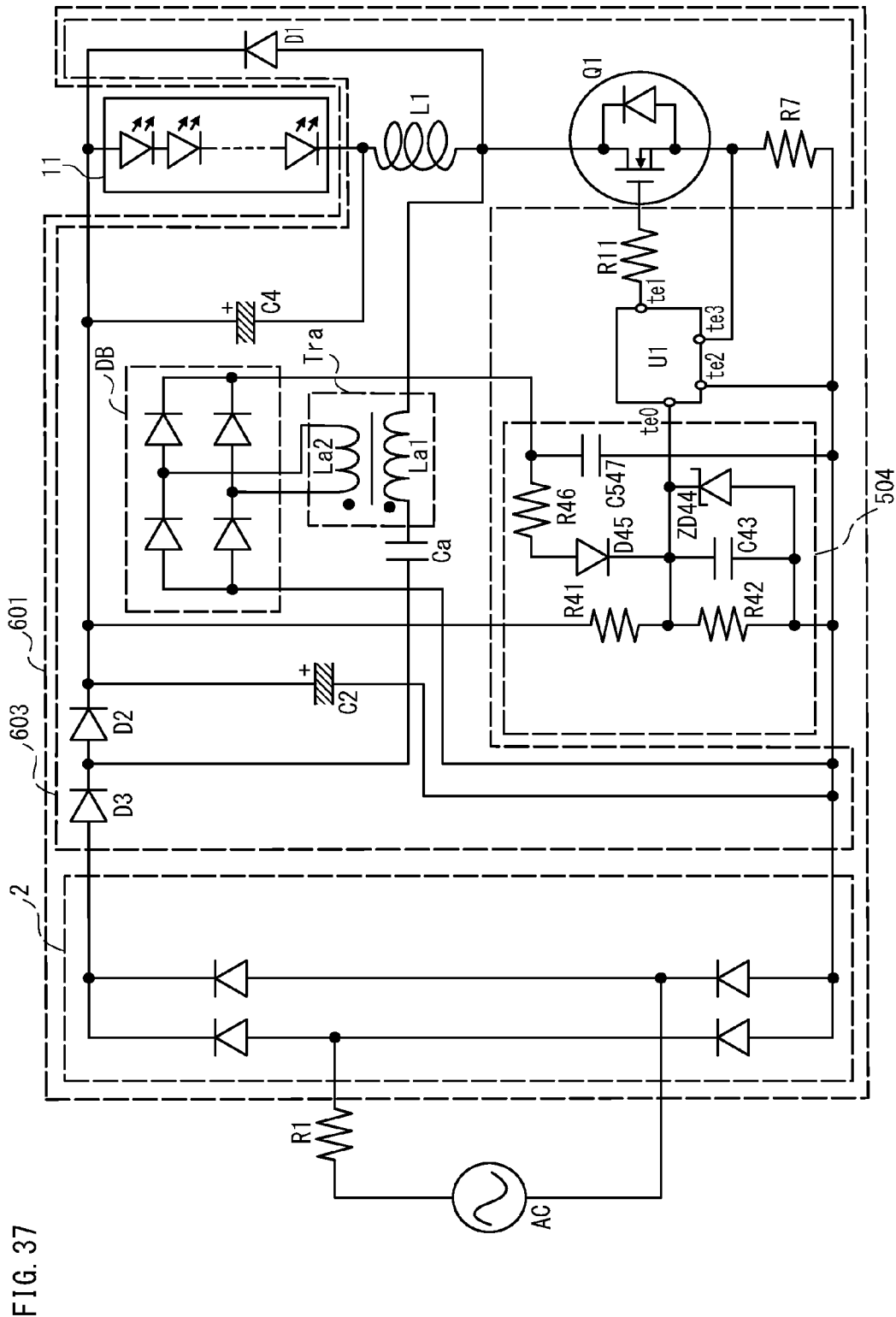
FIG. 37 is a circuit diagram illustrating a DC power supply circuit relating to a modified example.

FIG. 37 is a circuit diagram illustrating a DC power supply circuit 601 relating to another modified example. Note that elements of configuration that are the same as in FIG. 36 are labeled using the same reference signs and explanation thereof is omitted where appropriate.

As illustrated in FIG. 37, a voltage conversion circuit 603 differs from the configuration illustrated in FIG. 36 in terms that the voltage conversion circuit 603 includes a diode bridge DB which has two input terminals connected across the terminals of the secondary coil La2 of the transformer Tra. An output terminal at a high-potential side of the diode bridge DB is connected to the fixed voltage circuit 504 and an output terminal at a low-potential side of the diode bridge DB is connected to the output terminal at the low-potential side of the rectifier circuit 2. Note that in the transformer Tra, the polarity of the primary coil La1 may alternatively be the opposite of the polarity of the secondary coil La2.

In the present configuration, current is supplied to the fixed voltage circuit 504 from the diode bridge DB while the switching element Q1 is turned on and also while the switching element Q1 is turned off.

Also note that although configurations of modified examples illustrated in FIGS. 36 and 37 are each explained for an example in which the transformer is included in place of the inductor L2 and in which current is supplied to the fixed voltage circuit 504 from the secondary coil of the transformer, such a configuration is not a limitation. For example, alternatively a transformer may be provided in place of the inductor L1 and current may be supplied to the fixed voltage circuit 4 from a secondary coil of the transformer.

Figure 38:
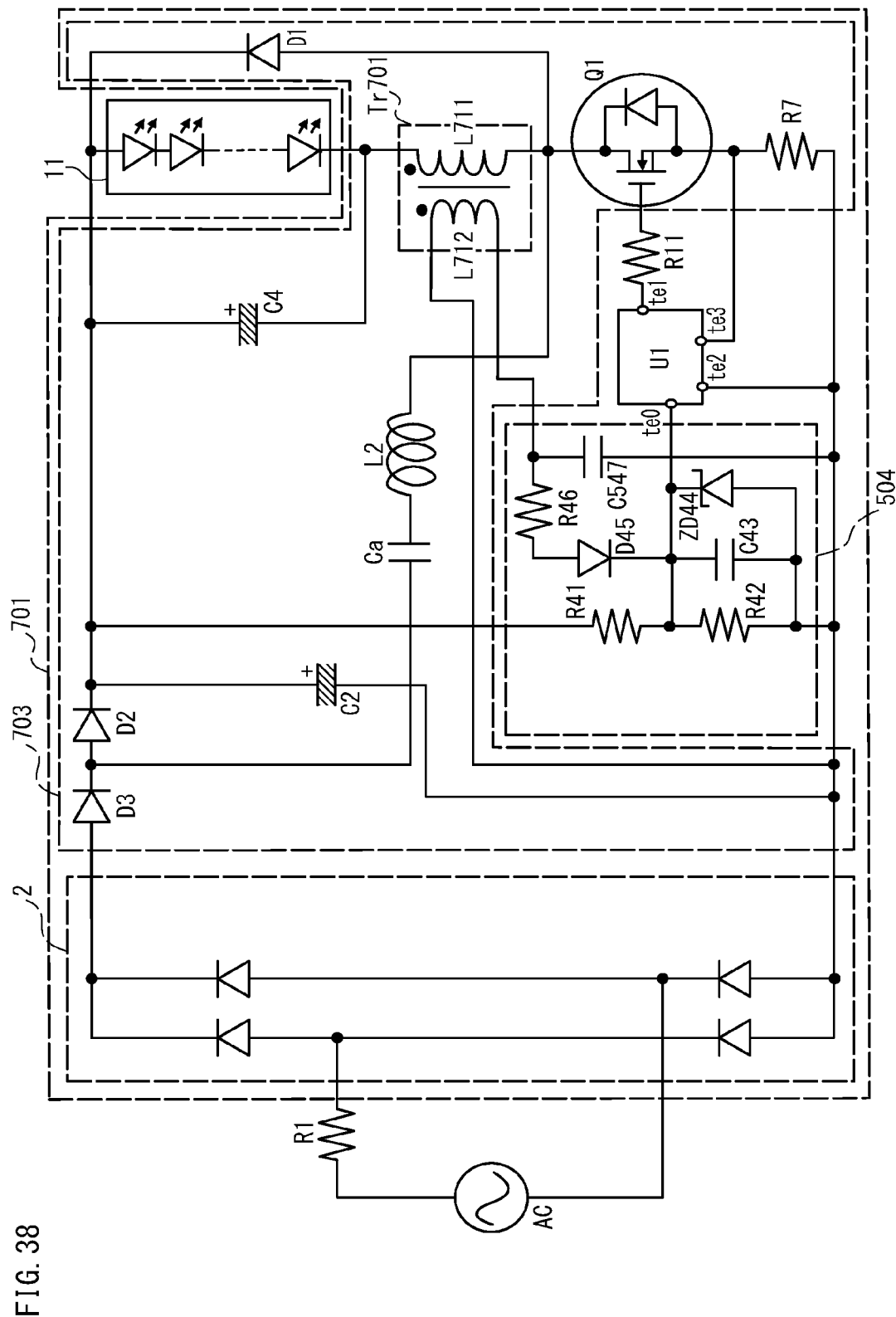
FIG. 38 is a circuit diagram illustrating a DC power supply circuit relating to a modified example.

FIG. 38 is a circuit diagram illustrating a DC power supply circuit 701 relating to another modified example. Note that elements of configuration that are the same as in the second embodiment are labeled using the same reference signs and explanation thereof is omitted where appropriate.

In the DC power supply circuit 701, a voltage conversion circuit 703 includes a transformer Tr701 which has a primary coil L711 and a secondary coil L712. In the present modified example, the primary coil L711 functions in the same way as the inductor L1 in the second embodiment. In the transformer Tr701, polarity of the primary coil L711 is the same as polarity of the secondary coil L712. In the fixed voltage circuit 504, the capacitor C547 is connected between the input terminal at the high-potential side of the fixed voltage circuit 504 (i.e., a node between the resistor R46 and the secondary coil L712 of the transformer Tr701) and the output terminal at the low-potential side of the rectifier circuit 2. Note that the fixed voltage circuit 504 has the same configuration as illustrated in FIG. 36 and thus further explanation thereof is omitted. Through the present modified example, current is supplied to the fixed voltage circuit 504 from the secondary coil L712 of the transformer Tr701 while the switching element Q1 is turned off (i.e., while magnetic energy discharges from the primary coil L711 of the transformer Tr701).

Although configuration of the DC power supply circuit 701 illustrated in FIG. 38 is explained for an example in which the polarity of the primary coil L711 in the transformer Tr701 is the same as the polarity of the secondary coil L712 in the transformer Tr701, alternatively the polarity of the primary coil L711 may be the opposite of the polarity of the secondary coil L712. In such an alternative configuration, current flows to the fixed voltage circuit 504 from the secondary coil L712 while the switching element Q1 is turned on (i.e., while magnetic energy accumulates in the primary coil L711).

Figure 39:
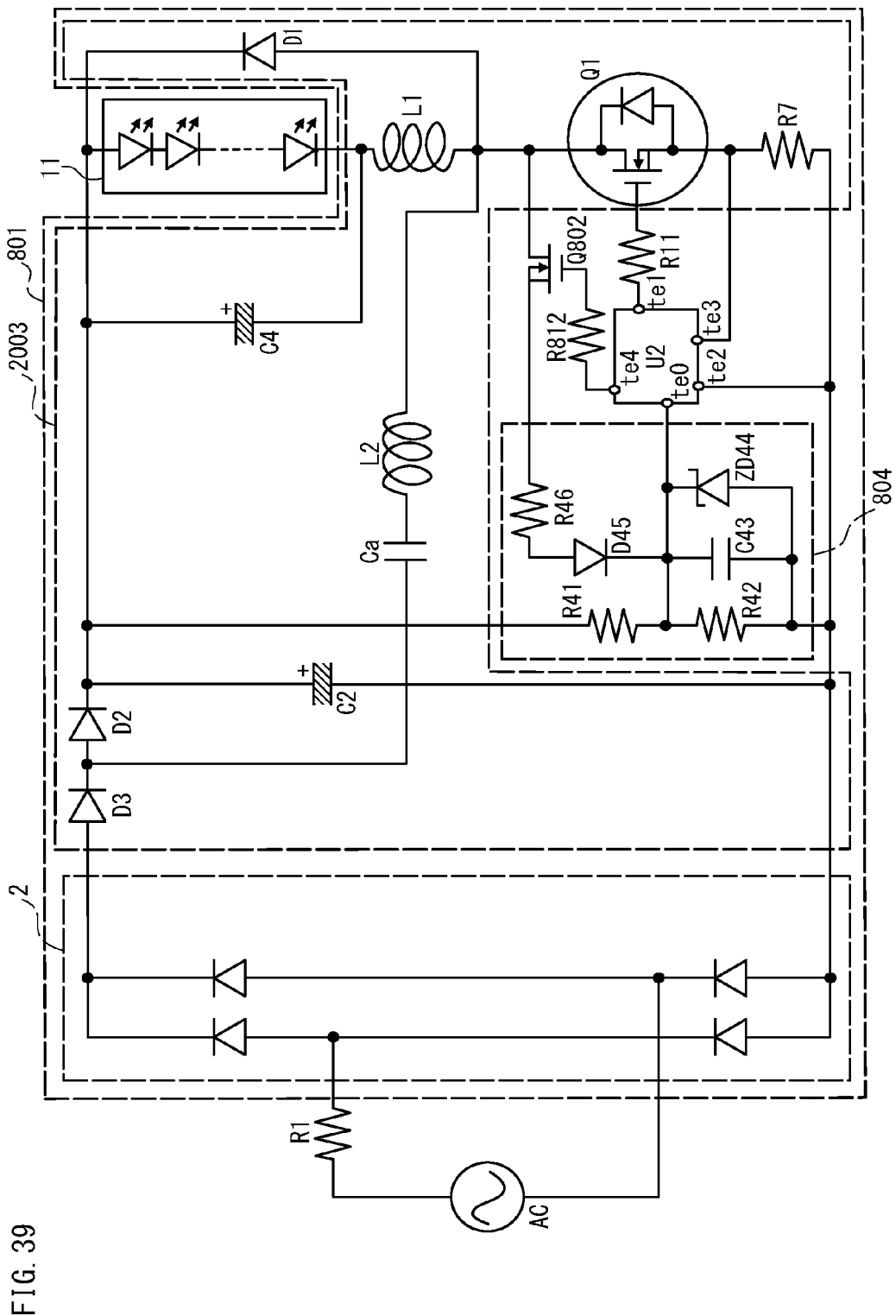
FIG. 39 is a circuit diagram illustrating a DC power supply circuit relating to a modified example.

FIG. 39 is a circuit diagram illustrating a DC power supply circuit 801 relating to another modified example. Note that elements of configuration that are the same as in the second embodiment are labeled using the same reference signs and explanation thereof is omitted where appropriate.

In the configuration illustrated in FIG. 39, current is supplied to a fixed voltage circuit 804 from the voltage conversion circuit 2003 while voltage at the node between the inductor L2 and the switching element Q1 is no greater than a certain voltage during the turned-off period of the switching element Q1.

In the DC power supply circuit 801, a switching element Q802 is connected between the fixed voltage circuit 804 and the node between the inductor L2 and the switching element Q1 in the voltage conversion circuit 2003. The drive circuit U2 has a control terminal te4 that outputs a control signal voltage for controlling the switching element Q802.

The switching element Q802 is an N-channel MOSFET. A source of the switching element Q802 is connected to the fixed voltage circuit 804, a gate of the switching element Q802 is connected to the control terminal te4 of the drive circuit U2, via a resistor R812, and a drain of the switching element Q802 is connected to the node between the inductor L2 and the switching element Q1. Thus, the switching element Q802 is connected between the drain of the switching element Q1 and the resistor R46 in the fixed voltage circuit 804.

In the present modified example, when voltage at the node between the inductor L2 and the switching element Q1 is no greater than the certain voltage due to the signal voltage of the output terminal te1 being maintained at a voltage lower than the turn-on voltage of the switching element Q1 (i.e., approximately 0 V), the drive circuit U2 maintains the switching element Q802 in a turned-on state by outputting a signal voltage from the control terminal te4 which is at least equal to the turn-on voltage of the switching element Q802. The switching element Q802 is turned on at a preset timing. Through the above configuration, circuit efficiency is improved by reducing electrical power loss due to the resistor R46 in the fixed voltage circuit 804. The present modified example also reduces the number of circuit elements in the fixed voltage circuit 804, thereby enabling reduction in circuit size.

(6) The third embodiment is explained for an example including the diodes D3001 and D3002 as a first unidirectional element and a second unidirectional element, but the first and second unidirectional elements are not limited to being diodes.

Figure 40:
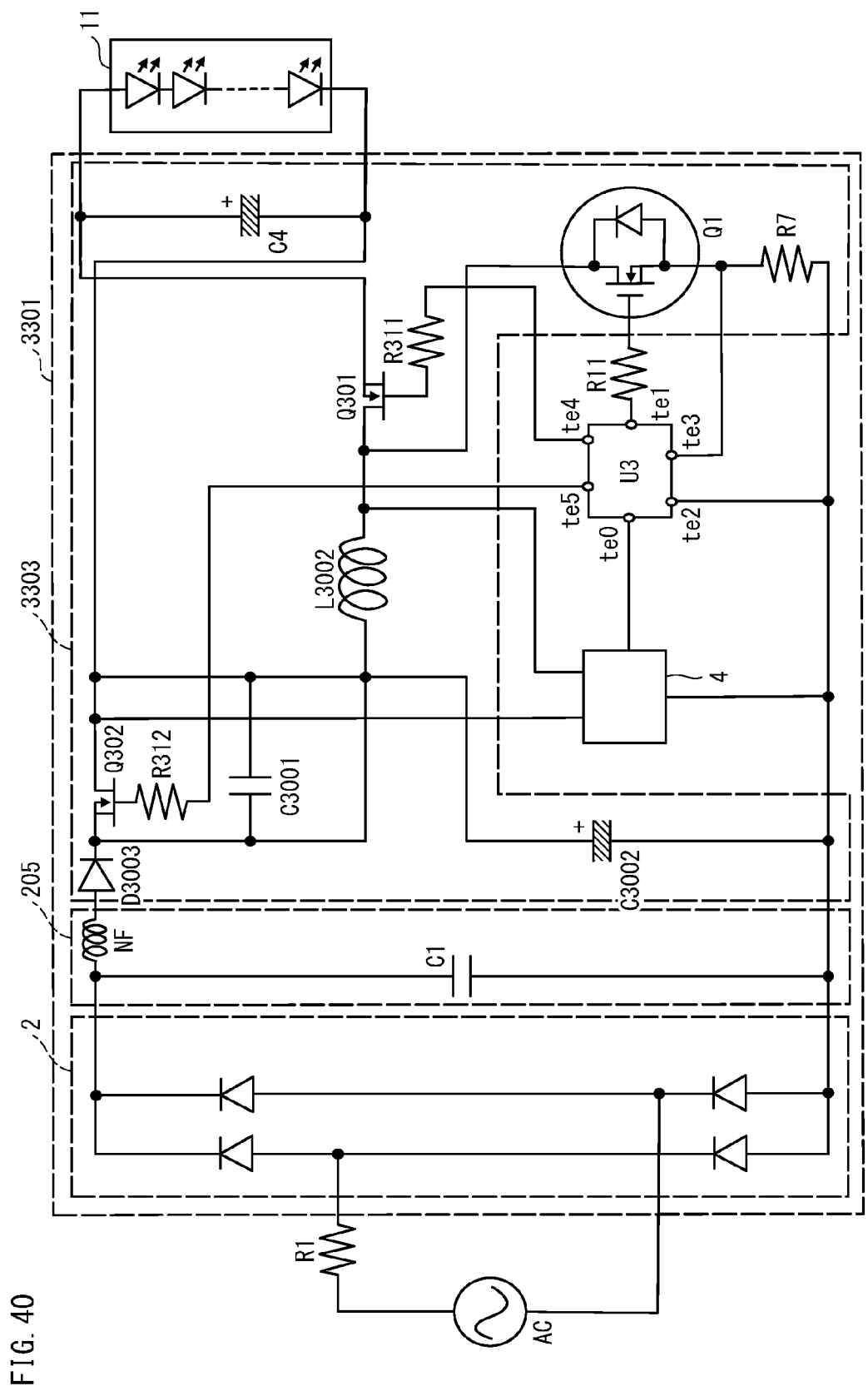
FIG. 40 is a circuit diagram illustrating a DC power supply circuit relating to a modified example.

FIG. 40 is a circuit diagram illustrating a DC power supply circuit 3301 relating to the present modified example.

As illustrated in FIG. 40, a voltage conversion circuit 3303 includes resistors R311 and R312, and switching elements Q301 and Q302 that are each an N-channel MOSFET. A drive circuit U3 has a control terminal te4 for outputting a signal voltage for controlling on-off operation of the switching element Q301 and a control terminal te5 for outputting a signal voltage for controlling on-off operation of the switching element Q302.

A source of the switching element Q301 is connected to the load 11, a gate of the switching element Q301 is connected to the control terminal te4 of the drive circuit U3, via a resistor R311, and a drain of the switching element Q301 is connected to the inductor L3002. A source of the switching element Q302 is connected to a cathode of a diode D3003, a gate of the switching element Q302 is connected to the control terminal te5 of the drive circuit U3, via a resistor R312, and a drain of the switching element Q302 is connected to the load 11.

(7) The third embodiment is explained for an example in which, during each turned-off period of the switching element Q1, the capacitor C47 is charged through current supplied from the second terminal of the inductor L3002, and during each turned-on period of the switching element Q1, electrical charge accumulated in the capacitor C47 is transferred to the capacitor C43 through discharge of the capacitor C47, via the diode D48. However, configuration of the fixed voltage circuit 4 and supply of current thereto is not limited to the configuration described above. For example, alternatively a transformer may be included in place of the inductor L3002 and current may be supplied to the fixed voltage circuit from a secondary coil of the transformer.

Figure 41:
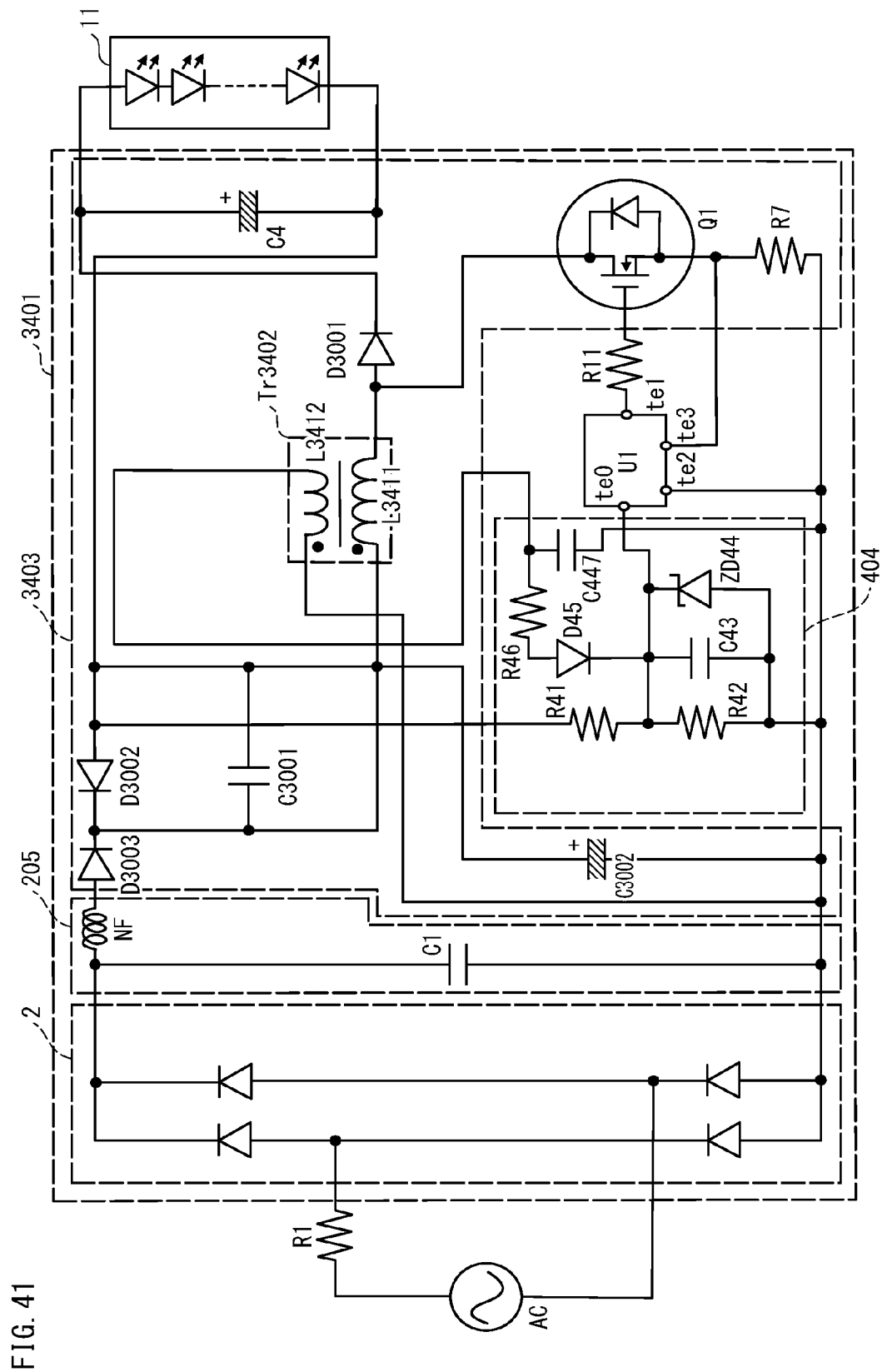
FIG. 41 is a circuit diagram illustrating a DC power supply circuit relating to a modified example.

FIG. 41 is a circuit diagram illustrating a DC power supply circuit 3401 relating to the present modified example. Note that elements of configuration that are the same as in the third embodiment are labeled using the same reference signs and explanation thereof is omitted where appropriate.

As illustrated in FIG. 41, in the DC power supply circuit 3401, a voltage conversion circuit 3403 includes a transformer Tr3402 which has a primary coil L3411 and a secondary coil L3412. In the present modified example, the primary coil L3411 functions in the same way as the inductor L3002 in the third embodiment. In the transformer Tr3402, polarity of the primary coil L3411 is the same as polarity of the secondary coil L3412. In a fixed voltage circuit 404, a capacitor C447 is connected between an input terminal at a high-potential side of the fixed voltage circuit 404 (i.e., a node between the resistor R46 and the secondary coil L3412 of the transformer Tr3402) and the output terminal at the low-potential side of the rectifier circuit 2. Note that the fixed voltage circuit 404 does not include a diode connected between the output terminal at the low-potential side of the rectifier circuit 2 and a node between the resistor R46 and the diode D45. In other words, the diode D48 illustrated in FIG. 14 is omitted from the fixed voltage circuit 404. The capacitor C447 functions as a so called "snubber capacitor" with respect to the secondary coil L3412 and absorbs excessive surge voltage arising across the terminals of the secondary coil L3412. In the present modified example, current is supplied to the fixed voltage circuit 404 from the secondary coil L3412 of the transformer Tr3402 while the switching element Q1 is turned off (i.e., while magnetic energy discharges from the primary coil L3411 of the transformer Tr3402). More specifically, current flows into the capacitor C43 from the secondary coil L3412, via the resistor R46 and the diode D45, thereby charging the capacitor C43.

Note that although the configuration of the DC power supply circuit 3401 illustrated in FIG. 41 is explained for an example in which the polarity of the primary coil L3411 of the transformer Tr3402 is the same as the polarity of the secondary coil L3412 of the transformer Tr3402, alternatively the polarity of the primary coil L3411 may be the opposite of the polarity of the secondary coil L3412. In such an alternative configuration, current flows to the fixed voltage circuit 404 from the secondary coil L3412 while the switching element Q1 is turned on (i.e., while magnetic energy accumulates in the primary coil L3411). Note that in an alternative configuration the capacitor C447 may be omitted.

Configuration of the modified example illustrated in FIG. 41 is explained for examples in which current is supplied to the fixed voltage circuit 404 from the secondary coil L3412 either while magnetic energy discharges from the primary coil L3411 or while magnetic energy accumulates in the primary coil L3411, but the above is not a limitation. Alternatively current may be supplied to the fixed voltage circuit 404 from the secondary coil L3412 while magnetic energy discharges from the primary coil L3411 and also while magnetic energy accumulates in the primary coil L3411.

FIG. 41 illustrates a circuit diagram of a DC power supply circuit 3501 relating to another modified example. Note that elements of configuration that are the same as in FIG. 41 are labeled using the same reference signs and explanation thereof is omitted where appropriate.

Figure 42:
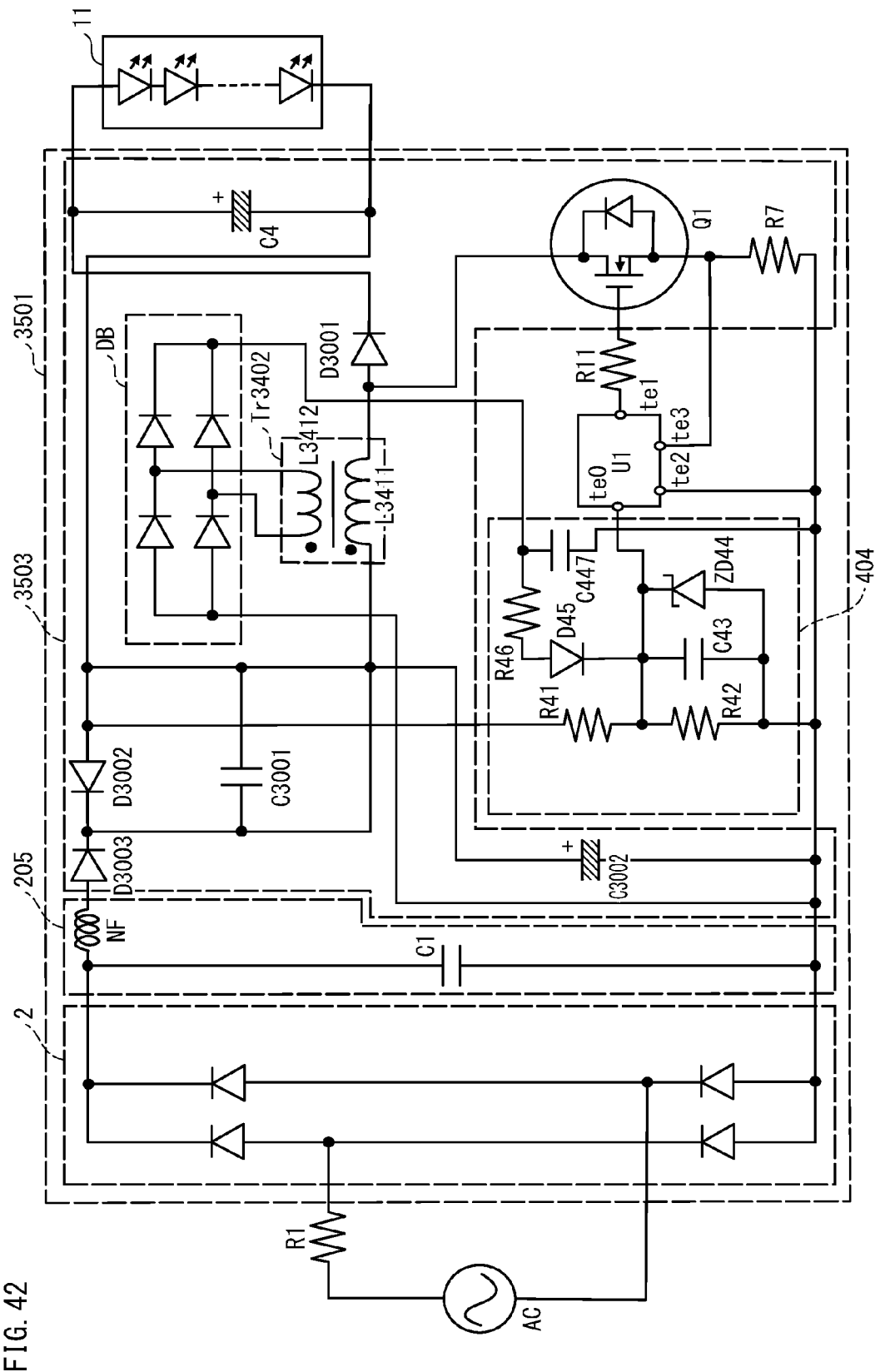
FIG. 42 is a circuit diagram illustrating a DC power supply circuit relating to a modified example.

As illustrated in FIG. 42, a voltage conversion circuit 3503 differs from configuration illustrated in FIG. 41 in terms that the voltage conversion circuit 3503 includes a diode bridge DB which has two input terminals that are connected across the terminals of the secondary coil L3412 of the transformer Tr3402. An output terminal at a high-potential side of the diode bridge DB is connected to the fixed voltage circuit 404 and an output terminal at a low-potential side of the diode bridge DB is connected to the output terminal at the low-potential side of the rectifier circuit 2. Note that in the transformer Tr3402, the polarity of the primary coil L3411 may alternatively be the opposite of the polarity of the secondary coil L3412.

In the present modified example, current is supplied to the fixed voltage circuit 404 from the diode bridge DB while the switching element Q1 is turned on and also while the switching element Q1 is turned off.

(8) The third embodiment is explained for an example in which the voltage conversion circuit 3003 is a non-insulation type voltage conversion circuit, but the above is not a limitation. Alternatively, an insulation type voltage conversion circuit may be provided.

Figure 43:
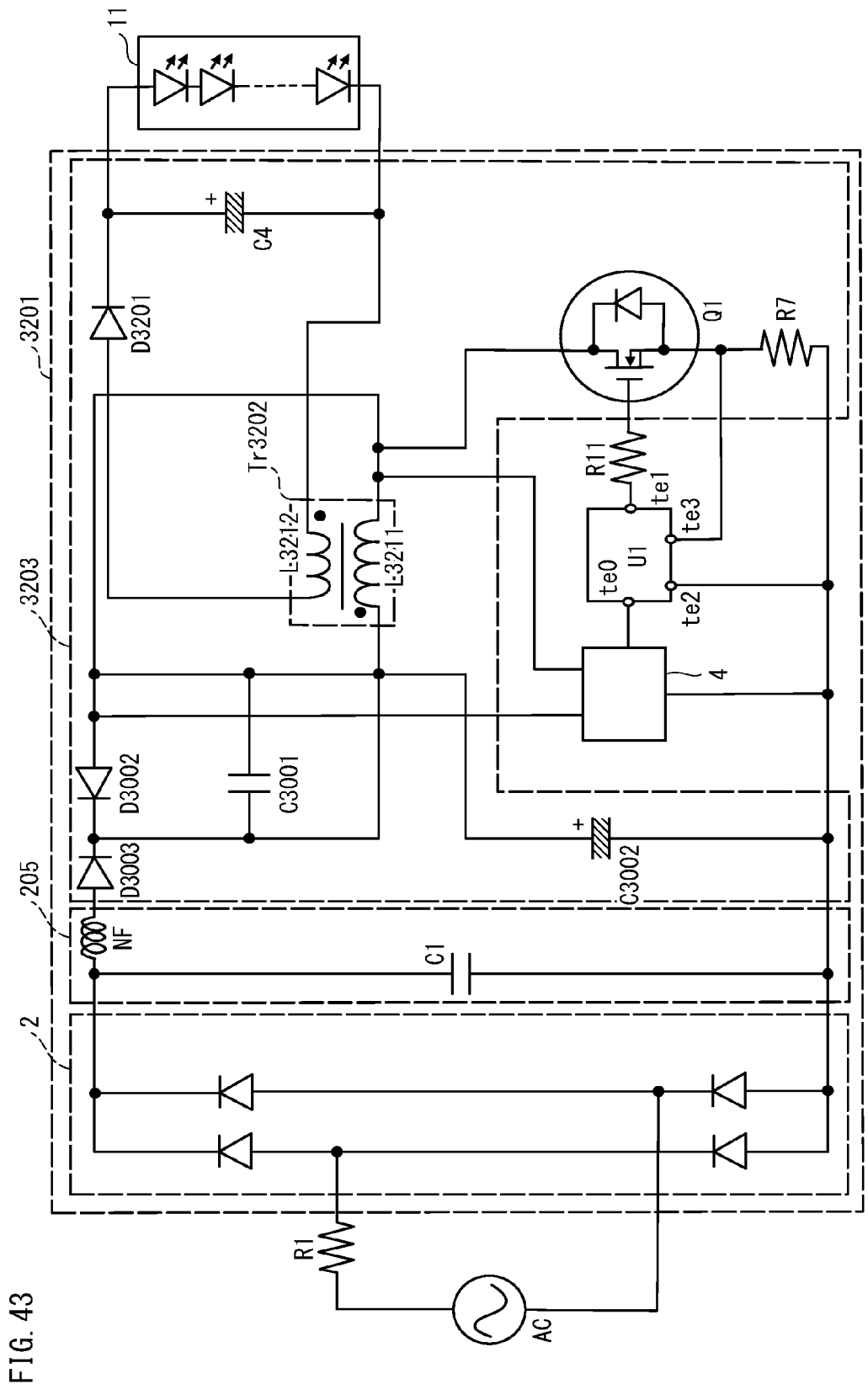
FIG. 43 is a circuit diagram illustrating a DC power supply circuit relating to a modified example.

FIG. 43 is a circuit diagram illustrating a DC power supply circuit 3201 relating to the present modified example. Note that elements of configuration that are the same as in the third embodiment are labeled using the same reference signs and explanation thereof is omitted where appropriate.

As illustrated in FIG. 43, a voltage conversion circuit 3203 is a flyback converter that includes a switching element Q1, a transformer T3202 having a primary coil L3211 and a secondary coil L3212, diodes D3002, D3003, and D3201, capacitors C4, C3001, and C3002, and a resistor R7. In the transformer Tr3202, polarity of the primary coil L3211 is the opposite of polarity of the secondary coil L3212. A source of the switching element Q1 is connected to the output terminal at the low-potential side of the rectifier circuit 2, via the resistor R7, a gate of the switching element Q1 is connected to the drive circuit U1, via the resistor R11, and a drain of the switching element Q1 is connected to a first terminal of the primary coil L3211 of the transformer Tr3202. A second terminal of the primary coil L3211 is connected to the capacitor C3002. A first terminal of the secondary coil L3212 is connected to the second terminal of the load 11, via the diode D3201 and a second terminal of the secondary coil L3212 is connected to the first terminal of the load 11. The capacitor C4 is connected in parallel to the load 11.

The DC power supply circuit 3201 described above is applicable in a situation in which it is necessary to ensure a high degree of insulation between an input side and an output side of the DC power supply circuit 3201.

(9) In the DC power supply circuit 1 relating to the first embodiment, high frequency current accompanying on-off operation of the switching element Q1 in the voltage conversion circuit 3 flows from the voltage conversion circuit 3 to the power supply AC, via the rectifier circuit 2. As a result, high frequency noise leaks externally from the DC power supply circuit 1.

Figure 44A:
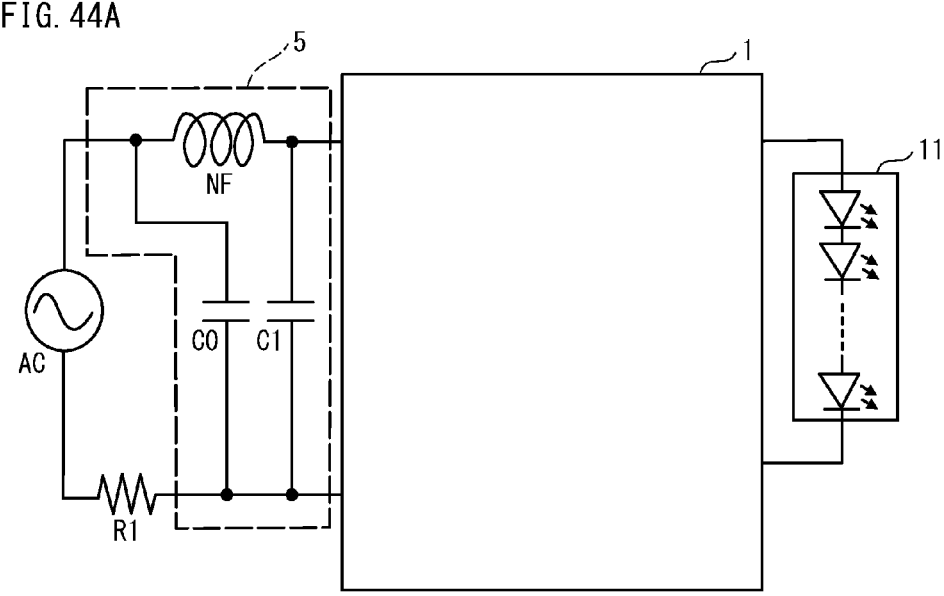
FIGS. 44A and 44B are circuit diagrams, each illustrating a DC power supply circuit relating to a modified example.
Figure 44B:
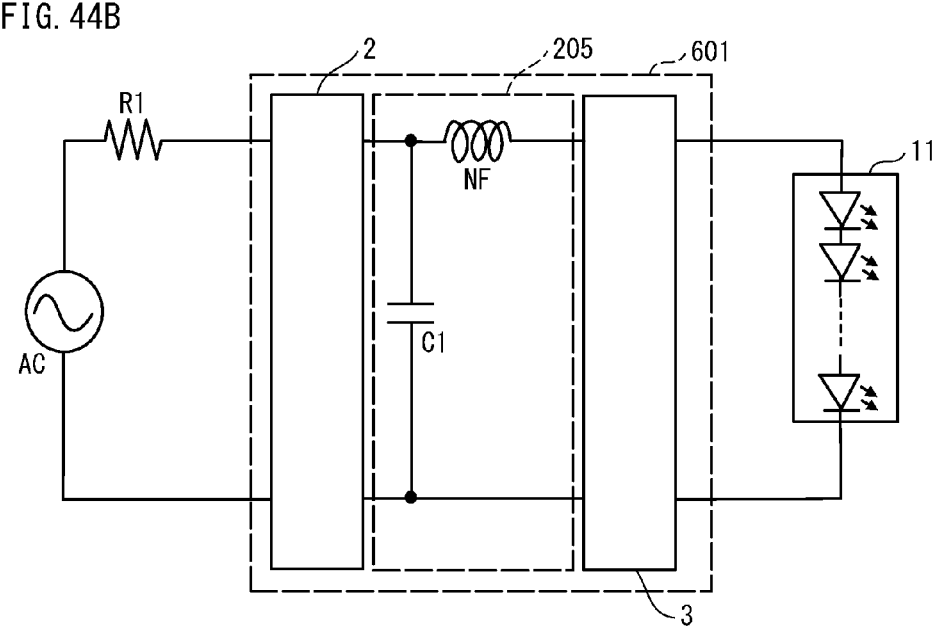

In consideration of the above, a noise filter 5 including an inductor NF and capacitors C0 and C1 may be connected between the DC power supply circuit 1 and the power supply AC as illustrated in FIG. 44A. As illustrated in FIG. 44B, alternatively a DC power supply circuit 601 may include a noise filter 205 connected between the rectifier circuit 2 and the voltage conversion circuit 3. The noise filter 205 includes a capacitor C1 connected across the output terminals of the rectifier circuit 2 and an inductor NF connected in series between the capacitor C1 and the voltage conversion circuit 3 (i.e., the diode D3 illustrated in FIG. 1). Note that position at which the capacitor C1 is connected is preferably altered in a situation in which an objective is ripple reduction compared to a situation in which an objective is noise reduction. When ripple reduction is the objective, in the configuration illustrated in FIG. 44B, preferably a capacitor should be connected to a terminal of the inductor NF which is closest to the voltage conversion circuit 3. Note that in the configuration illustrated in FIG. 44B, alternatively two capacitors may be provided which are connected at opposite sides of the inductor NF. Further alternatively, an additional inductor NF that is connected to the low-potential side of the rectifier circuit 2 may be included. The noise filter 5 may also be applied to configurations explained in the other embodiments and modified examples. Furthermore, the noise filter 205 may be applied to configurations explained in the first, second, fourth and fifth embodiments and the modified examples.

(10) The first to fifth embodiments are each explained for an example in which the switching element Q1 is an N-channel MOSFET, but the above is not a limitation, and alternatively the switching element Q1 may be a P-channel MOSFET. Further alternatively, the switching element Q1 may be a bipolar transistor.

(11) Note that in the DC power supply circuit of each of the embodiments, a power adjustor may be connected between the DC power supply circuit and the power supply AC in order to adjust electrical power input to the DC power supply circuit. The power adjustor may typically include a triac or the like. There is a possibility of a malfunction occurring in the triac if current does not flow, or excessively flows, toward the DC power supply circuit while the input voltage to the DC power supply circuit is close to zero.

Which respect to the above problem, in the DC power supply circuit of each of the embodiments, a phase of the input voltage approximately matches a phase of the input current, and the input current is caused to flow even when the input voltage is of a low magnitude close to crossing zero. As a result, power adjustor malfunction is prevented in the configuration described above in which a power adjustor including a triac is provided.

REFERENCE SIGNS LIST

1, 2001 DC power supply circuit
2 rectifier circuit
3, 2003 voltage conversion circuit
4 fixed voltage circuit
11 load
C2, C4 capacitor
D1, D2, D3 diode
L1, L2 inductor
Q1 switching element
R7, R11 resistor
U1 drive circuit

The invention claimed is:
1. A DC power supply circuit comprising:
a rectifier circuit rectifying AC supplied from an AC power source;
  a capacitor having a first terminal that is connected to an output terminal at a low-potential side of the rectifier circuit;
a first inductor having a first terminal that is connected to a second terminal of the capacitor via a load;
a switching element connected between a second terminal of the first inductor and the output terminal at the low-potential side of the rectifier circuit, and repeatedly switching between a turned-on state and a turned-off state during each half cycle of the AC power source;
a unidirectional element connected between the second terminal of the first inductor and the second terminal of the capacitor; and
a second inductor having a first terminal that is connected to the second terminal of the first inductor and a second terminal that is connected to an output terminal at a high-potential side of the rectifier circuit, wherein upon the switching element switching to the turned-on state:
a first current path is formed that extends from the output terminal at the high-potential side of the rectifier circuit to the output terminal at the low-potential side of the rectifier circuit, via the second inductor and the switching element in respective order; and
a second current path is formed that extends from the second terminal of the capacitor to the first terminal of the capacitor, via the load, the first inductor, and the switching element in respective order, and
upon the switching element switching to the turned-off state:
a third current path is formed that extends from the output terminal at the high-potential side of the rectifier circuit to the output terminal at the low-potential side of the rectifier circuit, via the second inductor, the unidirectional element, and the capacitor in respective order; and
a fourth current path is formed that extends from the second terminal of the first inductor to the first terminal of the first inductor, via the first unidirectional element and the load in respective order.

2. The DC power supply circuit of claim 1, further comprising
a unidirectional element connected between the second terminal of the second inductor and the second terminal of the capacitor.

3. The DC power supply circuit of claim 2, wherein
the unidirectional element connected between the second terminal of the first inductor and the second terminal of the capacitor only conducts current flowing toward the second terminal of the capacitor from the second terminal of the first inductor, and
the unidirectional element connected between the second terminal of the second inductor and the second terminal of the capacitor only conducts current flowing toward the second terminal of the capacitor from the second terminal of the second inductor.

4. The DC power supply circuit of claim 3, wherein
the unidirectional element connected between the second terminal of the first inductor and the second terminal of the capacitor is a diode having an anode that is connected to the second terminal of the first inductor and a cathode that is connected to the second terminal of the capacitor, and
the unidirectional element connected between the second terminal of the second inductor and the second terminal of the capacitor is a diode having an anode that is connected to the second terminal second inductor and a cathode that is connected to the second terminal of the capacitor.

5. The DC power supply circuit of claim 1, further comprising
a unidirectional element connected between the output terminal at the high-potential side of the rectifier circuit and the second terminal of the second inductor.

6. The DC power supply circuit of claim 5, wherein
the unidirectional element connected between the output terminal at the high-potential side of the rectifier circuit and the second terminal of the second inductor only conducts current flowing toward the second terminal of the second inductor from the output terminal at the high-potential side of the rectifier circuit.

7. The DC power supply circuit of claim 6, wherein
the unidirectional element connected between the output terminal at the high-potential side of the rectifier circuit and the second terminal of the second inductor is a diode having an anode that is connected to the output terminal at the high-potential side of the rectifier circuit and a cathode that is connected to the second terminal of the second inductor.

8. The DC power supply circuit of claim 1, further comprising
an auxiliary capacitor connected in series to the second inductor in a circuit path including the second inductor and extending from the second terminal of the first inductor to the output terminal at the high-potential side of the rectifier circuit, wherein
the second inductor and the auxiliary capacitor are both located, in terms of position along the first current path, between the output terminal at the high-potential side of the rectifier circuit and the switching element, and
the second inductor and the auxiliary capacitor are both located, in terms of position along the third current path, between the output terminal at the high-potential side of the rectifier circuit and the unidirectional element connected between the second terminal of the first inductor and the second terminal of the capacitor.

9. A DC power supply circuit comprising:
a rectifier circuit rectifying AC supplied from an AC power source;
an inductor having a first terminal that is connected to an output terminal at a high-potential side of the rectifier circuit;
a switching element connected between a second terminal of the inductor and an output terminal at the low-potential side of the rectifier circuit;
a first capacitor having a first terminal that is connected to the output terminal at the high-potential side of the rectifier circuit;
a second capacitor having a first terminal that is connected to a second terminal of the first capacitor and a first terminal of a load, and a second terminal that is connected to the output terminal at the low-potential side of the rectifier circuit;
a first unidirectional element connected between the second terminal of the inductor and a second terminal of the load; and
a second unidirectional element connected between the first terminal of the inductor and the second terminal of the first capacitor, wherein
during a period in which the switching element is in a turned-on state, a first current path is formed that extends from the first terminal of the first capacitor to the second terminal of the second capacitor, via the inductor and the switching element in respective order,
during a period in which the switching element is in a turned-off state:
a second current path is formed that extends from the second terminal of the inductor to the first terminal of the inductor, via the first unidirectional element, the load, and the first capacitor in respective order; and
a third current path is formed that extends from the output terminal at the high-potential side of the rectifier circuit to the output terminal at the low-potential side of the rectifier circuit, via the inductor, the first unidirectional element, the load, and the second capacitor,
upon completion of discharge of the first capacitor through flow of current along the second current path:
a fourth current path is formed that extends from the second terminal of the inductor to the first terminal of the inductor, via the first unidirectional element, the load, and the second unidirectional element in respective order; and a fifth current path is formed that extends from the output terminal at the high-potential side of the rectifier circuit to the output terminal at the low-potential side of the rectifier circuit, via the inductor, the first unidirectional element, the load, and the second capacitor, and upon completion of discharge of magnetic energy from the inductor through flow of current along the fifth current path, a sixth current path is formed that extends from the output terminal at the high-potential side of the rectifier circuit to the output terminal at the low-potential side of the rectifier circuit, via the first capacitor and the second capacitor.

10. The DC power supply circuit of claim 9, wherein
the first unidirectional element only conducts current flowing toward the second terminal of the load from the second terminal of the inductor, and
the second unidirectional element only conducts current flowing toward the first terminal of the inductor from the second terminal of the first capacitor.

11. The DC power supply circuit of claim 10, wherein
the first unidirectional element is a diode having an anode that is connected to the second terminal of the inductor and a cathode that is connected to the second terminal of the load, and
the second unidirectional element is a diode having an anode that is connected to the second terminal of the first capacitor and a cathode that is connected to the first terminal of the inductor.

12. The DC power supply circuit of claim 9, further comprising
a third unidirectional element connected between the output terminal at the high-potential side of the rectifier circuit and the first terminal of the inductor.

13. The DC power supply circuit of claim 12, wherein
the third unidirectional element is a diode having an anode that is connected to the output terminal at the high-potential side of the rectifier circuit and a cathode that is connected to the first terminal of the inductor.

14. A DC power supply circuit, comprising:
a rectifier circuit rectifying AC supplied from an AC power source;
a capacitor having a first terminal that is connected to an output terminal at the low-potential side of the rectifier circuit;
a first inductor having a first terminal that is connected to a second terminal of the capacitor and a first terminal of a load;
a switching element connected between a second terminal of the first inductor and the output terminal at the low-potential side of the rectifier circuit, and repeatedly switching between a turned-on state and a turned-off state during each half cycle of the AC power source;
a second inductor having a first terminal that is connected to the second terminal of the first inductor and a second terminal that is connected to an output terminal at a high-potential side of the rectifier circuit; and
a unidirectional element connected between the second terminal of the first inductor and a second terminal of the load, wherein
upon the switching element switching to the turned-on state:
a first current path is formed that extends from the output terminal at the high-potential side of the rectifier circuit to the output terminal at the low-potential side of the rectifier circuit, via the second inductor and the switching element in respective order; and a second current path is formed that extends from the second terminal of the capacitor to the first terminal of the capacitor, via the first inductor and the switching element in respective order, and upon the switching element switching to the turned-off state:
a third current path is formed that extends from the output terminal at the high-potential side of the rectifier circuit to the output terminal at the low-potential side of the rectifier circuit, via the second inductor, the unidirectional element, the load, and the capacitor in respective order; and
a fourth current path is formed that extends from the second terminal of the first inductor to the first terminal of the first inductor, via the unidirectional element and the load in respective order.

15. The DC power supply circuit of claim 14,
further comprising a unidirectional element connected between the second terminal of the second inductor and the second terminal of the capacitor.

16. The DC power supply circuit of claim 15, wherein
the unidirectional element connected between the second terminal of the first inductor and the second terminal of the load only conducts current flowing toward the second terminal of the load from the second terminal of the first inductor, and
the unidirectional element connected between the second terminal of the second inductor and the second terminal of the capacitor only conducts current flowing toward the second terminal of the capacitor from the second terminal of the second inductor.

17. The DC power supply circuit of claim 16, wherein
the unidirectional element connected between the second terminal of the first inductor and the second terminal of the load is a diode having an anode that is connected to the second terminal of the first inductor and a cathode that is connected to the second terminal of the load, and
the unidirectional element connected between the second terminal of the second inductor and the second terminal of the capacitor is a diode having an anode that is connected to the second terminal of the second inductor and a cathode that is connected to the second terminal of the capacitor.

18. The DC power supply circuit of claim 14, further comprising
a unidirectional element connected between the output terminal at the high-potential side of the rectifier circuit and the second terminal of the second inductor.

19. The DC power supply circuit of claim 18, wherein
the unidirectional element connected between the output terminal at the high-potential side of the rectifier circuit and the second terminal of the second inductor is a diode having an anode that is connected to the output terminal at the high-potential side of the rectifier circuit and a cathode that is connected to the second terminal of the second inductor.

20. The DC power supply circuit of claim 14, further comprising
an auxiliary capacitor connected between the second terminal of the first inductor and the output terminal at the high-potential side of the rectifier circuit, and connected in series to the second inductor, wherein
the second inductor and the auxiliary capacitor are both located, in terms of position along the first current path, between the output terminal at the high-potential side of the rectifier circuit and the switching element, and the second inductor and the auxiliary capacitor are both located, in terms of position along the third current path, between the output terminal at the high-potential side of the rectifier circuit and the unidirectional element connected between the second terminal of the first inductor and the second terminal of the load.

\* \* \* \* \*